(12) United States Patent
Kurashima et al.

(10) Patent No.: US 6,599,032 B1
(45) Date of Patent: Jul. 29, 2003

(54) TRANSMITTER/RECEIVER FOR OPTICAL PARALLEL TRANSMISSION AND BOARD FOR OPTICAL MODULE

(75) Inventors: Hiromi Kurashima, Yokohama (JP); Yasuki Mikamura, Yokohama (JP); Nobuyuki Tanaka, Tokyo (JP); Takashi Sakamoto, Tokyo (JP)

(73) Assignees: Sumitomo Electric Industries, Ltd., Osaka (JP); Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/623,094

(22) PCT Filed: Dec. 27, 1999

(86) PCT No.: PCT/JP99/07353
§ 371 (c)(1),
(2), (4) Date: Oct. 10, 2000

(87) PCT Pub. No.: WO00/39621
PCT Pub. Date: Jul. 6, 2000

(30) Foreign Application Priority Data

Dec. 25, 1998 (JP) .......................... 10-370291
Jan. 6, 1999 (JP) .......................... 11-001166
Oct. 14, 1999 (JP) .......................... 11-292464
Oct. 14, 1999 (JP) .......................... 11-292466

(51) Int. Cl.[7] ................................ G02B 6/36
(52) U.S. Cl. ...................... 385/89; 385/24; 385/92; 359/163
(58) Field of Search ................ 385/89, 88–94, 385/24; 359/159, 163

(56) References Cited

U.S. PATENT DOCUMENTS 5,719,978 A * 2/1998 Kakii et al. .................... 385/89
5,764,833 A   6/1998 Kakii et al. .................... 385/89

FOREIGN PATENT DOCUMENTS

| JP | 5-88051    | 4/1993  |
| JP | 5-134146   | 5/1993  |
| JP | 5-188250   | 7/1993  |
| JP | 5-333251   | 12/1993 |
| JP | 8-201664   | 8/1996  |
| JP | 9-243867   | 9/1997  |
| JP | 9-275227   | 10/1997 |
| JP | 10-186183  | 7/1998  |
| JP | 10-282370  | 10/1998 |

* cited by examiner

Primary Examiner—Phan T. H. Palmer
(74) Attorney, Agent, or Firm—McDermott, Will & Emery

(57) ABSTRACT

An optical parallel transmission receiver in which a plurality of light-receiving elements and a plurality of optical fibers are optically coupled via guide pins (1) includes a pair of guide pins (1), a fiber holding means (2) for holding the pair of guide pins in parallel and holding the plurality of optical fibers between the pair of guide pins (1) at a predetermined interval, and a light-receiving element holding means for holding the plurality of light-receiving elements between the pair of guide pins (1) and holding one end of each of the pair of guide pins (1) so as to make a plane including light-receiving surfaces of the light-receiving elements perpendicular to longitudinal axes of the guide pins (1). The fiber holding means (2) and light-receiving element holding means (3) are integrally held by resin molding.

4 Claims, 48 Drawing Sheets

TRANSMITTER/RECEIVER FOR OPTICAL PARALLEL TRANSMISSION AND BOARD FOR OPTICAL MODULE

TECHNICAL FIELD

The present invention relates to an optical parallel transmission transmitter/receiver used for optical communication, and an optical module substrate having optical elements (light-receiving element/light-emitting elements) and optical fibers.

BACKGROUND ART

Along with an increase in required transmission capacity, the optical parallel data transmission technology for optical communication systems is becoming promising. An optical communication system using the optical parallel data transmission technology is divided into three sections: a transmission section, optical fiber transmission line, and reception section. In the transmission section, a plurality of electronic signals forming a bit sequence are input, subjected to signal processing, waveform shaping, and amplification, and output as optical signals through a current driving circuit and light-emitting element. In the reception section, the optical signals are converted into electrical signals by light-receiving elements, and the signals are subjected to amplification and signal processing to restore the original electrical signal bit sequence (Latest Materials of Optical Communication Technology III, "Optical parallel Data Transmission Scheme and Hardware Configuration", pp. 191–192).

To realize an optical communication system using the optical parallel data transmission scheme, it is necessary to ① accurately and easily align the optical axes of an optical element array and optical fiber array and fix them, and ② hermetically seal the optical element array which readily degrades due to a change in humidity or temperature. A technique is known for this purpose in which a bundle fiber is inserted between a plurality of optical elements and a plurality of optical fibers to optically couple the optical elements to the optical fibers (Japanese Patent Laid-Open No. 5-188250).

Additionally, as described in transactions "the 1995 IEICE Conference C-185", a structure is known in which a V-groove is formed in the upper surface of a silicon substrate, a light-emitting element is positioned and fixed at a predetermined position on the distal end side of the V-groove, and an optical fiber is arranged in the V-groove, thereby matching the optical axes of the optical fiber and light-emitting element.

From the viewpoint of facilitation and automation of the manufacturing process, a structure has been proposed in which optical coupling to light-emitting elements or light-receiving elements is achieved using a ferrule in which optical fiber strands are inserted and fixed (Japanese Patent Application No. 9-83004).

As an element technique for optical parallel transmission, for example, Japanese Patent Laid-Open No. 7-209556 discloses an optical transmission/reception module which integrates an LD (Laser Diode) array, PD (PhotoDiode) array, optical fiber array for optically coupling the LD array and PD array, LD IC, and PD IC. In this optical transmission/reception module, to facilitate alignment between the LD array, the PD array, and the optical fiber array, an optical module substrate made of silicon and having a plurality of V-grooves is used, and the optical fiber is formed by inserting a plurality of optical fibers into the V-grooves in the optical module substrate. Silicon is used for the optical module substrate because working of V-grooves can be easily and accurately realized.

DISCLOSURE OF THE INVENTION

However, when a plurality of optical fibers and a plurality of optical elements (light-receiving elements or light-emitting elements) are to be optically coupled using the conventional system, operation becomes hard. For, e.g., a 12-fiber array, operation is greatly complicated unless shift due to rotation is taken into consideration, unlike a case wherein a single optical fiber is connected to an optical element.

In addition, when not only an optical fiber array but also a light-emitting element array (e.g., a laser array) or light-receiving element array is mounted on an optical module substrate, the alignment operation is to be further facilitated, and the size of light-emitting module or light-receiving module is to be reduced, the optical module substrate according to the prior art has the following problems.

A laser beam emitted from each of a plurality of exit regions of a laser array diverges to some extent. For this reason, when the laser array is mounted on the mounting surface of an optical module substrate, the laser beam emitted from each exit region is partially reflected by the mounting surface of the optical module substrate. As a consequence, the coupling efficiency of the optical fibers of the optical fiber array lowers, and light reflected by the mounting surface generates noise.

Leakage light from a reflection region opposing each of the plurality of exit regions is also reflected by the mounting surface. As a consequence, the light reflected by the mounting surface generates noise.

When a light-emitting element array or light-receiving element array is to be mounted on an optical module substrate, normally, printed interconnections for electrically connecting the light-emitting element array and driving circuit and the like, or the light-receiving element array and amplification circuit and the like must be formed on the optical module substrate. Especially, when the optical module substrate is formed from a conductive material such as silicon, interconnections cannot be directly formed on the surface by metallizing. hence, an insulating film is formed on the surface, and interconnections are formed on this insulating film. With this arrangement, however, operation errors occur in the light-emitting module due to the parasitic capacitance generated between the interconnections and the optical module substrate through the insulating film, or noise is generated in the light-receiving module.

It is an object of the present invention to provide a structure capable of easily realizing operation of optically coupling a plurality of optical fibers and a plurality of optical elements. It is another object of the present invention to provide an optical module substrate which prevents any operation error of a light-emitting module or reduce noise in a light-receiving module.

In order to achieve the above object, according to the present invention, there is provided an optical parallel transmission receiver in which a plurality of light-receiving elements and a plurality of optical fibers are optically coupled via guide pins, characterized by comprising a pair of guide pins, fiber holding means (e.g., a ferrule) for holding the pair of guide pins in parallel and holding the plurality of optical fibers (e.g., a tape-like optical fibers) between the pair of guide pins at a predetermined interval, and light-receiving element holding means for holding the plurality of light-receiving elements (e.g., a light-receiving element array) between the pair of guide pins and holding one end of each of the pair of guide pins so as to make a plane including light-receiving surfaces of the light-receiving elements perpendicular to longitudinal axes of the guide pins, wherein the fiber holding means and the light-receiving element holding means are integrally held by resin molding.

There is also provided an optical parallel transmission transmitter in which a plurality of light-emitting elements and a plurality of optical fibers are optically coupled via guide pins, characterized by comprising a pair of guide pins, fiber holding means for holding the pair of guide pins in parallel and holding the plurality of optical fibers between the pair of guide pins at a predetermined interval, and light-emitting element holding means for holding the plurality of light-emitting elements between the pair of guide pins and holding one end of each of the pair of guide pins so as to align optical axes of the light-emitting elements with core axes of the optical fibers, wherein the fiber holding means and the light-emitting element holding means are integrally held by resin molding.

According to the present invention, there is also provided an optical parallel transmission receiver in which a plurality of light-receiving elements and a plurality of optical fibers are optically coupled via a pair of guide pins, characterized by comprising light-receiving element holding means for holding the plurality of light-receiving elements and holding one end of each of the pair of guide pins so as to make light-receiving surfaces of the light-receiving elements cross core axes of the optical fibers, wherein the light-receiving element holding means is formed from an insulator.

The light-receiving element holding means may comprise a light-receiving element array in which the plurality of light-receiving elements are arranged in an array, a preamplifier IC connected to the light-receiving element array and including a plurality of reception circuits, and a heat-conductive lead frame which is in contact with the preamplifier IC at one part and has a heat dissipation portion formed at the other part.

The light-receiving element holding means may comprise a guide pin holding portion for holding the guide pins, a first holding portion for holding the light-receiving element array, and a second holding portion for holding the preamplifier IC, the first holding portion may be positioned with reference to the guide pin holding portion, and when the light-receiving element array is held by the first holding portion, the light-receiving element array may be positioned with respect to the guide pins to be inserted to the guide pin holding portion.

The light-receiving element holding means may comprise a first plate member and a second plate member, which sandwich the lead frame, the first plate member having a pair of through holes which form the guide pin holding portions, and a pair of opening portions which expose part of the lead frame and form the first holding portion and the second holding portion.

The light-receiving element array may comprise back-incident-type light-receiving elements each having a light-receiving surface on an opposite side of a surface having an electrode connected to the preamplifier IC, the first holding portion may have an opening extending to a back side of the light-receiving element holding means, the back-incident-type light-receiving elements may be arranged to make the light-receiving surfaces expose to the back side of the light-receiving element holding means, and the plurality of optical fibers may be optically coupled to the light-receiving surfaces of the back-incident-type light-receiving elements through the pair of guide pins on the back side of the light-receiving element holding means.

According to the present invention, there is provided an optical parallel transmission transmitter in which a plurality of light-emitting elements and a plurality of optical fibers are optically coupled via a pair of guide pins, comprising light-emitting element holding means for holding the plurality of light-emitting elements and holding one end of each of the pair of guide pins so as to arrange optical axes of the light-emitting elements and core axes of the optical fibers, wherein the light-emitting element holding means may be formed from an insulator.

The light-emitting element holding means may comprise a light-emitting element array in which the plurality of light-emitting elements are arranged in an array, a driver IC array connected to the light-emitting element array and having a plurality of driving circuits, and a heat-conductive lead frame which is in contact with the driver IC array at one part and has a heat dissipation portion formed at the other part.

The light-emitting element holding means may comprise a guide pin holding portion for holding the guide pins, a first holding portion for holding the light-emitting element array, and a second holding portion for holding the driver IC array, and a light-receiving element may be arranged between the first holding portion and the second holding portion.

The light-emitting element holding means may comprise a first plate member and a second plate member, which sandwich the lead frame, the first plate member having a pair of grooves which form the guide pin holding portion, and a pair of opening portions which expose part of the lead frame and form the first holding portion and the second holding portion.

The light-emitting element array may be mounted faceup on the lead frame via an insulating submount.

The lead frame may be separated into two parts which are held by the first plate member and the second plate member while being spaced apart at a predetermined interval, and the light-emitting element array may be mounted on one part of the lead frame while the driver IC array may be mounted on the other part of the lead frame.

The light-emitting element holding means may comprise a guide pin holding portion for holding the guide pins on one surface, a first holding portion for holding the light-emitting element array, and a second holding portion for holding the driver IC array, and the driver IC array having a plurality of driving circuits may be in contact with the light-emitting element holding means.

According to the present invention, there is also provided an optical module substrate for mounting a laser array having a plurality of emission regions, and an optical fiber array formed by arraying a plurality of optical fibers optically coupled to the plurality of emission regions, respectively, characterized in that a groove portion is formed in a mounting surface for mounting the laser array at a portion corresponding to each of the plurality of emission regions of the laser array.

When the groove portion is formed in the mounting surface for mounting the laser array at a portion corresponding to each emission region, reflection of a laser beam emitted from the emission region by the mounting surface is reduced.

According to the present invention, there is provided an optical module substrate for mounting a laser array having a plurality of emission regions, and an optical fiber array formed by arraying a plurality of optical fibers optically coupled to the plurality of emission regions, respectively, which may be characterized in that a groove portion is formed in a mounting surface for mounting the laser array at a portion corresponding to each of a plurality of reflection regions respectively opposing the plurality of emission regions of the laser array.

When the groove portion is formed in the mounting surface for mounting the laser array at the portion corresponding to each reflection region, reflection of leakage light leaking from the reflection region by the mounting surface is reduced.

According to the present invention, there is also provided an optical module substrate for mounting a laser array having a plurality of emission regions, and an optical fiber array formed by arraying a plurality of optical fibers optically coupled to the plurality of emission regions, respectively, which may be characterized in that a groove portion is formed in a mounting surface for mounting the laser array at a portion corresponding to each of the plurality of emission regions of the laser array and a portion corresponding to each of a plurality of reflection regions respectively opposing the plurality of emission regions of the laser array.

When the groove portion is formed in the mounting surface for mounting the laser array at the portion corresponding to each emission region, reflection of a laser beam emitted from the emission region by the mounting surface is reduced. In addition, when the groove portion is formed in the mounting surface for mounting the laser array at the portion corresponding to each reflection region, reflection of leakage light leaking from the reflection region by the mounting surface is reduced.

According to the present invention, there is also provided a light-emitting module characterized by comprising a laser array having a plurality of emission regions, an optical fiber array formed by arraying a plurality of optical fibers optically coupled to the plurality of emission regions, respectively, an optical module substrate for mounting the laser array and the optical fiber array, a driving circuit for driving the laser array, and a base for mounting the optical module substrate and the driving circuit, wherein the optical module substrate comprises any one of the above optical module substrates.

When any one of the above optical module substrates is used, reflection of a laser beam emitted from the emission region of the laser array by the mounting surface is reduced, or reflection of leakage light leaking from the reflection region of the laser array by the mounting surface is reduced.

According to the present invention, there is also provided an optical module substrate for mounting a light-emitting element array formed by arraying a plurality of light-emitting elements and an optical fiber array formed by arraying a plurality of optical fibers optically coupled to the plurality of light-emitting elements, respectively, characterized in that the optical module substrate is formed from an insulating ceramic.

When the optical module substrate is formed from an insulating material, no insulating film need be formed between printed interconnections and the optical module substrate, and a parasitic capacitance is prevented. In addition, when the optical module substrate is formed from a ceramic, the workability and working accuracy are ensured.

According to the present invention, there is also provided an optical module substrate for mounting a light-receiving array formed by arraying a plurality of light-receiving elements and an optical fiber array formed by arraying a plurality of optical fibers optically coupled to the plurality of light-receiving elements, respectively, characterized in that the optical module substrate is formed from an insulating ceramic.

When the optical module substrate is formed from an insulating material, no insulating film need be formed between printed interconnections and the optical module substrate, and a parasitic capacitance is prevented. In addition, when the optical module substrate is formed from a ceramic, the workability and working accuracy are ensured.

The optical module substrate of the present invention is preferably characterized in that the insulating ceramic is an insulating ceramic selected from the group consisting of alumina ceramic, zirconia ceramic, calcium titanate ceramic, silicon nitride ceramic, and aluminum nitride ceramic.

The optical module substrate of the present invention may be characterized in that the substrate comprises a reflection surface for reflecting light emerging from an end face of each of the plurality of optical fibers of the optical fiber array and making the light incident on a corresponding one of the light-receiving elements of the light-receiving element array, and the reflection surface makes an angle of substantially 45° with respect to a mounting surface for mounting the optical fiber array.

In an optical module substrate made of silicon, it is difficult to form a reflection surface that makes an angle of 45° with respect to the mounting surface because of the problem of crystal surface. However, in the optical module substrate made of a ceramic, the reflection surface that makes an angle of 45° with respect to the mounting surface can be easily accurately formed, and the optical coupling efficiency between the light-receiving element array and the optical fiber array can be easily improved.

According to the present invention, there is also provided a light-emitting module characterized by comprising a light-emitting element array formed by arraying a plurality of light-emitting elements, an optical fiber array formed by arraying a plurality of optical fibers optically coupled to the plurality of light-emitting elements, respectively, an optical module substrate for mounting the light-emitting element array and the optical fiber array, a driving circuit for driving the light-emitting element array, and a base for mounting the optical module substrate and the driving circuit, wherein the optical module substrate comprises the optical module substrate formed from an insulating ceramic.

When the optical module substrate formed from an insulating ceramic is used, a parasitic capacitance is prevented, and the workability and working accuracy of the optical module substrate are ensured.

According to the present invention, there is also provided a light-receiving module characterized by comprising a light-receiving element array formed by arraying a plurality of light-receiving elements to output an electrical signal corresponding to a light-receiving amount of each of the plurality of light-receiving elements, an optical fiber array formed by arraying a plurality of optical fibers optically coupled to the plurality of light-receiving elements, respectively, an optical module substrate for mounting the light-receiving element array and the optical fiber array, an amplification circuit for amplifying the electrical signal output from the light-receiving element array, and a base for mounting the optical module substrate and the amplification circuit, wherein the optical module substrate comprises the optical module substrate formed from an insulating ceramic.

When the optical module substrate formed from an insulating ceramic is used, a parasitic capacitance is prevented, and the workability and working accuracy of the optical module substrate are ensured.

BEST MODE FOR CARRYING OUT THE INVENTION

Figure 1:
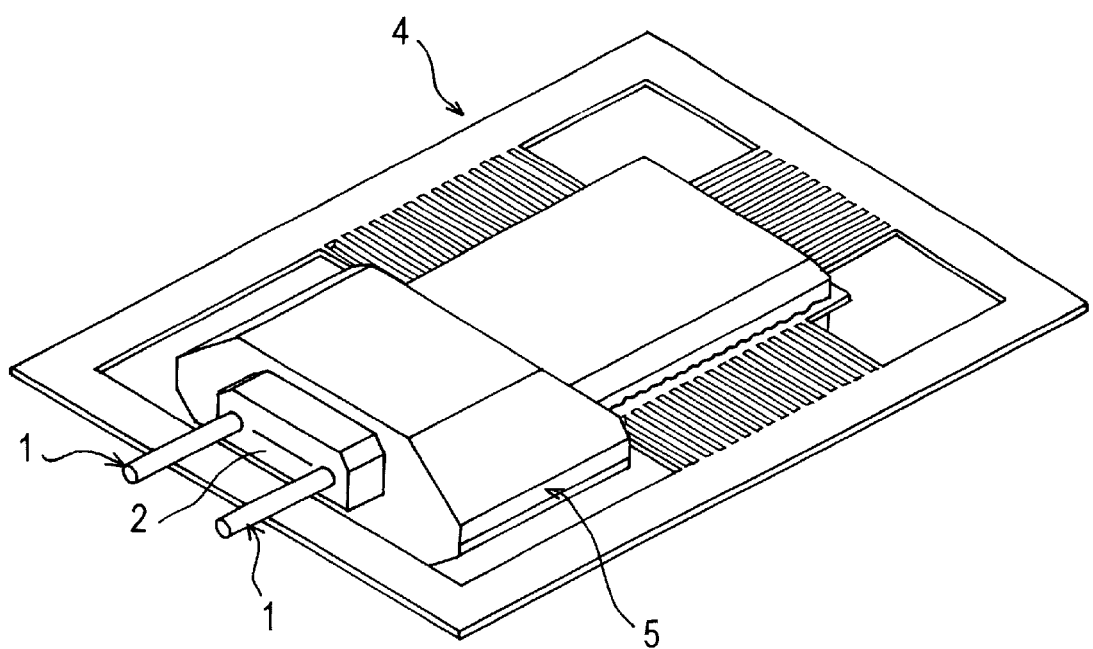
FIG. 1 is a perspective view showing an optical parallel transmission receiver according to an embodiment of the present invention immediately after resin molding.

An embodiment of the present invention will be described below with reference to the accompanying drawings. The same reference numerals denote the same elements throughout the drawings, and a detailed description thereof will be omitted.

FIG. 1 is a perspective view showing an optical parallel transmission receiver according to an embodiment of the present invention immediately after resin molding. For the optical parallel transmission receiver according to this embodiment, a pair of guide pins 1, an MT ferrule 2 for holding multiple optical fibers, and a PD subcarrier 3 for holding light-receiving elements are resin-molded together with a lead frame 4, thereby constructing a mold package 5.

After that, leads extending from the sides and rear side of the mold package 5 are cut in front of support leads, and tie bars between the leads are cut.

In this embodiment, the mold package 5 is used to fix the elements. However, a metal package or plastic package may be used to fix the elements.

Figure 2:
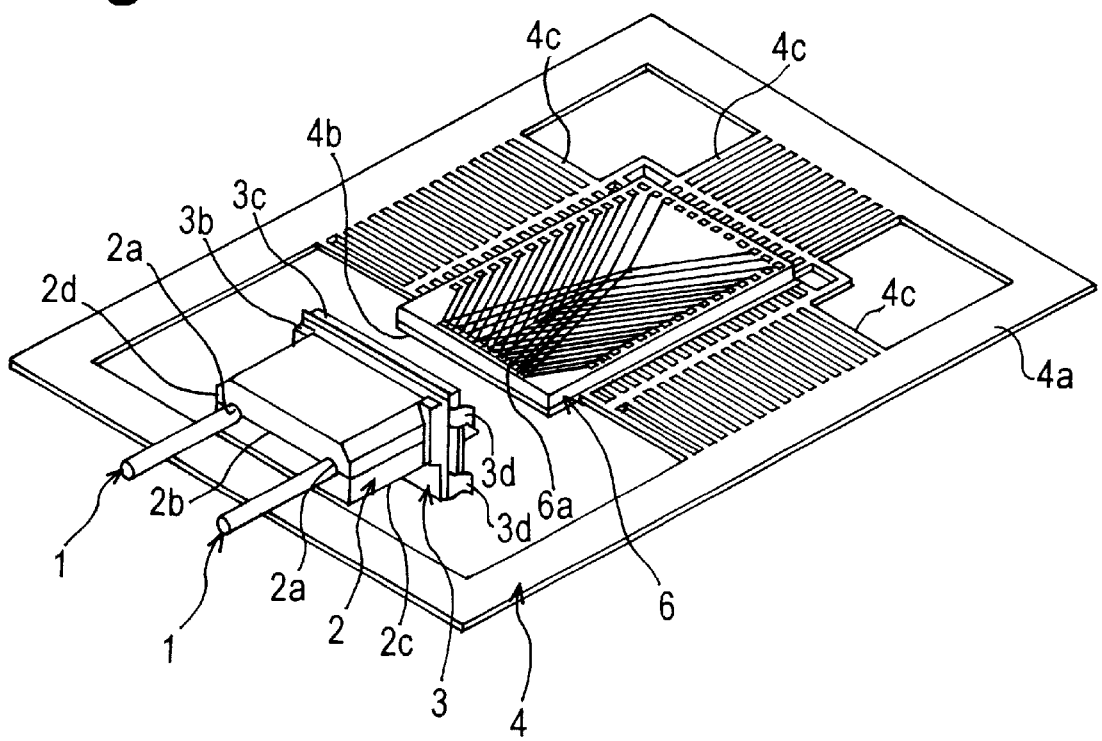
FIG. 2 is a perspective view showing a PD subcarrier 3 usable for the optical parallel transmission receiver according to an embodiment of the present invention, which is viewed from an MT ferrule 2 side.
Figure 3:
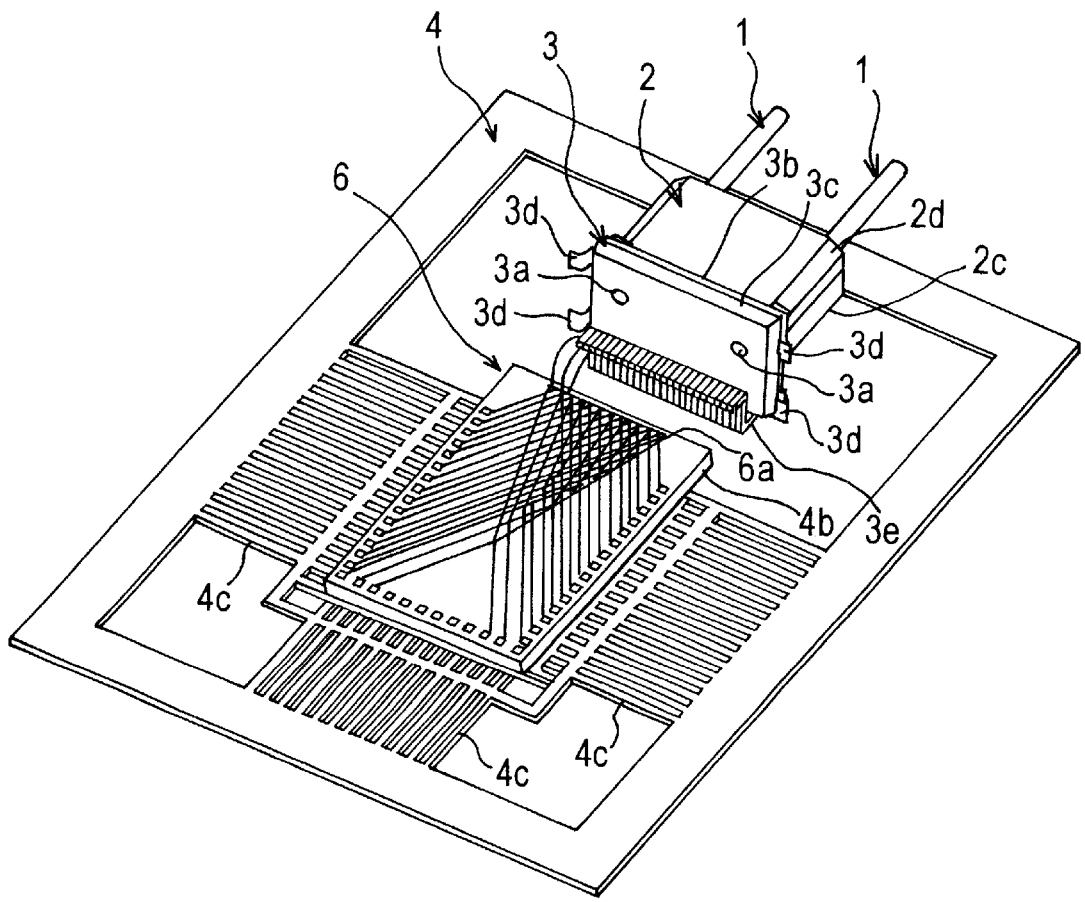
FIG. 3 is a perspective view showing the PD subcarrier 3 usable for the optical parallel transmission receiver according to an embodiment of the present invention, which is viewed from the rear side.

FIGS. 2 and 3 are perspective views showing the optical parallel transmission receiver according to this embodiment before resin molding. FIG. 2 is a perspective view showing the PD subcarrier 3 viewed from the MT ferrule 2 side. FIG. 3 is a perspective view showing the PD subcarrier 3 viewed from the rear side. FIGS. 2 and 3 are schematic views aiming at clarity. For example, only some wires for connecting the PD subcarrier 3 and a ceramic substrate 6 are illustrated.

The guide pins 1 and lead frame 4 are held by a mold for resin molding whereby the relative position between the guide pins 1, MT ferrule 2, PD subcarrier 3, lead frame 4, and ceramic substrate 6, which are fixed by the mold package 5, is accurately realized. At this stage, the guide pins 1, MT ferrule 2, and PD subcarrier 3 are accurately assembled with reference to the guide pins 1.

The guide pins 1 are normally formed from a metal and have a length longer than at least the total length of the MT ferrule 2 and PD subcarrier 3 combined with each other. Another MT ferrule (not shown) is inserted on the guide pins 1 projecting from the MT ferrule 2. To facilitate insertion, the distal ends of the guide pins 1 are tapered. The guide pins 1 inserted into the MT ferrule 2 are not fixed. However, to prevent the other MT ferrule from removing the guide pins 1 when the other MT ferrule is detached, the guide pins 1 are held in the MT ferrule 2 by a certain force. A plurality of V-grooves are formed between the guide pins 1 at a predetermined interval in parallel to the longitudinal direction of the guide pins 1. A plurality of optical fibers are fixed in the grooves. Hence, the plurality of optical fibers are arrayed at a predetermined pitch that normally matches the standard of the other MT ferrule.

The MT ferrule 2 has at least a function of holding a plurality of optical fibers and guide pins. For this purpose, the MT ferrule 2 has fiber holding portions corresponding to the number of optical fibers to be held and pin holding portions corresponding to the number of guide pins to be held. The detailed structure will be described later with reference to FIG. 8.

The PD subcarrier 3 is constructed by two, first flat plate 3b and second flat plate 3c forming a pair of through holes 3a and formed from a plastic, and a metal lead frame having, at some portions, heat dissipation lead pins 3d and connecting lead pins 3e and sandwiched between the first flat plate 3b and the second flat plate 3c, and is attached between the MT ferrule 2 and the ceramic substrate 6 with reference to the guide pins 1. To accurately position the PD subcarrier 3 with respect to the MT ferrule 2, the through holes 3a each for receiving one end of a corresponding one of the guide pins 1 are formed in the PD subcarrier 3 to extend from the surface of the PD subcarrier 3, which opposes the MT ferrule 2, to the opposite surface (FIG. 3). A light-receiving element array 3f and preamplifier IC 3g are accurately mounted on the PD subcarrier 3 with reference to the through holes 3a. For this reason, the plurality of optical fibers attached to the MT ferrule 2 and the plurality of light-receiving element arrays 3f mounted on the PD subcarrier 3 can be easily accurately optically coupled only by inserting the PD subcarrier 3 on the guide pins 1. The heat dissipation lead pins 3d extending from both sides of the PD subcarrier 3 effectively dissipate heat from the preamplifier, which is transmitted through the metal lead frame. Grounding is also possible using the heat dissipation lead pins 3d. After the PD subcarrier 3 is packaged, the connecting lead pins 3e are bent into an almost S shape (FIG. 3) and easily connected to the ceramic substrate 6 by wire bonding. In this embodiment, the PD subcarrier 3 and ceramic substrate 6 are connected by wires. However, the connecting lead pins 3e and electrode terminals on the ceramic substrate 6 may be directly connected.

The lead frame 4 comprises a support lead 4a which forms a rectangular frame, a die pad 4b on which the ceramic substrate 6 is mounted, and lead pins 4c for connecting the die pad 4b and support lead 4a.

The ceramic substrate 6 is mounted on the die pad 4b of the lead frame 4. The ceramic substrate 6 need not be strictly positioned as far as it is connected to the PD subcarrier 3 by wires. Electronic circuits (signal processing circuit, waveform shaping circuit, amplification circuit, and the like) necessary for driving the light-receiving elements are formed on the upper surface of the ceramic substrate 6.

Figure 4:
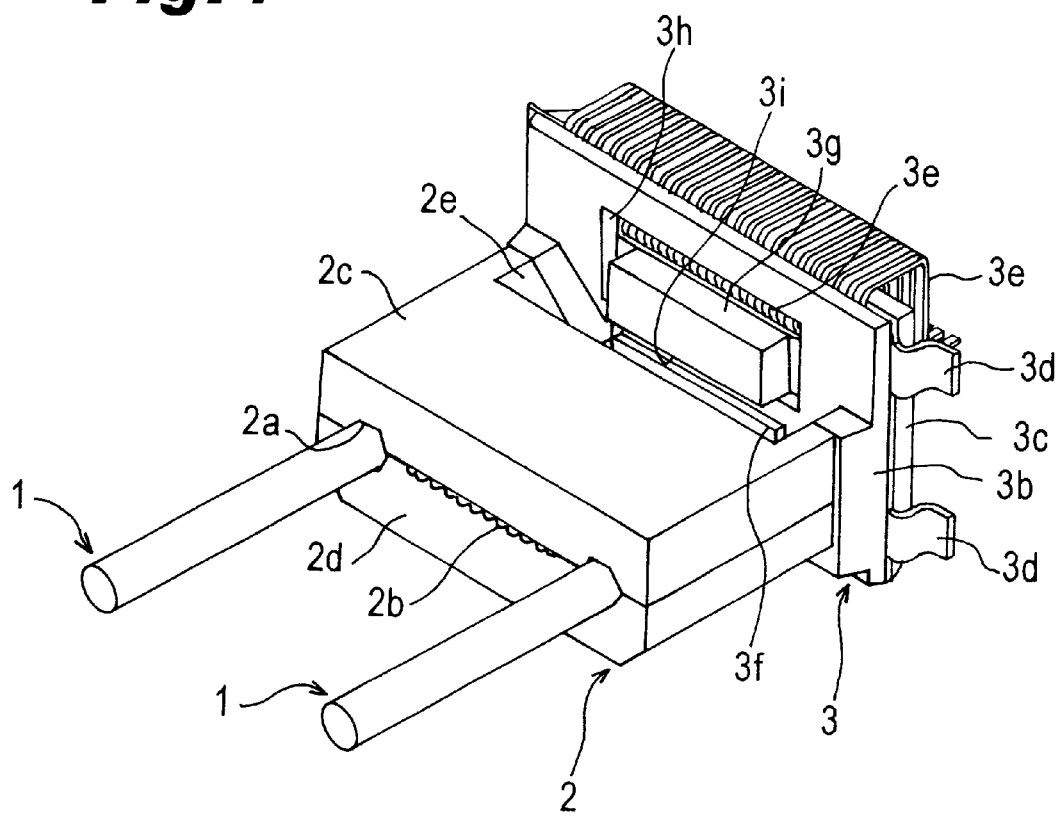
FIG. 4 is a perspective view showing a subassembly combining guide pins 1, MT ferrule 2, and PD subcarrier 3 usable for the optical parallel transmission receiver according to an embodiment of the present invention, which is viewed from the MT ferrule 2 side.
Figure 5:
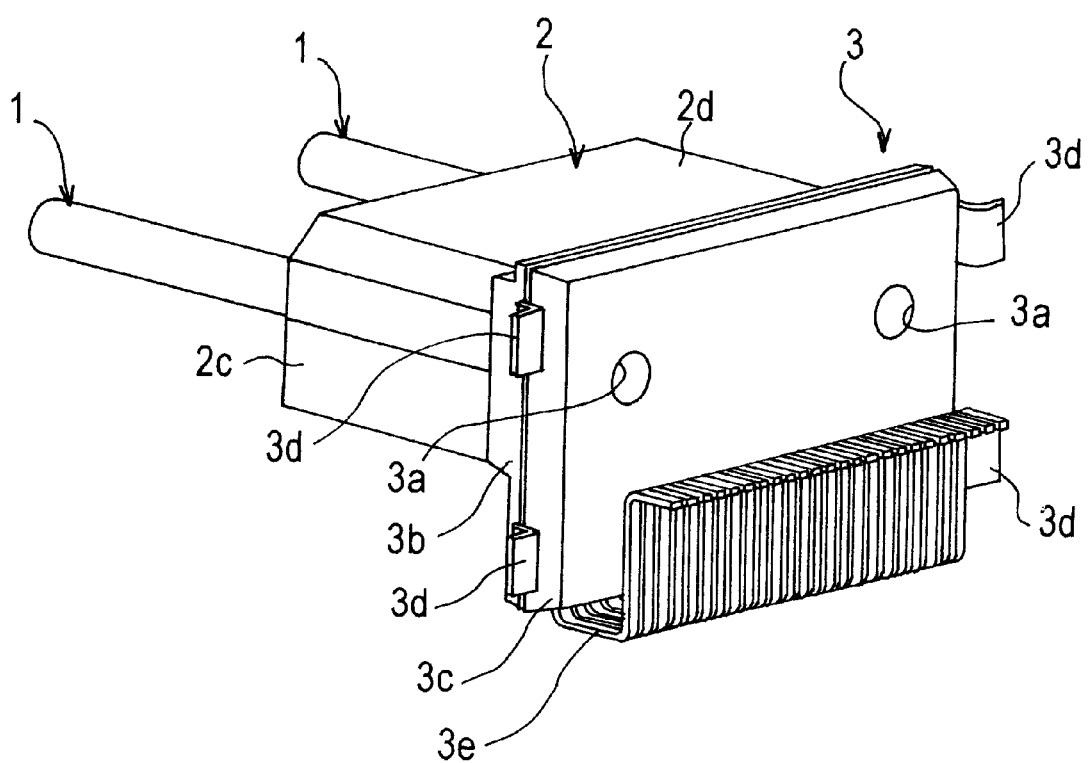
FIG. 5 is a perspective view showing the subassembly shown in FIG. 4, which is upside down and viewed from the PD subcarrier 3 side.
Figure 6:
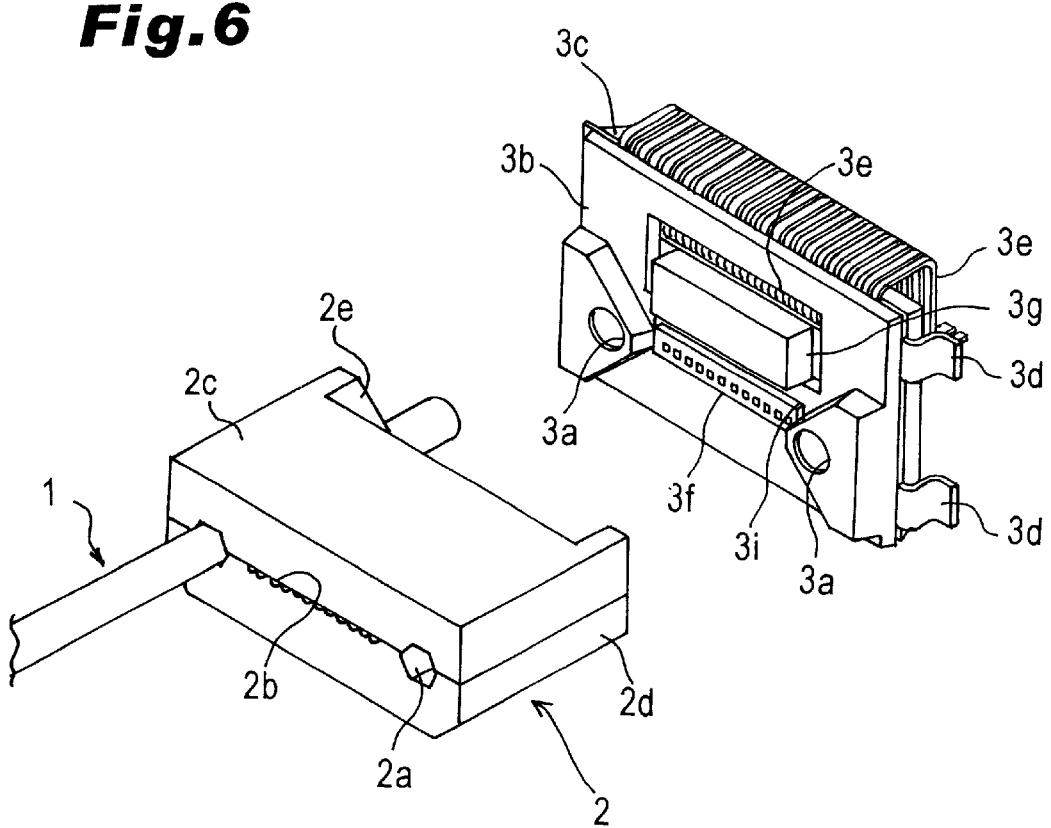
FIG. 6 is a perspective view showing the subassembly shown in FIG. 4, from which the MT ferrule 2 is detached.
Figure 7:
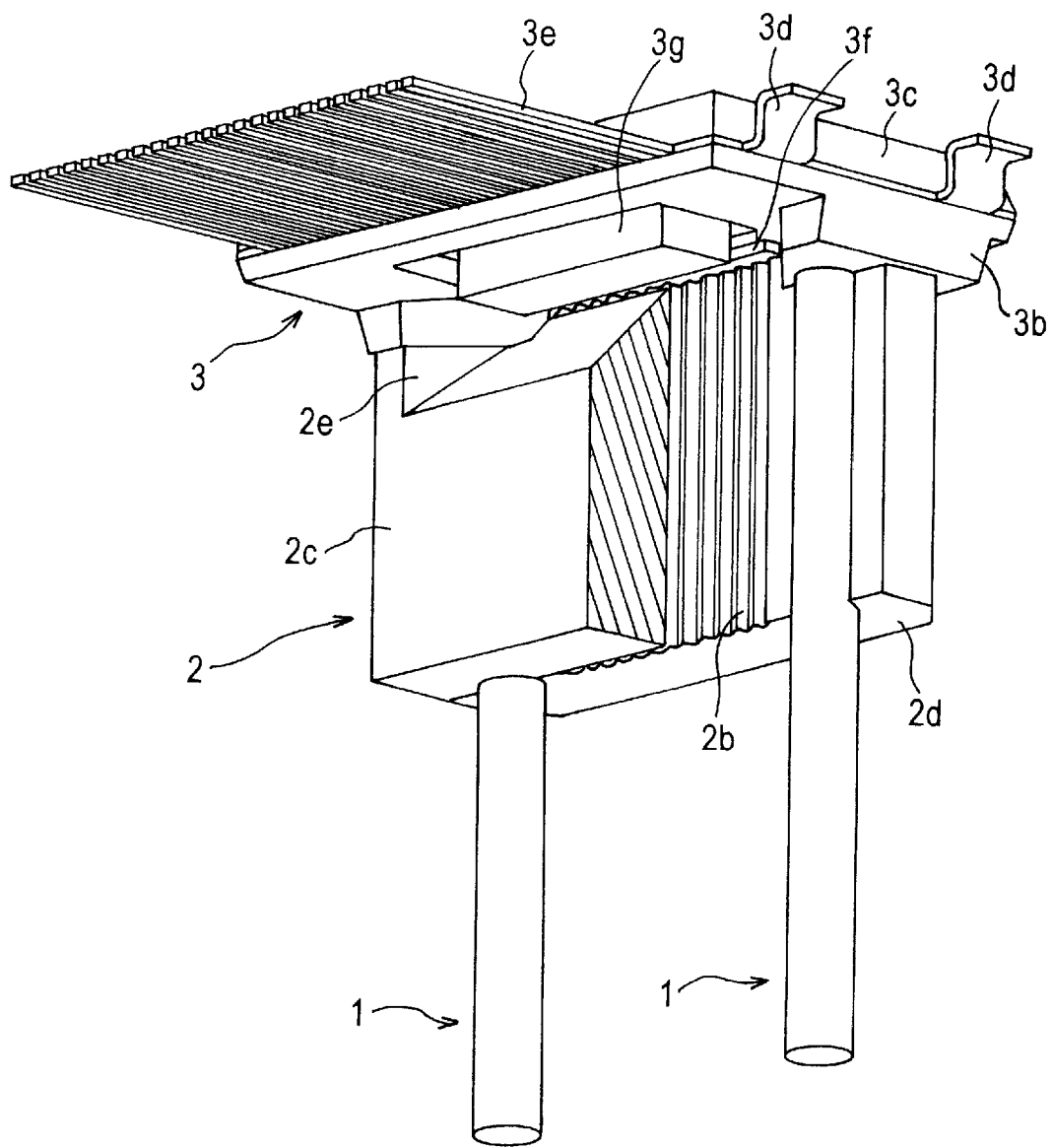
FIG. 7 is a perspective view showing a state before bending connecting lead pins 3e into an almost S shape while omitting the half of a lid 2c of the MT ferrule 2 for the illustrative convenience so as to indicate the connection state between optical fibers and light-receiving elements usable for the optical parallel transmission receiver according to an embodiment of the present invention.

FIG. 4 is a perspective view showing a subassembly combining the guide pins 1, MT ferrule 2, and PD subcarrier 3 usable in this embodiment, which is viewed from the MT ferrule 2 side. FIG. 5 is a perspective view showing the subassembly shown in FIG. 4, which is turned over and viewed from the PD subcarrier 3 side. FIG. 6 is a perspective view showing the subassembly shown in FIG. 4, from which the MT ferrule 2 is removed. FIG. 7 is a perspective view showing a state before bending the connecting lead pins 3e into an almost S shape while omitting the half of a lid 2c of the MT ferrule 2 for the illustrative convenience so as to indicate the connection state between the optical fibers and the light-receiving elements. To clearly indicate details, wires for connecting the connecting lead pins 3e and preamplifier 3f and wires for connecting the light-receiving element array 3f and preamplifier IC 3g are not illustrated.

As an important point, the plurality of optical fibers (e.g., a fiber array) and the plurality of light-receiving elements (e.g., a light-receiving element array) are accurately positioned using the guide pins as a mechanical reference such that the optical fibers and the light-receiving surfaces of the light-receiving elements are perpendicular (optically coupled) to each other. It is difficult to accurately position optical fibers and light-receiving elements held by separate members on the $\mu$m order. However, accurate positioning is realized through the guide pins by accurately forming holes for fixing the guide pins in the two members.

The guide pins 1, MT ferrule 2, and PD subcarrier 3, which construct this subassembly, will be sequentially described on the basis of FIGS. 4 to 7 with reference to FIGS. 8 to 11.

Figure 8:
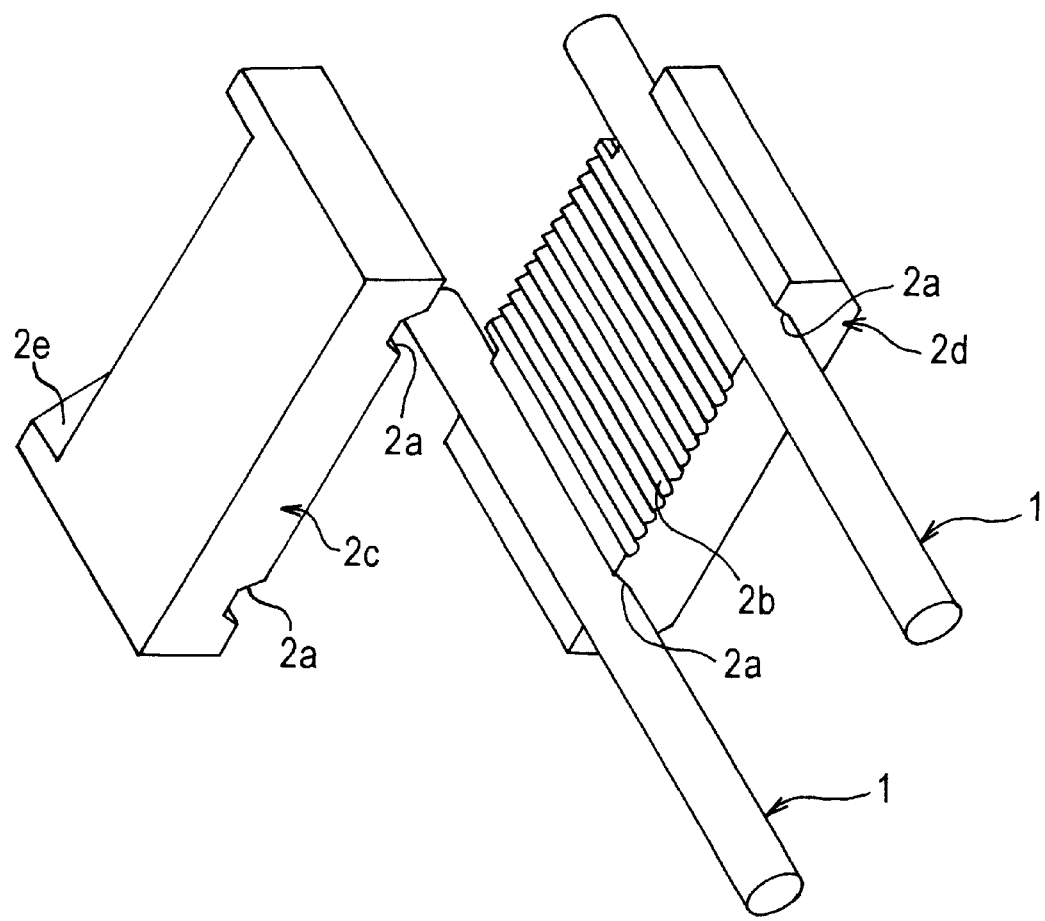
FIG. 8 is an exploded perspective view showing the MT ferrule together with the guide pins usable for the optical parallel transmission receiver according to an embodiment of the present invention.

The guide pins 1 are normally formed into a long columnar shape to obtain the function of positioning a plurality of members (MT ferrule 2 and PD subcarrier 3 in this embodiment) to which the guide pins 1 are inserted (FIGS. 7 and 8). As for the material, the guide pins 1 are formed from a material that does not deform and curve under the use environment of the receiver, e.g., stainless steel. The projecting amount of the guide pins 1 from the MT ferrule 2 is calculated in consideration of connection and optical axis alignment to the MT connector or MT ferrule on the partner side, which is inserted to the guide pins 1. The length of each guide pin 1 is determined on the basis of the calculated value.

The MT ferrule 2 comprises the lid 2c and a fiber holding member 2d (FIGS. 6 and 8). The two plate members, i.e., the lid 2c and fiber holding member 2d are abutted against each other. The pair of guide pins 1 and the plurality of optical fibers are held between the abutment surfaces. For this purpose, each of the lid 2c and fiber holding member 2d has a pair of trapezoidal grooves which form a pair of through holes 2a for receiving the pair of guide pins 1, and the fiber holding member 2d has V-grooves 2b for holding the plurality of optical fibers (FIGS. 6 and 8). Since these grooves are formed parallel to each other, the guide pins 1 inserted into the MT ferrule 2 and all the optical fibers held by the MT ferrule 2 are held in parallel. A recess 2e is formed on a side where the MT ferrule 2 opposes the PD subcarrier 3 so as to prevent interference with wires for connecting the light-receiving element array 3f and preamplifier IC 3g.

Figure 9:
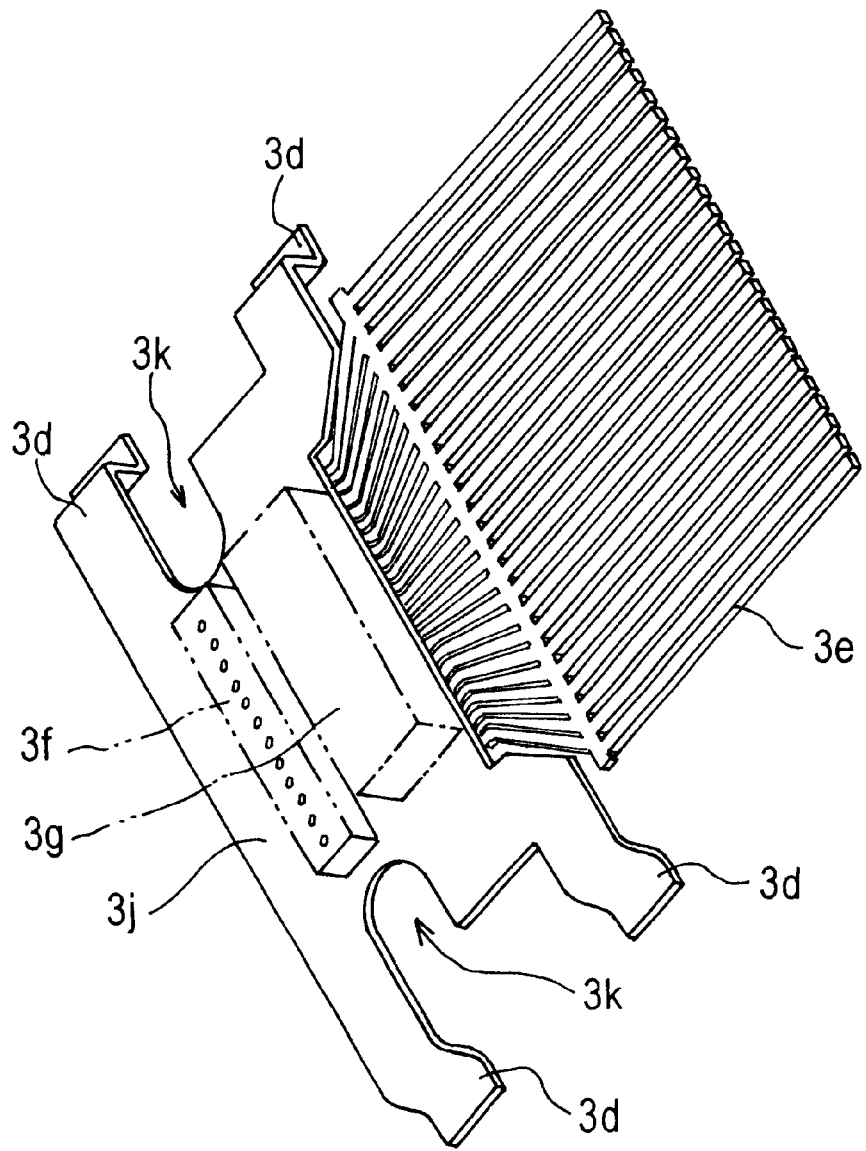
FIG. 9 is a perspective view showing a metal lead frame as a constituent component of the PD subcarrier 3 usable for the optical parallel transmission receiver according to an embodiment of the present invention.
Figure 11:
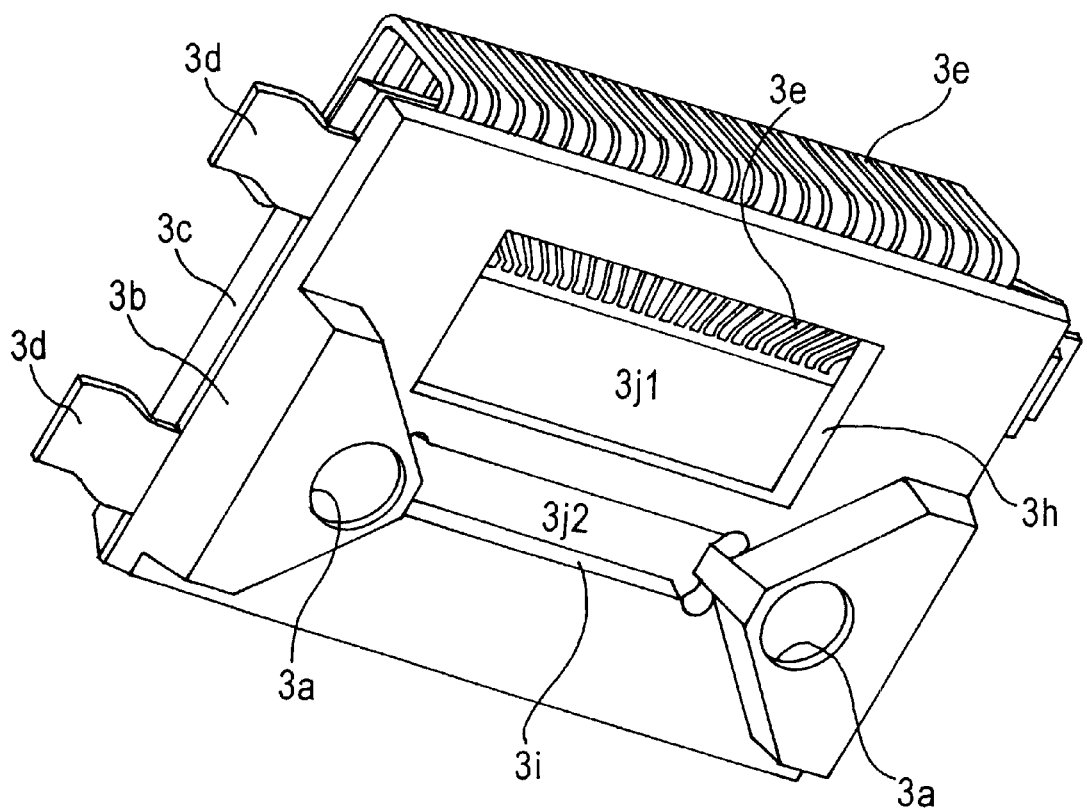
FIG. 11 is a perspective view showing a state wherein the connecting lead pins 3e shown in FIG. 10 are bent.

The PD subcarrier 3 comprises the first flat plate 3b, second flat plate 3c, and lead frame (FIGS. 6 and 11). The first flat plate 3b is formed from a plastic material and has a rectangular outline. A first opening portion 3h for mounting the preamplifier IC 3g is formed on the upper side (or lower side) of the central portion of the first flat plate 3b. A second opening portion 3i for mounting the light-receiving element array 3f holding a plurality of upper-incident-type light-receiving elements is formed on the lower side (or upper side). The first opening portion 3h has a sufficient size to accommodate the preamplifier IC 3g. The second opening portion 3i has an opening shape conforming to the shape of the light-receiving element array 3f such that the optical fibers held by the MT ferrule 2 and the light-receiving element array 3f are accurately positioned with respect to the guide pins 1. For this purpose, hexagonal projecting portions having the holes 3a for receiving the guide pins 1 for positioning are formed on both sides of the second opening portion 3i. The lead frame includes the large number of connecting lead pins 3e extending in one direction (e.g., downward), the small number of heat dissipation lead pins 3d extending in different directions (e.g., lateral directions), and die pad portions 3j1 and 3j2 on which the light-receiving element array 3f and preamplifier IC 3g are placed, and is sandwiched between the two first flat plate 3b and second flat plate 3c (FIGS. 6 and 11). One end of each of the connecting lead pins 3e is bent into an almost S shape and directed to the ceramic substrate 6 so as to connect a signal source, ground, VDD, or VGC. The other end extends to the first opening portion 3h (FIGS. 4 and 11). The preamplifier IC 3g is formed into an almost parallelepiped chip shape (FIGS. 4 and 9) and has electrodes (not shown) formed on the upper surface. For this reason, the preamplifier IC 3g can be easily connected to the other end of each connecting lead pin 3e by wire bonding. The second flat plate 3c has a function of sandwiching the lead frame with the first flat plate 3b and fixing the lead frame and has, as opening portions, only the through holes 3a for receiving the guide pins 1 (FIG. 5). The guide pins 1 extend through not only the first flat plate 3b but also the second flat plate 3c. Hence, the metal lead frame sandwiched between the plates has recess portions for passing the guide pins 1 (FIG. 9). The preamplifier IC 3g and light-receiving element array 3f are not in contact with the second flat plate 3c and come into surface contact with the metal lead frame (FIG. 9). For this reason, e.g., heat from the preamplifier IC 3g can be efficiently dissipated through the lead pins 3d.

The structures of the MT ferrule 2 and PD subcarrier 3, which construct the subassembly, will be described next in more detail with reference to FIGS. 8 to 11.

FIG. 8 is an exploded perspective view showing the MT ferrule together with the guide pins. A pair of trapezoidal grooves are formed in parallel in the lower surface of the lid 2c of the MT ferrule 2, i.e., the surface opposing the fiber holding member 2d, in regions close to the side portions. The depth of the grooves is calculated and determined such that the guide pins 1 do not move in the through holes 2a that are formed when the lid 2c is combined with the fiber holding member 2d. A flat surface is formed between the trapezoidal grooves and presses the upper surfaces of the optical fibers held by the fiber holding member 2d. The fiber holding member 2d has trapezoidal grooves with the same shape as that of the grooves in the lid 2c at positions corresponding to the trapezoidal grooves formed in the lid 2c. Hence, when the two members are stacked, the through holes 2a fitted on the guide pins 1 are formed. The V-grooves 2b in number corresponding to the number of optical fibers to be held are formed in parallel between the two trapezoidal grooves formed in the upper surface of the fiber holding member 2d (FIG. 8). The V-grooves 2b are formed using the trapezoidal grooves as a mechanical reference. An optical fiber longer than each V-groove 2b is arranged in each V-groove 2b. The lid 2c is fixed to the fiber holding member 2d with an adhesive while keeping the guide pins 1 removed, and after that, the guide pins 1 are inserted. After the optical fibers are held by the lid 2c and fiber holding member 2d, the lengths of optical fibers projecting from the V-grooves 2b are uniformed by end face polishing.

FIG. 9 is a perspective view showing the metal lead frame as a constituent component of the PD subcarrier 3. The light-receiving element array 3f and preamplifier IC 3g indicated by the alternate long and two-dashed lines are shown to indicate the positional relationship between the lead frame and the die pad portions 3j1 and 3j2 on which the light-receiving element array 3f and preamplifier IC 3g are placed. As shown in FIG. 9, the two die pad portions 3j1 and 3j2 are formed adjacent to each other. The connecting lead pins 3e extend close to the die pad portion 3j1 where the preamplifier IC 3g is placed. For this reason, the wires required to connect the light-receiving element array 3f and preamplifier IC 3g, and the preamplifier IC 3g and connecting lead pins 3e are short, and wire bonding is easy. For wire bonding, electrode pads on the light-receiving element array 3f and preamplifier IC 3g may be heated to a predetermined temperature, e.g., 170° C. using the heat conduction effect through the lead frame. The four lead pins 3d extending in the lateral directions perpendicular to the longitudinal direction of the connecting lead pins 3e are mainly provided for heat dissipation. However, a ground function may be imparted using these terminals. Recess portions 3k for passing the guide pins 1 are formed between the pairs of lead pins 3d extending in the lateral directions.

In this embodiment, a single lead frame is used. However, separate lead frames may be prepared for the light-receiving element array and preamplifier IC. When separate lead frames are used, thermal influence from the preamplifier IC 3g which generates a large amount of heat on the light-receiving element array 3f can be eliminated.

Figure 10:
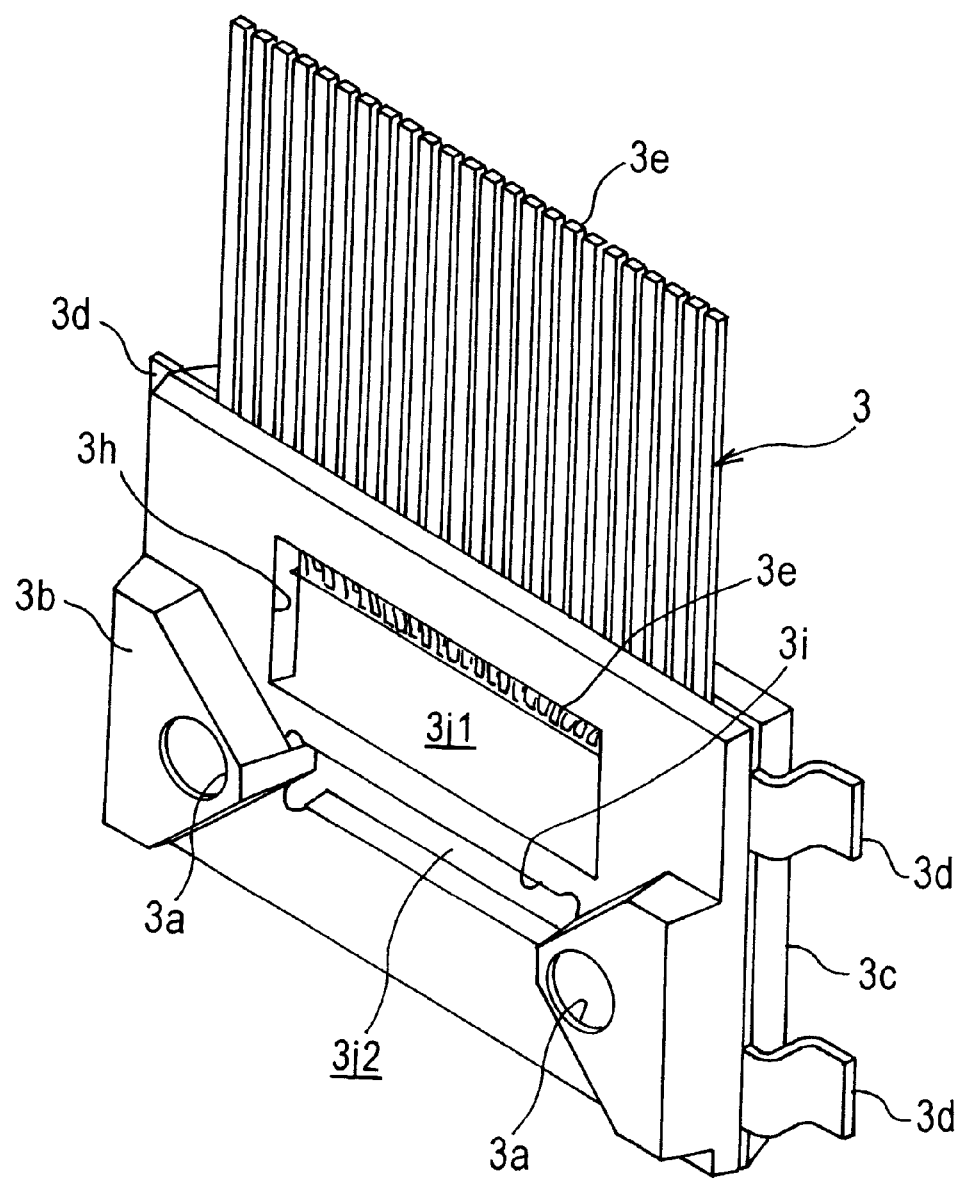
FIG. 10 is a perspective view showing a state wherein the metal lead frame usable for the optical parallel transmission receiver according to an embodiment of the present invention is sandwiched and fixed between a first flat plate 3b and a second flat plate 3c.

FIG. 10 is a perspective view showing a state wherein the above-described metal lead frame is sandwiched and fixed between the first flat plate 3b and second flat plate 3c. FIG. 11 is a perspective view showing a state wherein the connecting lead pins 3e shown in FIG. 10 are bent.

As an important point, the second opening portion 3i for receiving the light-receiving element array 3f is highly accurately (at an accuracy of 1 μm or less) positioned and formed in consideration of the outer dimensions of the light-receiving element array 3f with reference to the positioning holes 3a for receiving the guide pins 1. The accuracy required herein can be obtained by resin molding (e.g., plastic insert molding or transfer molding). Hence, in realizing the high accuracy, a plastic can be advantageously used as the material of the first flat plate 3b and second flat plate 3c. In addition, the plastic material has no problem of parasitic capacitance and improves the performance, as compared to the conventional silicon substrate accurately microfabricated. Furthermore, since the material is inexpensive, the cost of products is expected to be lower.

On the other hand, the positional accuracy of the first opening portion 3h can be lower than that of the second opening portion 3i because there is no restriction for optical coupling to optical fibers, and the preamplifier IC 3g is connected to the light-receiving element array 3f and connecting lead pins 3e by wire bonding. For this reason, the first opening portion 3h is formed to have a relatively large size (to have a width of about 2 mm although the width of the preamplifier IC mounting surface is about 1 mm) such that the jig (e.g., a collet) for wire bonding can be used without any problem. The interval between the first opening portion 3h and the second opening portion 3i is preferably small because of the requirement for connection using short wires. However, the width is set so large (e.g., about 0.5 mm) as to maintain the strength capable of standing resin molding. That is, it is most important to accurately form the second opening portion 3i. The four corners of the second opening portion 3i correspond to the corner portions of the light-receiving element array 3f. To eliminate the influence of odd shapes of the corner portions of the light-receiving element array 3f to be accommodated in the second opening portion 3i, the portions corresponding to the corner portions are largely cut. As is known, chips and flashes easily form at the corners of an array (normally a semiconductor chip) to readily make odd shapes. Hexagonal projecting portions for positioning the guide pins 1 and preventing interference of bonding wire are formed on both sides of the second opening portion 3i. The through holes 3a for receiving the guide pins 1 are formed in the hexagonal projecting portions. By forming the guide pin positioning projecting portions into a hexagonal shape, a space that allows the wire bonding jig to access is ensured to facilitate wire bonding between the light-receiving element array 3f and the preamplifier IC 3g. To easily insert the guide pins 1, the inlets of the through holes 3a are tapered.

Figure 12:
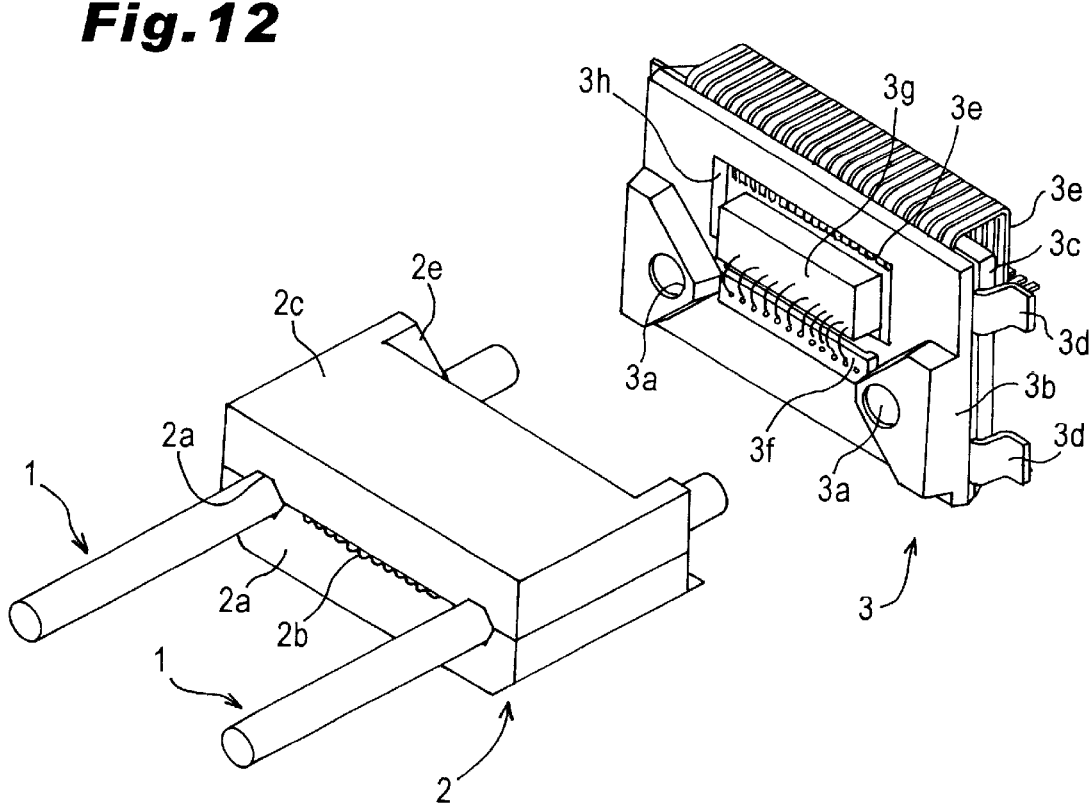
FIG. 12 is a perspective view showing, together with the guide pins 1 and MT ferrule 2, a state wherein a light-receiving element array 3f and preamplifier IC 3g are mounted on die pad portions 3j1 and 3j2 shown in FIG. 11, respectively, and connected by wire bonding.

FIG. 12 is a perspective view showing, together with the guide pins 1 and MT ferrule 2, a state wherein the light-receiving element array 3f and preamplifier IC 3g are mounted on the die pad portions 3j1 and 3j2 shown in FIG. 11, respectively, and connected by wire bonding.

In the MT ferrule 2, all optical fibers are accurately positioned with reference to the through holes 2a in which the guide pins 1 are to be inserted and fixed. Similarly, in the PD subcarrier 3, all the light-receiving elements of the light-receiving element array 3f are accurately positioned with reference to the through holes 3a in which the guide pins 1 are to be inserted and fixed. Hence, only by inserting the guide pins 1 into the through holes 2a and 3a, the plurality of optical fibers and the plurality of light-receiving elements are accurately optically coupled.

The optical parallel transmission receiver according to an embodiment of the present invention has been described with reference to FIGS. 1 to 12. However, the present invention is not limited to the above embodiment, and various changes and modifications can be made.

For example, in this embodiment, the light-receiving element array 3f uses a light-receiving element array structure using front-incident-type light-receiving elements (FIG. 12). However, so-called back-incident-type light-receiving elements may be employed.

Figure 13:
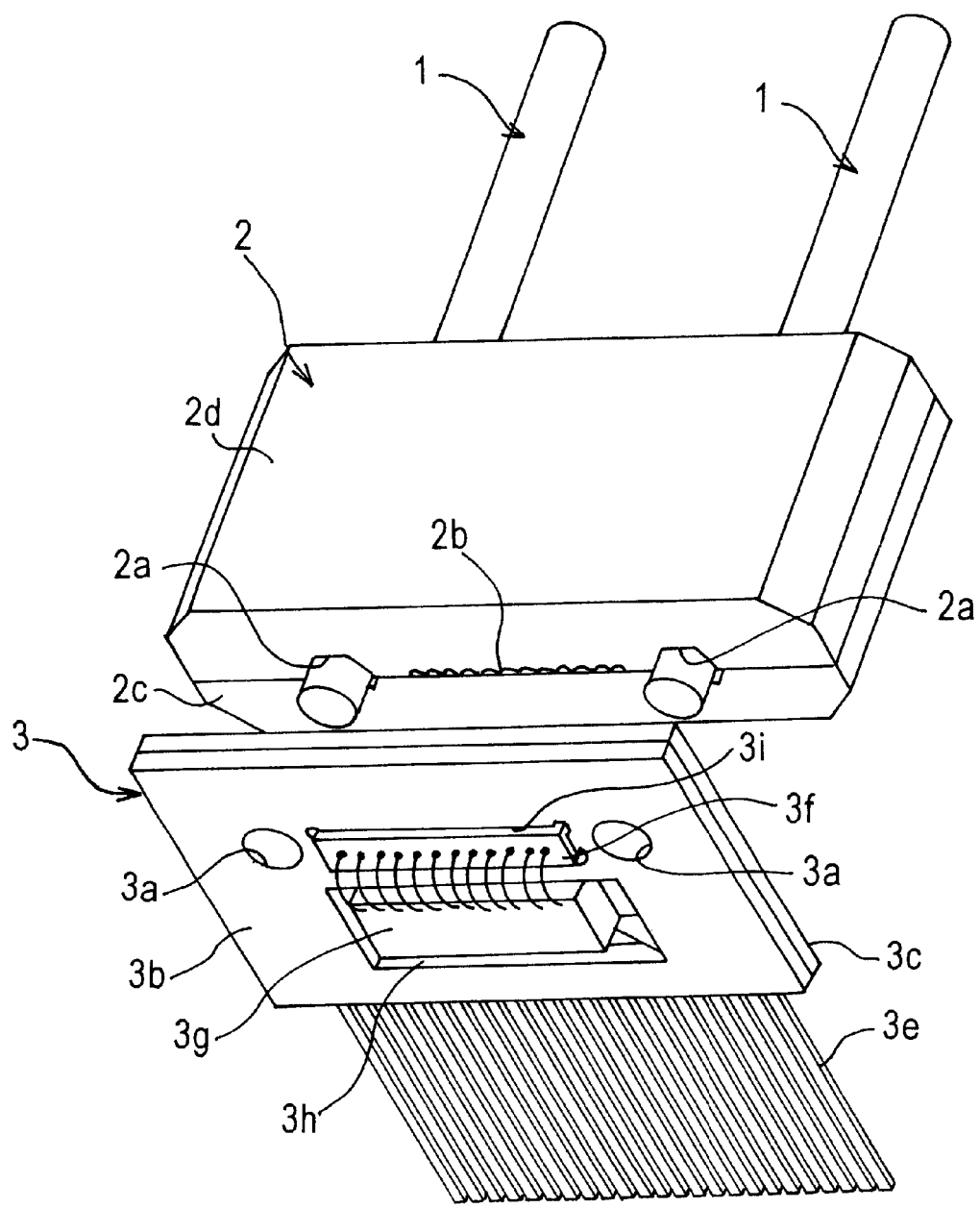
FIG. 13 is a perspective view showing, together with the MT ferrule 2, the PD subcarrier 3 using back-incident-type light-receiving elements, which is usable for the optical parallel transmission receiver according to an embodiment of the present invention.
Figure 14:
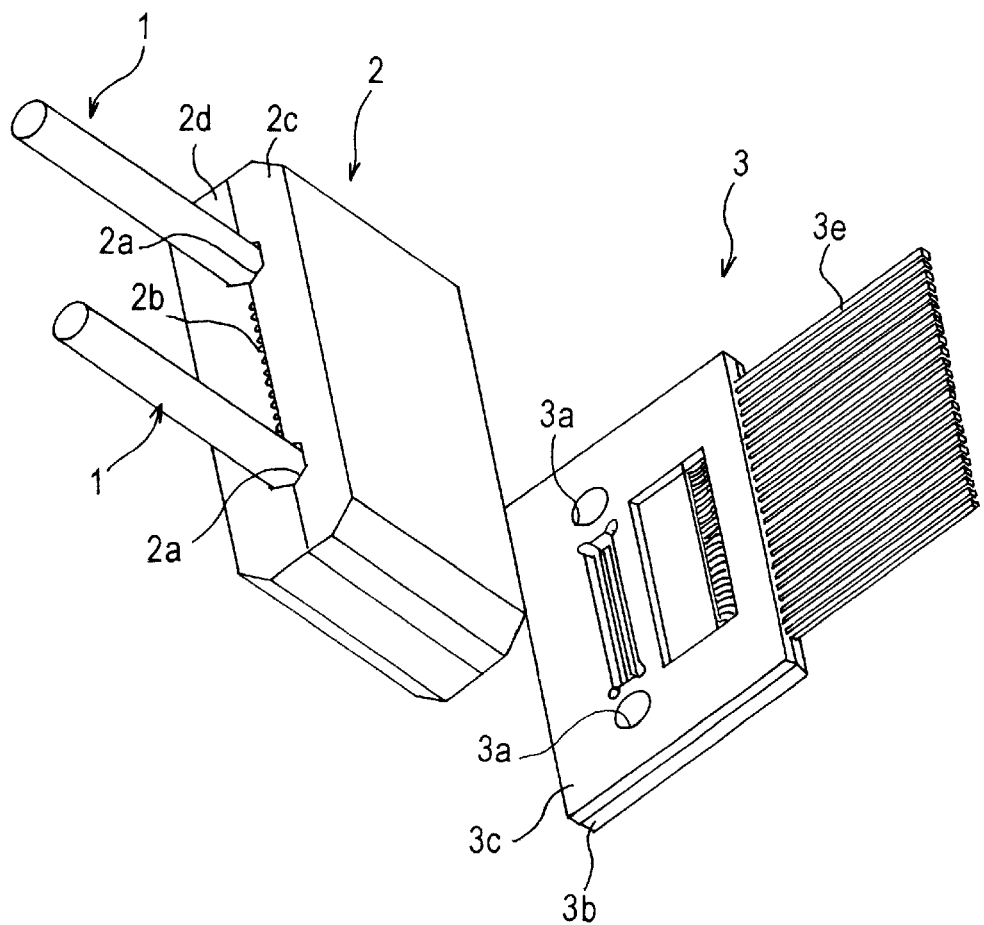
FIG. 14 is a perspective view showing the PD subcarrier 3 shown in FIG. 13, which is viewed from the lower side.

FIG. 13 is a perspective view showing, together with the MT ferrule 2, the PD subcarrier 3 using back-incident-type light-receiving elements. FIG. 14 is a perspective view showing the PD subcarrier 3 shown in FIG. 13, which is viewed from the back side. The differences from the above-described embodiment are as follows. First, since interference of wire bonding need not be prevented, no hexagonal projecting portions are formed on the MT ferrule 2 and first flat plate 3b. Second, to receive light emerging from the optical fibers by the opposite surface (lower surface) of the upper surface on which the electrode pads are formed, the second flat plate 3c also has an opening portion.

The light emerging from the optical fibers passes through the opening portion of the second flat plate 3c and becomes incident on the light-receiving surface of the back-incident-type light-receiving element array 3f. An electrical signal photoelectrically converted by the light-receiving element array 3f is transmitted to the preamplifier IC 3g through a wire. The signal transmitted to the preamplifier IC 3g is sent to the connecting lead pin 3e through wire connection. When the back-incident-type light-receiving element array 3f is used, the MT ferrule 2 and PD subcarrier 3 can have simple shapes.

In addition, in the above embodiment, the light-receiving elements and preamplifiers are connected by wires. However, one (e.g., the light-receiving element array) may be mounted on the other (e.g., the preamplifier IC) as a flip chip.

Figure 15:
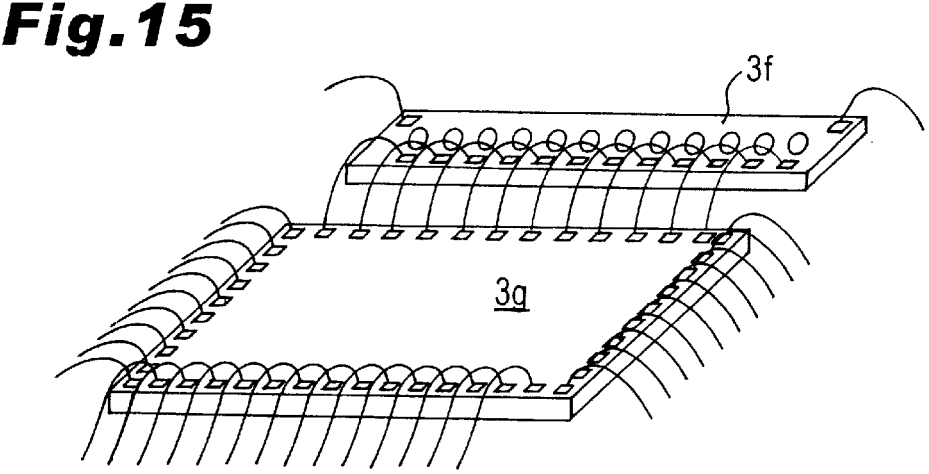
FIG. 15 is a perspective view showing the connection state between the light-receiving element array 3f and the preamplifier IC 3g which are usable for the optical parallel transmission receiver according to an embodiment of the present invention.
Figure 16:
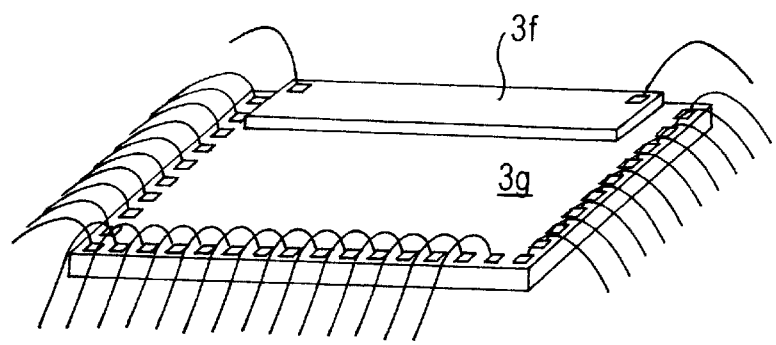
FIG. 16 is a perspective view showing a connection method according to another embodiment, which is usable for the optical parallel transmission receiver according to an embodiment of the present invention.

FIG. 15 is a perspective view showing the connection state between the light-receiving element array 3f and the preamplifier IC 3g used in the above-described embodiment. FIG. 16 is a perspective view showing a connection method according to another embodiment.

The difference between the two methods is that in the above embodiment, the light-receiving element array 3f and preamplifier IC 3g are arranged to be flush with each other, and the electrode pads are connected by wire bonding (FIG. 15) while in the connection structure according to another embodiment, wire bonding between the light-receiving element array 3f and the preamplifier IC 3g is unnecessary because back-incident-type light-receiving elements are directly mounted on preamplifier IC. (FIG. 16).

According to the connection method of another embodiment, the mounting area decreases, and crosstalk between adjacent channels decreases. For example, according to the wire bonding connection method shown in FIG. 15, the mounting area is 3.5 mm×3 mm. However, according to the flip chip connection method shown in FIG. 16, the mounting area is 3.5 mm×1.5 mm.

For crosstalk, experiments were conducted under the following conditions according to FIG. 15. When the input impedance of each channel was 100Ω, the input capacitance of each channel was 0.5 pF, and the capacitance between adjacent channel, which was generated by elements other than wire interconnections was 10 pF, the crosstalk amount for wire bonding correction was −66.7 dB at a frequency of 10 MHz while the crosstalk amount for flip chip connection was −84.0 dB. At a frequency of 100 MHz, the crosstalk amount for wire bonding correction was −46.7 dB while the crosstalk amount for flip chip connection was −64.0 dB. At a frequency of 1 GHz, the crosstalk amount for wire bonding correction was −27.4 dB while the crosstalk amount for flip chip connection was −44.0 dB. Assuming that a dielectric constant $\in_r$ of a resin to be packed is 3.69, a wire length L is $2.0 \times 10^{-3}$ [m], a wire radius r is $1.0 \times 10^{-5}$ [m], and an interwire distance d is $2.5 \times 10^{-4}$ [m], a coupling capacitance C between wire bonds is given by $$C = (27.8 \times \in_r \times L) \times 10^{-12} / ln(d/r) [F]$$

The first, second, and third embodiments of an optical parallel transmission transmitter according to the present invention will be described next with reference to FIGS. 17 to 26, FIGS. 27 to 38, and FIGS. 39 to 49, respectively.

The basic differences between an optical parallel transmission transmitter and an optical parallel transmission receiver are as follows. First, the latter has a structure in which optical fibers and the light-receiving surfaces of light-receiving elements are perpendicular to each other while the former has a structure in which the exit directions of optical fibers and light-emitting elements are substantially the same. Second, the latter has the problem of optical axes of the core diameter (about 9 $\mu$m for a single-mode optical fiber) of an optical fiber and the light-receiving surface (about 100 $\mu m^2$) while the former requires optical axis matching between a light-emitting element and the core diameter of an optical fiber, and therefore highly accurate positioning.

An optical parallel transmission transmitter according to the first embodiment will be described below. The same reference numerals denote components having the same functions throughout the drawings, and a detailed description thereof will be omitted.

Figure 17:
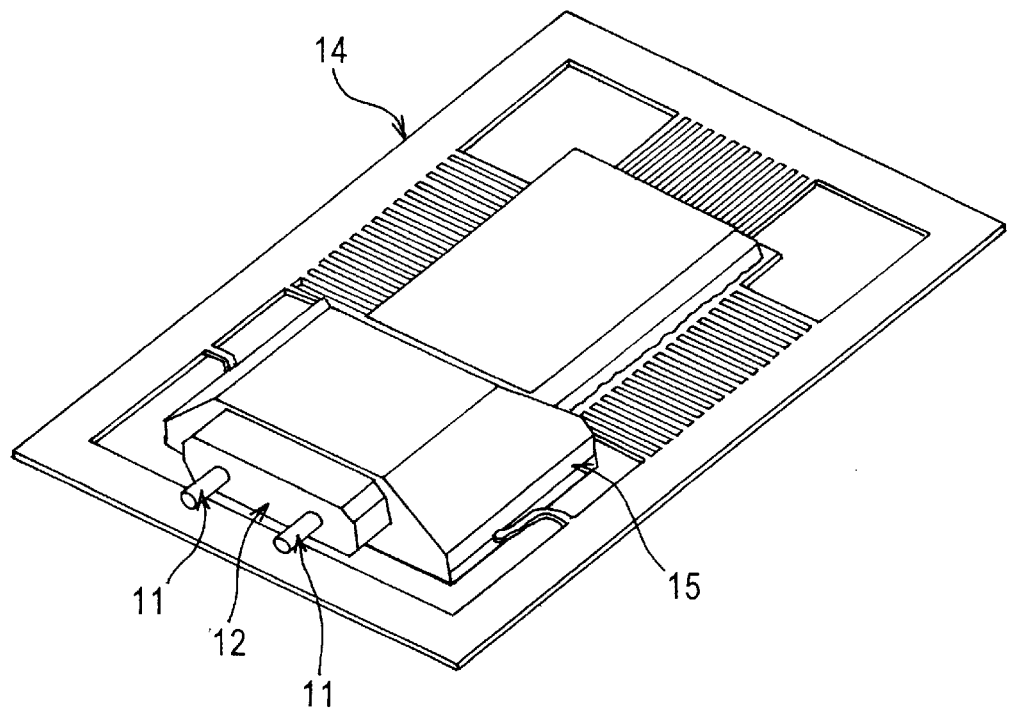
FIG. 17 is a perspective view showing an optical parallel transmission transmitter immediately after resin molding, which is usable for an optical parallel transmission transmitter according to the first embodiment of the present invention.

FIG. 17 is a perspective view showing the optical parallel transmission transmitter immediately after resin molding. For this optical parallel transmission transmitter according to this embodiment, a pair of guide pins 11, an MT ferrule 12 for holding multiple optical fibers, and an LD subcarrier 13 for holding light-emitting elements are resin-molded together with a lead frame 14, thereby constructing a mold package 15.

After that, leads extending from the sides and rear side of the mold package 15 are cut in front of support leads, and tie bars between the leads are cut.

In this embodiment, the mold package 15 is used to fix the elements. However, a metal package or plastic package may be used to fix the elements.

Figure 18:
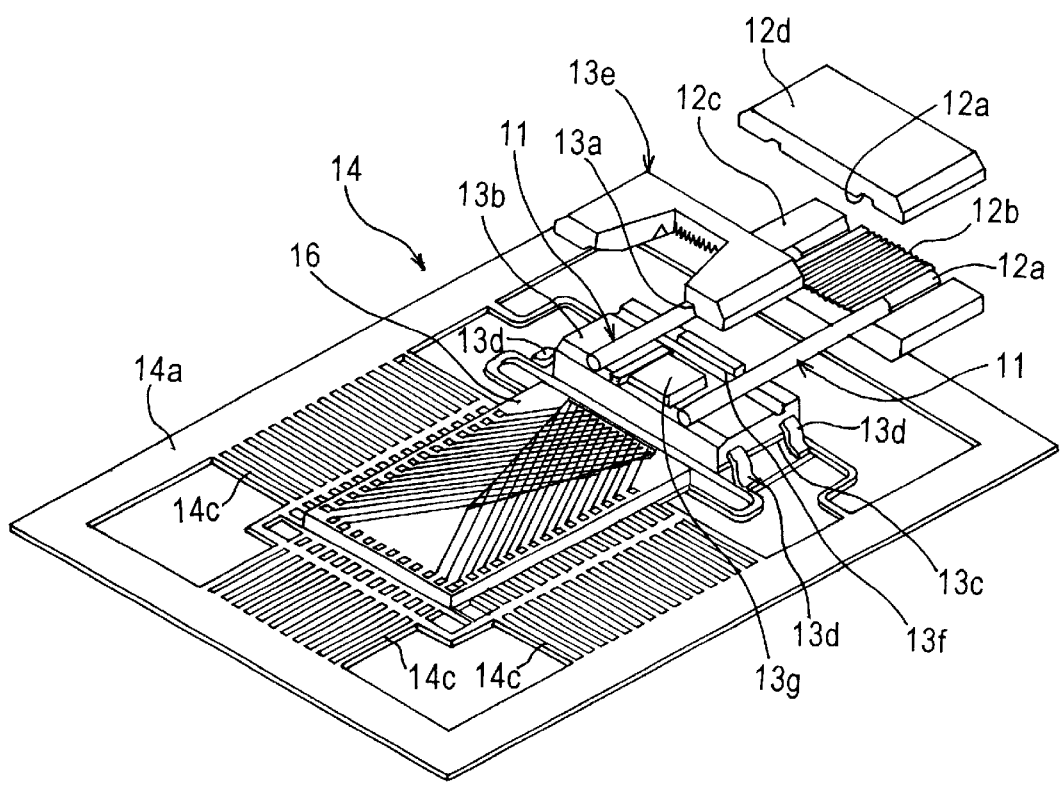
FIG. 18 is an exploded perspective view showing the internal structures of an MT ferrule 12 and LD subcarrier 13 before resin molding, which are usable for the optical parallel transmission transmitter according to the first embodiment of the present invention.
Figure 19:
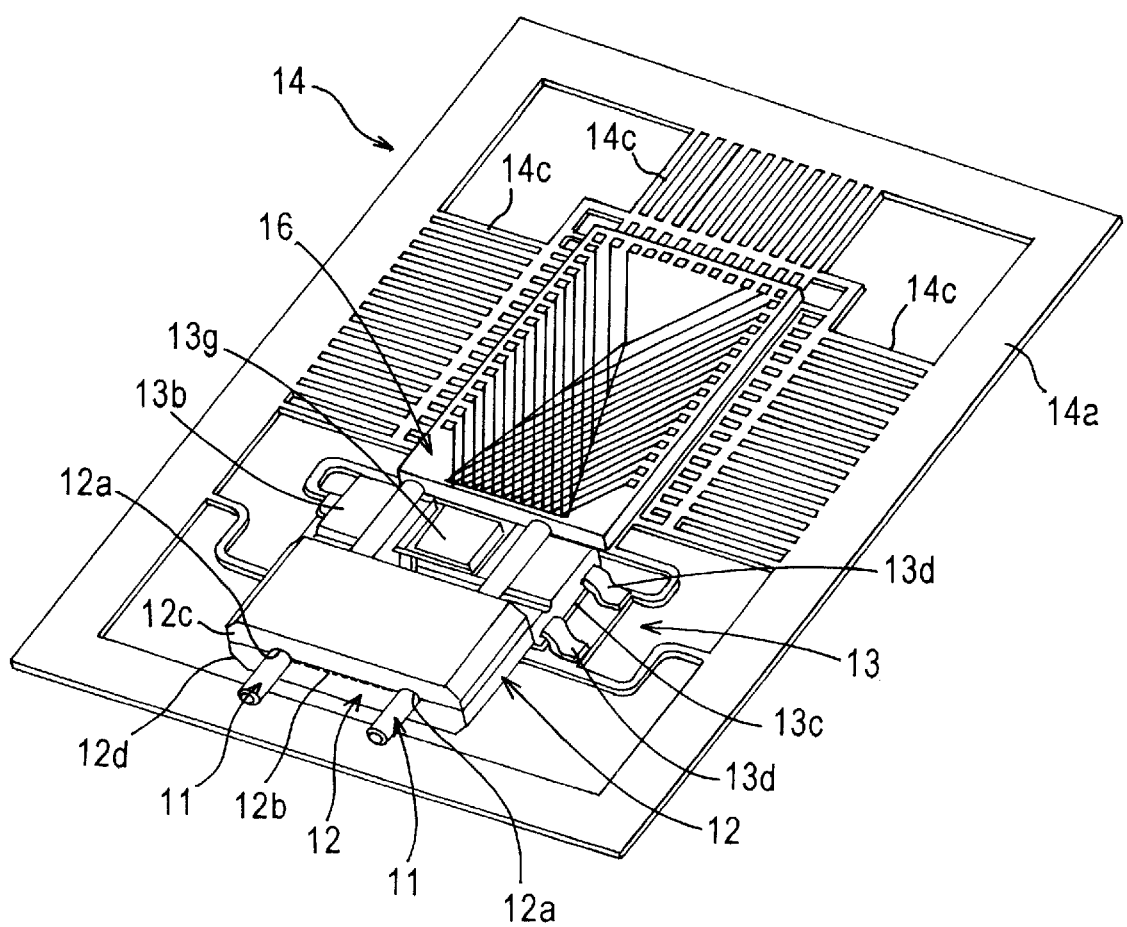
FIG. 19 is a perspective view showing a state wherein the lid of the LD subcarrier 13 usable for the optical parallel transmission transmitter according to the first embodiment of the present invention is omitted.

FIGS. 18 and 19 show the optical parallel transmission transmitter according to this embodiment before resin molding. FIG. 18 is an exploded perspective view showing the internal structures of the MT ferrule 12 and LD subcarrier 13. FIG. 19 is a perspective view showing a state wherein the lid of the LD subcarrier 13 is omitted. FIGS. 18 and 19 are schematic views aiming at clarity. For example, wires for connecting the LD subcarrier 13 and a ceramic substrate 16 are not illustrated.

The guide pins 11 and lead frame 14 are held by a mold for resin molding whereby the relative position between the guide pins 11, MT ferrule 12, LD subcarrier 13, lead frame 14, and ceramic substrate 16, which are fixed by the mold package 15, is accurately realized. At this stage, the guide pins 11, MT ferrule 12, and LD subcarrier 13 are accurately assembled with reference to the guide pins 11.

The guide pins 11 are normally formed from a metal and have a length longer than at least the total length of the MT ferrule 12 and LD subcarrier 13 juxtaposed each other. Another MT connector (not shown) is inserted on the guide pins 11 projecting from the MT ferrule 12. To facilitate insertion, the distal ends of the guide pins 11 are tapered. The guide pins 11 inserted into the MT ferrule 12 are not fixed. However, to prevent the other MT connector from removing the guide pins 11 when the other MT connector is detached, the guide pins 11 are held in the MT ferrule 12 by a certain force. A plurality of V-grooves are formed between the guide pins 11 at a predetermined interval in parallel to the longitudinal direction of the guide pins 11. A plurality of optical fibers are fixed in the grooves. Hence, the plurality of optical fibers are arrayed at a predetermined pitch that normally matches the standard of the other MT connector.

The MT ferrule 12 has at least a function of holding a plurality of optical fibers and the guide pins 11. For this purpose, the MT ferrule 12 has fiber holding portions corresponding to the number of optical fibers to be held and pin holding portions corresponding to the number of guide pins 11 to be held. The detailed structure will be described later with reference to FIGS. 21 and 22.

The LD subcarrier 13 is constructed by two, first flat plate and second flat plate 13b and 13c forming a pair of through holes 13a and formed from a plastic, a metal lead frame having, at some portions, heat dissipation lead pins 13d and sandwiched between the first flat plate 13b and the second flat plate 13c, and a lid 13e, and is attached between the MT ferrule 12 and the ceramic substrate 16 with reference to the guide pins 11. To accurately position the LD subcarrier 13 with respect to the MT ferrule 12, the through holes 13a each for receiving one end of a corresponding one of the guide pins 11 are formed in the LD subcarrier 13. A light-emitting element array 13f and driver IC array 13g are accurately mounted on the LD subcarrier 13 with reference to the through holes 13a. For this reason, the plurality of optical fibers attached to the MT ferrule 12 and the plurality of light-emitting element arrays 13f mounted on the LD subcarrier 13 can be easily accurately optically coupled only by inserting the LD subcarrier 13 on the guide pins 11. The heat dissipation lead pins 13d extending from both sides of the LD subcarrier 13 effectively dissipate heat from the driver, which is transmitted through the metal lead frame. Grounding is also possible using the heat dissipation lead pins 13d. In this embodiment, the LD subcarrier 13 and ceramic substrate 16 are connected by wires. The lid 13e is formed from a plastic material and fixed to the first flat plate 13b by bonding. After that, the guide pins 11 are inserted into the through holes 13a. The guide pins 11 need not be fixed in the through holes 13a.

The lead frame 14 comprises a support lead 14a which forms a rectangular frame, a die pad 14b on which the ceramic substrate 16 is mounted, and lead pins 14c for connecting the die pad 14b and support lead 14a.

The ceramic substrate 16 is mounted on the die pad 14b of the lead frame 14. The ceramic substrate 16 need not be strictly positioned as far as it is connected to the LD subcarrier 13 by wires. Electronic circuits (signal processing circuit, waveform shaping circuit, amplification circuit, and the like) necessary for driving the light-emitting elements are formed on the upper surface of the ceramic substrate 16.

Figure 20:
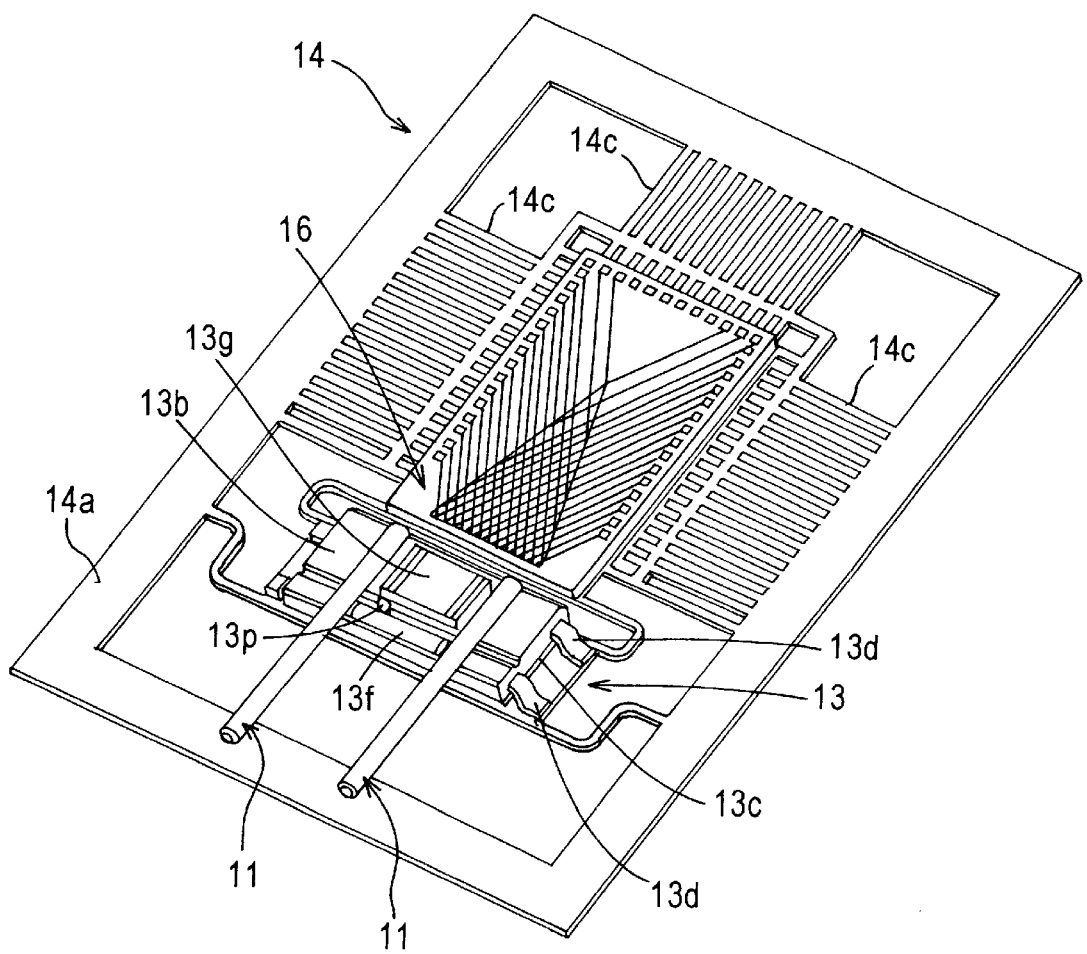
FIG. 20 is a perspective view showing the LD subcarrier 13 usable for the optical parallel transmission transmitter according to the first embodiment of the present invention together with a lead frame 14 and ceramic substrate 16 (corresponding to the optical parallel transmission transmitter shown in FIG. 19 from which the MT ferrule 12 is omitted)

FIG. 20 is a perspective view showing the LD subcarrier 13 usable in this embodiment together with the lead frame 14 and ceramic substrate 16. This structure corresponds to the optical parallel transmission transmitter shown in FIG. 19 from which the MT ferrule 12 is omitted. To clearly indicate details, wires for connecting the ceramic substrate 16 and driver IC array 13g and wires for connecting the light-emitting element array 13f and driver IC array 13g are not illustrated.

As an important point, the plurality of optical fibers (e.g., a fiber array) and the plurality of light-emitting elements (e.g., a light-emitting element array) are more accurately positioned using the guide pins as a mechanical reference such that the optical axis of each optical fiber is aligned with that of a corresponding light-emitting element. It is difficult to accurately position optical fibers and light-emitting elements held by separate members on the $\mu$m order. However, accurate positioning is realized through the guide pins by accurately forming holes for fixing the guide pins in the two members.

The guide pins 11, MT ferrule 12, and LD subcarrier 13, which construct this subassembly, will be sequentially described on the basis of FIG. 20 with reference to FIGS. 21 to 26.

Figure 26:
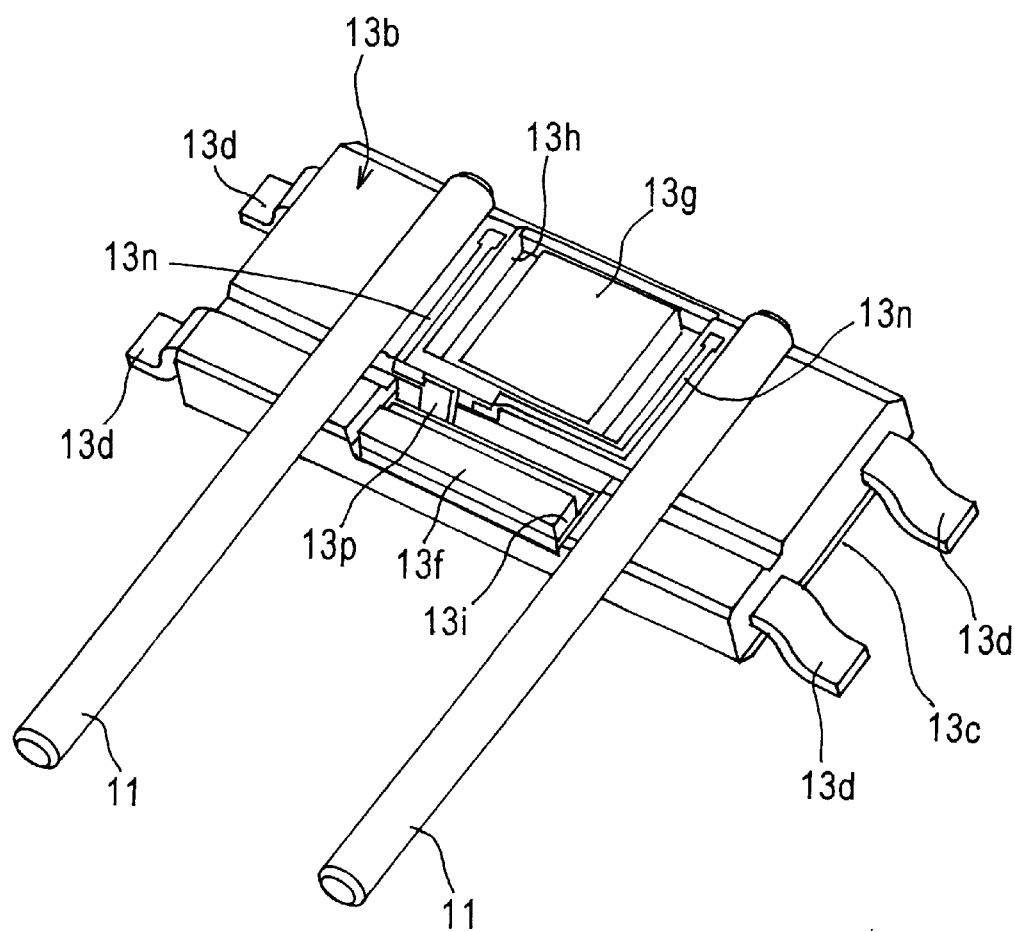
FIG. 26 is a perspective view showing, together with guide pins 11, a state wherein a light-emitting element array 13f, driver IC array 13g, and monitor light-receiving element 13p are mounted on the die pad portions 13j1 and 13j2 and 13m shown in FIG. 24, respectively.

The guide pins 11 are normally formed into a long columnar shape to obtain the function of positioning a plurality of members (MT ferrule 12 and LD subcarrier 13 in this embodiment) to which the guide pins 11 are inserted (FIGS. 20 and 26). As for the material, the guide pins 11 are formed from a material that does not deform and curve under the use environment of the transmitter, e.g., stainless steel. The projecting amount of the guide pins 11 from the MT ferrule 12 is calculated in consideration of connection and optical axis alignment to the MT connector or MT ferrule on the partner side, which is inserted to the guide pins 11. The total length of each guide pin 11 is determined on the basis of the calculated value.

Figure 21:
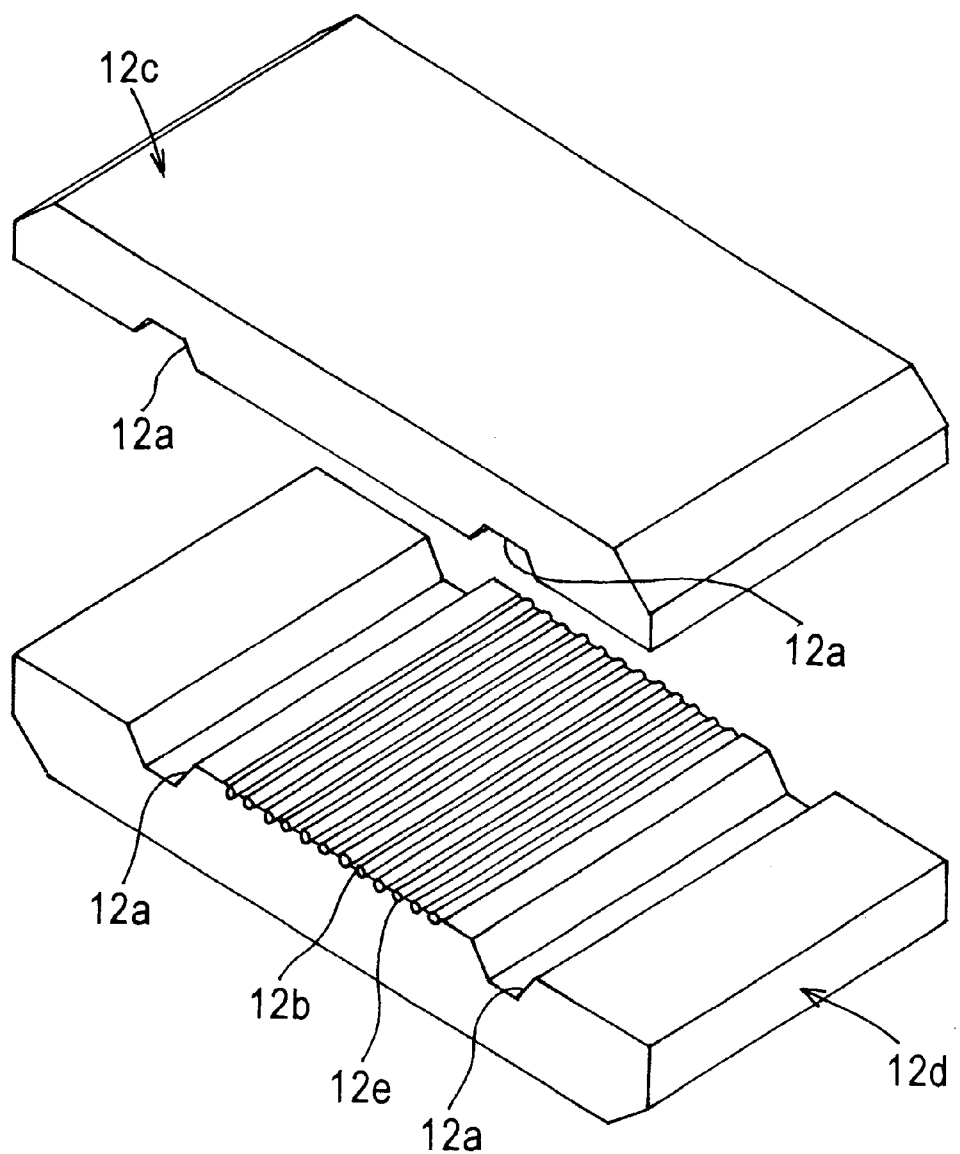
FIG. 21 is an exploded perspective view showing the MT ferrule together with guide pins usable for the optical parallel transmission transmitter according to the first embodiment of the present invention.
Figure 22:
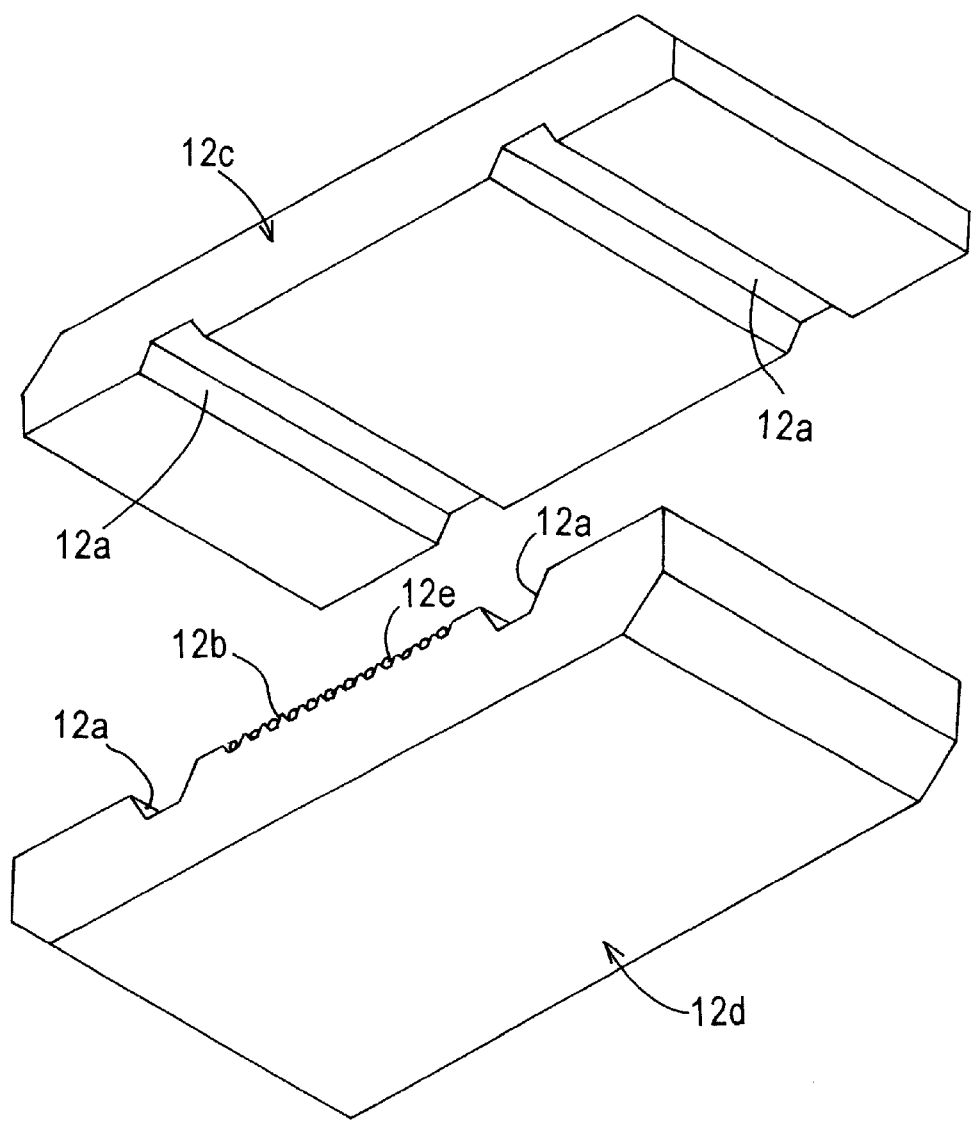
FIG. 22 is a perspective view showing the guide pins and MT ferrule shown in FIG. 21, which are viewed from the lower side.

The MT ferrule 12 comprises the lid 12c and a fiber holding member 12d (FIGS. 21 and 22). The two plate members, i.e., the lid 12c and fiber holding member 12d are abutted against each other. The pair of guide pins 11 and a plurality of optical fibers 12e are held between the abutment surfaces. For this purpose, each of the lid 12c and fiber holding member 12d has a pair of trapezoidal grooves which form a pair of through holes 12a for receiving the pair of guide pins 11, and the fiber holding member 12d has V-grooves 12b for holding the plurality of optical fibers 12e (FIGS. 21 and 22). Since these grooves are formed parallel to each other, the guide pins 11 inserted into the MT ferrule 12 and all the optical fibers 12e held by the MT ferrule 12 are held in parallel. For the receiver, to make the optical axis of each optical fiber perpendicular to the light-receiving surface of a corresponding light-receiving element, the wires for connecting the light-receiving element array and preamplifier IC must be bypassed. In this case, however, such consideration is unnecessary because since the LD subcarrier 13 and MT ferrule 12 are arranged juxtaposed each other, and wire connection does not interfere.

Figure 23:
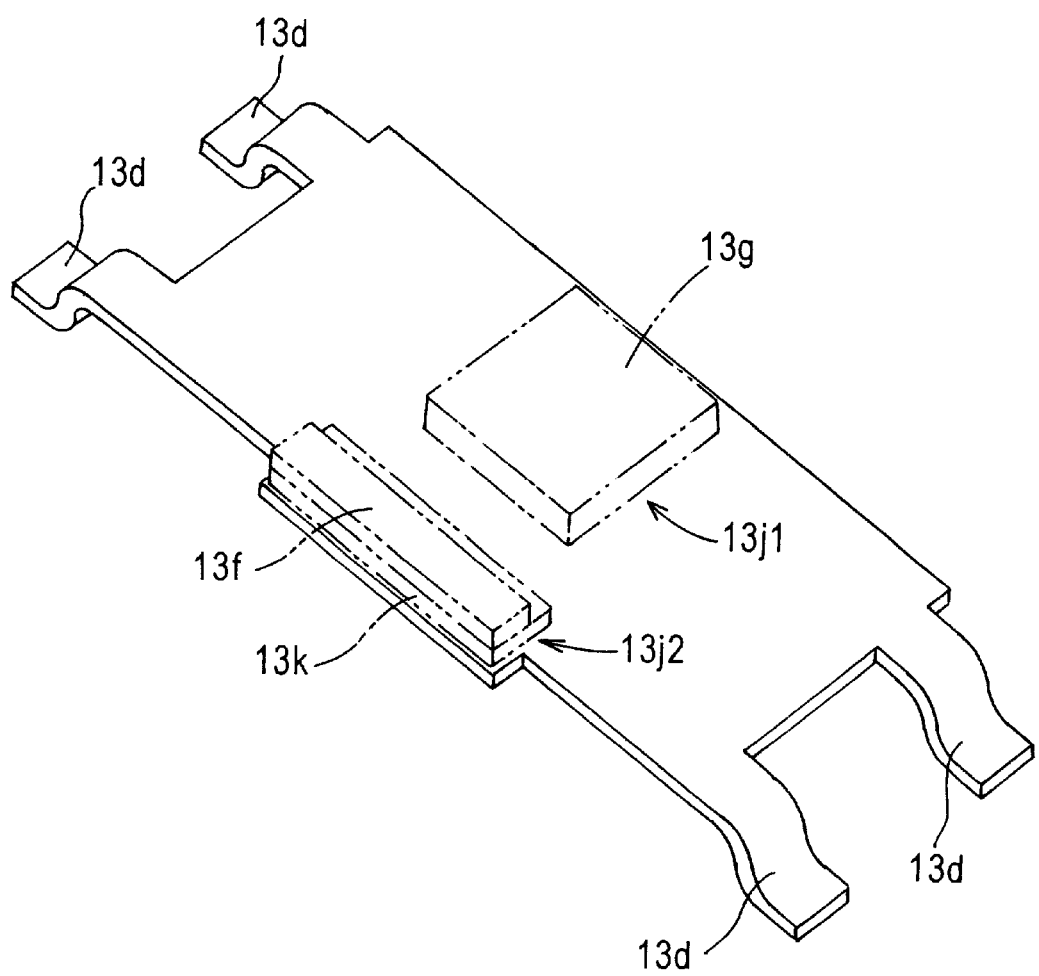
FIG. 23 is a perspective view showing a metal lead frame as a constituent component of the LD subcarrier 13 usable for the optical parallel transmission transmitter according to the first embodiment of the present invention.
Figure 24:
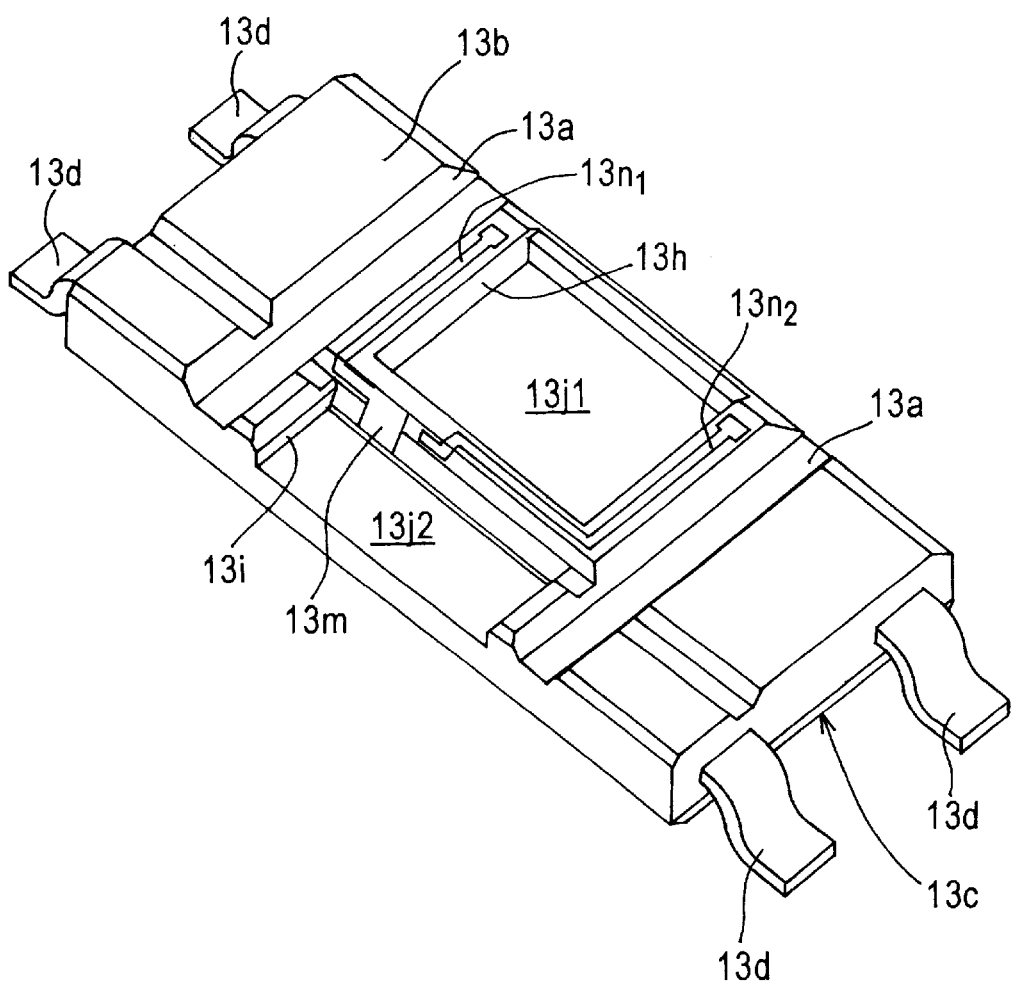
FIG. 24 is a perspective view showing a state wherein the metal lead frame usable for the optical parallel transmission transmitter according to the first embodiment of the present invention is sandwiched and fixed between a first flat plate 13b and a second flat plate 13c.

The LD subcarrier 13 comprises the first flat plate 13b, second flat plate 13c, and lead frame (FIGS. 23 and 24). The first flat plate 13b is formed from a plastic material and has a rectangular outline. A first opening portion 13h for mounting the driver IC array 13g is formed on the upper side (or lower side) of the central portion of the first flat plate 13b. A second opening portion 13i for mounting the light-emitting element array 13f is formed on the lower side (or upper side). The first opening portion 13h has a sufficient size to accommodate the driver IC array 13g. The second opening portion 13i has an opening shape conforming to the shape of the light-emitting element array 13f such that the optical fibers held by the MT ferrule 12 and the light-emitting element array 13f are accurately positioned. Trapezoidal grooves are formed on both sides of the first opening portion 13h and second opening portion 13i so as to define the through holes 13a for receiving the guide pins 11. Unlike the lead frame for the receiver (FIG. 9), the lead frame of this embodiment (FIG. 23) does not have the number of connecting lead pins 3e extending in one direction (e.g., downward). However, the lead frame includes the small number of heat dissipation lead pins 13d extending in different directions (e.g., lateral directions) and die pad portions 13j1 and 13j2 on which the light-emitting element array 13f and driver IC array 13g are placed, and is sandwiched between the two first flat plate 13b and second flat plate 13c (FIG. 26). The connecting lead pins 3e are unnecessary because the driver IC array 13g and ceramic substrate 16 are directly connected by wires. The driver IC array 13g is formed into an almost parallelepiped chip shape (FIGS. 20 and 26) and has electrodes (not shown) formed on the upper surface. For this reason, the driver IC array 13g can be easily connected to the electrodes on the ceramic substrate 16 by wire bonding. The second flat plate 13c has a function of sandwiching the lead frame with the first flat plate 13b and has no particular opening portions. Unlike the lead frame for the receiver (FIG. 12), since the guide pins 11 do not extend through the first flat plate 13b and second flat plate 13c, the metal lead frame has not recess portions for passing the guide pins 11 (FIG. 23). The driver IC array 13g and light-emitting element array 13f are not in contact with the second flat plate 13c and come into surface contact with the metal lead frame (FIG. 23). For this reason, e.g., heat from the driver IC array 13g can be efficiently dissipated through the lead pins 13d.

The structures of the MT ferrule 12 and LD subcarrier 13, which construct the subassembly, will be described next in more detail with reference to FIGS. 21 to 26.

FIG. 21 is an exploded perspective view showing the MT ferrule together with guide pins. FIG. 22 is a perspective view showing the guide pins and MT ferrule shown in FIG. 21, which are viewed from the lower side. A pair of trapezoidal grooves are formed in parallel in the lower surface of the lid 12c of the MT ferrule 12, i.e., the surface opposing the fiber holding member 12d, in regions close to the side portions. The depth of the grooves is calculated and determined such that the guide pins 11 do not move in the through holes 12a that are formed when the lid 12c is combined with the fiber holding member 12d. A flat surface is formed between the trapezoidal grooves and presses the upper surfaces of the optical fibers held by the fiber holding member 12d. The fiber holding member 12d has trapezoidal grooves with the same shape as that of the grooves in the lid 12c at positions corresponding to the trapezoidal grooves formed in the lid 12c. Hence, when the two members are stacked, the through holes 12a fitted on the guide pins 11 are formed. The V-grooves 12b in number corresponding to the number of optical fibers to be held are formed in parallel between the two trapezoidal grooves formed in the upper surface of the fiber holding member 12d (FIG. 22). The V-grooves 12b are formed using the trapezoidal grooves as a mechanical reference. An optical fiber longer than each V-groove 12b is arranged in each V-groove 12b. The lid 12c is fixed to the fiber holding member 12d with an adhesive while keeping the guide pins 11 removed, and after that, the guide pins 11 are inserted. After the optical fibers are held by the lid 12c and fiber holding member 12d, the lengths of optical fibers 12e projecting from the V-grooves 12b are uniformed by end face polishing.

FIG. 23 is a perspective view showing the metal lead frame as a constituent component of the LD subcarrier 13. The light-emitting element array 13f and driver IC array 13g indicated by the alternate long and two-dashed lines are shown to indicate the positional relationship between the lead frame and the die pad portions 13j1 and 13j2 on which the light-emitting element array 13f and driver IC array 13g are placed. As shown in FIG. 23, the two die pad portions 13j1 and 13j2 are formed adjacent to each other. For this reason, the wires required to connect the light-emitting element array 13f and driver IC array 13g are short, and wire bonding is easy. For wire bonding, electrode pads on the light-emitting element array 13f and driver IC array 13g may be heated to a predetermined temperature, e.g., 170° C. using the heat conduction effect through the lead frame. The four lead pins 3d extending in the lateral directions are mainly provided for heat dissipation. However, a ground function may be imparted using these terminals.

In this embodiment, a single lead frame is used. However, separate lead frames may be prepared for the light-emitting element array and driver IC array. When separate lead frames are used, thermal influence from the driver IC array 13g which generates a large amount of heat on the light-emitting element array 13f can be eliminated.

FIG. 24 is a perspective view showing a state wherein the above-described metal lead frame is sandwiched and fixed between the first flat plate 13b and second flat plate 13c.

Figure 25:
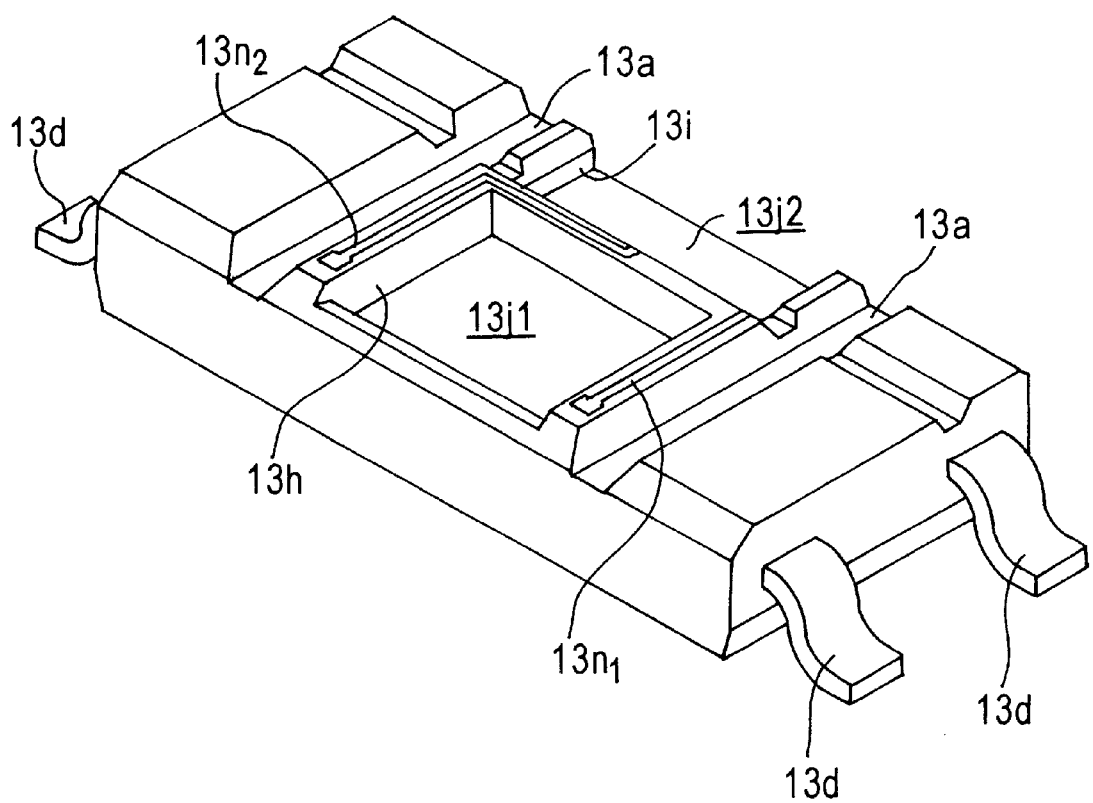
FIG. 25 is a perspective view showing a state wherein the structure shown in FIG. 24 is viewed from a driver IC array mounting portion 13j1 side.

FIG. 25 is a perspective view showing a state wherein the structure shown in FIG. 24 is viewed from the driver IC array mounting portion 13j1 side.

As an important point, the second opening portion 13i for receiving the light-emitting element array 13f is highly accurately (at an accuracy of 1 $\mu$m or less) positioned and formed in consideration of the outer dimensions of the light-emitting element array 13f with reference to the trapezoidal grooves which define the positioning holes 13a for receiving the guide pins 11. The accuracy required herein can be obtained by resin molding (e.g., plastic insert molding or transfer molding). Hence, in realizing the high accuracy, a plastic can be advantageously used as the material of the first flat plate 13b and second flat plate 13c. In addition, the plastic material has no problem of parasitic capacitance and improves the performance, as compared to the conventional silicon substrate accurately microfabricated. Furthermore, since the material is inexpensive, the cost of products is expected to be lower.

On the other hand, the positional accuracy of the first opening portion 13h can be lower than that of the second opening portion 13i because there is no restriction for optical coupling to optical fibers, and the driver IC array 13g is connected to the light-emitting element array 13f and ceramic substrate 16 by wire bonding. For this reason, the first opening portion 13h is formed to have a relatively large size such that the jig (e.g., a collet) for wire bonding can be used without any problem. A monitor light-receiving element mounting portion 13m is formed between the first opening portion 13h and the second opening portion 13i. As an important point, the monitor light-receiving element mounting portion 13m is tilted with respect to a plane including the emitting portions of the light-emitting elements such that a monitor light-receiving element 13p mounted on the monitor light-receiving element mounting portion 13m obliquely receives light emitted from the light-emitting elements. For this reason, reflected light from the light-receiving surface of the monitor light-receiving element 13p does not enter any light-emitting element, so the performance of the light-emitting elements increases. To impart such a function to the monitor light-receiving element 13p, the monitor light-receiving element mounting portion 13m is tilted with respect to the exit surface of the light-emitting element array, and metallizing interconnections 13n1 and 13n2 extend on both sides of the monitor light-receiving element 13p. The monitor light-receiving element 13p has a light-receiving surface on its front surface, an electrode on the front surface, and another electrode on the back surface. For this reason, one metallizing interconnection 13n1 comes into contact with the back surface of the monitor light-receiving surface while the other metallizing interconnection 13n2 is spaced apart from the monitor light-receiving element 13p and connected by, e.g., wire bonding.

FIG. 26 is a perspective view showing, together with guide pins 11, a state wherein the light-emitting element array 13f, driver IC array 13g, and monitor light-receiving element 13p are mounted on the die pad portions 13j1 and 13j2 and 13m shown in FIG. 24, respectively. FIG. 26 aims at clarity and does not illustrate wires and the like.

In the MT ferrule 12 (not shown), all optical fibers are accurately positioned with reference to the through holes 12a in which the guide pins 11 are to be inserted and fixed. In the LD subcarrier 13, all the light-emitting elements of the light-emitting element array 13f are accurately positioned with reference to the through holes 13a in which the guide pins 11 are to be inserted and fixed. Hence, only by inserting the guide pins 11 into the through holes 12a and 13a, the plurality of optical fibers and the plurality of light-emitting elements are accurately optically coupled.

An optical parallel transmission transmitter according to the second embodiment will be described next with reference to FIGS. 17, and 27 to 38.

The basic differences between the optical parallel transmission transmitter according to the first embodiment and that according to the second embodiment are that the light-emitting element array is positioned not by openings but by grooves, and the lead frame of a LD subcarrier 23 is separated into two parts to the first flat plate of the LD subcarrier 23. As in the first embodiment, optical axis alignment between light-emitting elements and optical fibers is necessary, and more accurate positioning is required.

The optical parallel transmission transmitter according to the second embodiment will be described below. The same reference numerals denote components having the same functions throughout the drawings, and a detailed description thereof will be omitted.

The optical parallel transmission transmitter according to the second embodiment after resin molding has the shape shown in FIG. 17. The function and arrangement are the same as in the first embodiment, and a detailed description thereof will be omitted.

Figure 27:
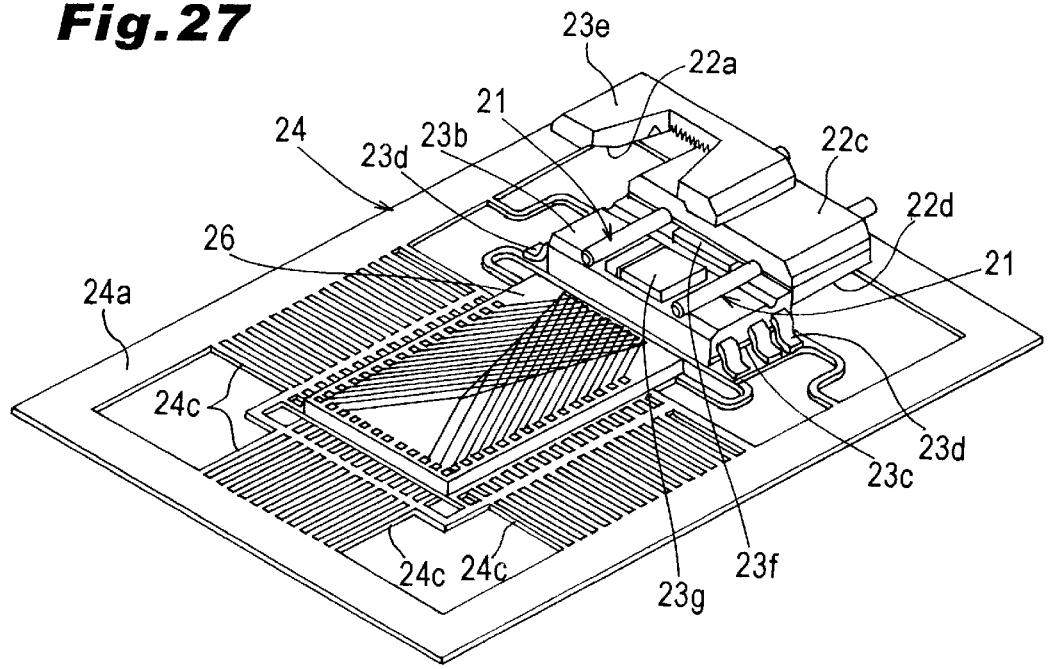
FIG. 27 is a perspective view showing the optical parallel transmission transmitter according to the first embodiment of the present invention before resin molding, which is usable for an optical parallel transmission transmitter according to the second embodiment and is viewed from a ceramic substrate 26 side while detaching a lid 23e of the LD subcarrier.
Figure 28:
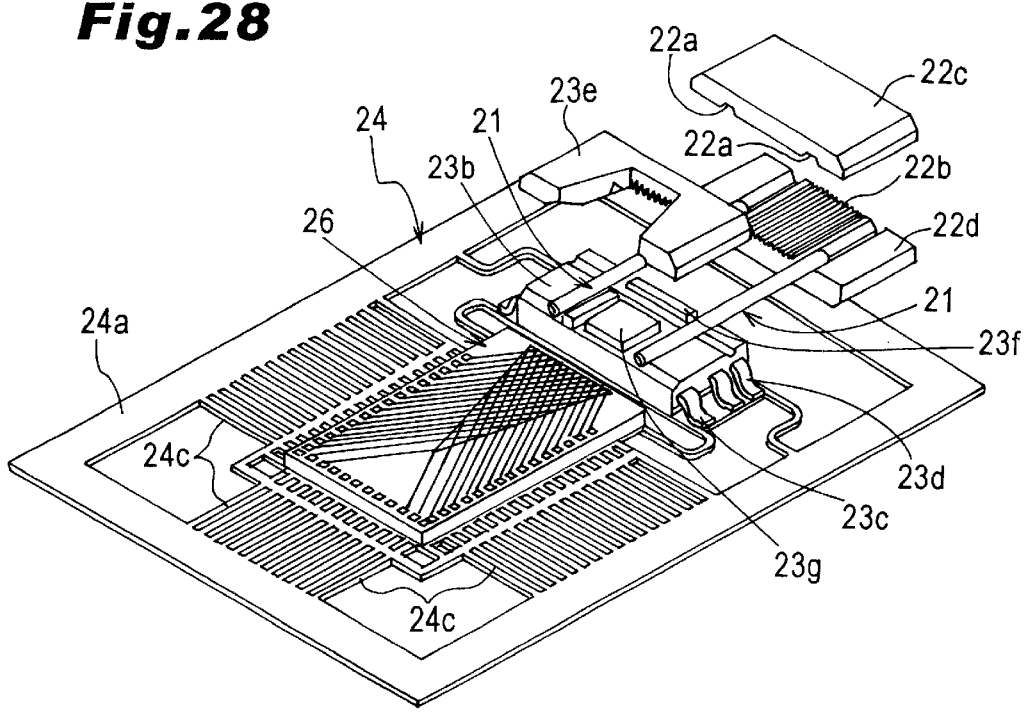
FIG. 28 is a perspective view showing a state wherein a lid 22c of an MT ferrule 22 is also detached from the optical parallel transmission transmitter shown in FIG. 27.
Figure 29:
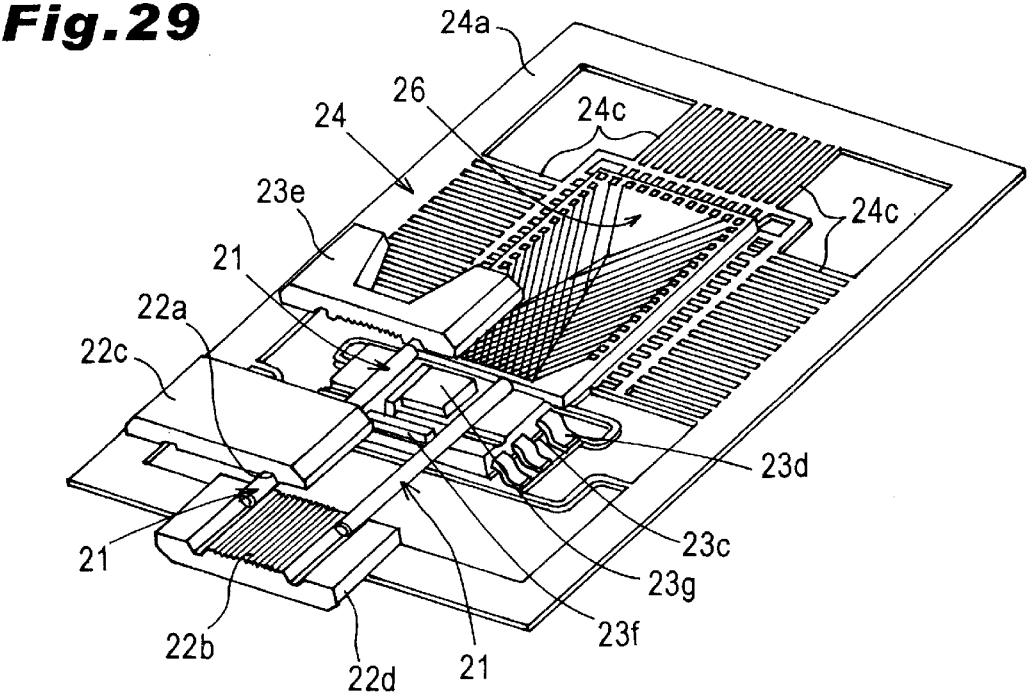
FIG. 29 is a perspective view showing the state wherein the lid 22c and lid 23e are detached, which is viewed from the MT ferrule 22 side.

FIGS. 27 to 29 show the optical parallel transmission transmitter according to this embodiment before resin molding. FIG. 27 is a perspective view showing a state wherein a lid 23e is detached, which is viewed from a ceramic substrate 26 side. FIG. 28 is a perspective view showing a state wherein a lid 22c of an MT ferrule 22 is also detached from the optical parallel transmission transmitter shown in FIG. 27. FIG. 29 is a perspective view showing the state wherein the lid 22c and lid 23e are detached, which is viewed from the MT ferrule 22 side. FIGS. 27 to 29 are schematic views aiming at clarity, and, for example, wires for connecting the LD subcarrier 23 and ceramic substrate 26 are not illustrated.

In this embodiment, since the LD subcarrier 23 is formed from a plastic material, and transfer mold is used, a working accuracy of 1 $\mu$m or less can be realized. It is therefore effective for non-alignment assembly between the core diameter (about 9 $\mu$m) of a single-mode optical fiber and a light-emitting element.

Guide pins 21 and lead frame 24 are held by a mold for resin molding whereby the relative position between the guide pins 21, MT ferrule 22, LD subcarrier 23, lead frame 24, and ceramic substrate 26, which are fixed by a mold package (FIG. 17), is accurately realized. At this stage, the guide pins 21, MT ferrule 22, and LD subcarrier 23 are accurately assembled with reference to the guide pins 21.

The guide pins 21 are normally formed from a metal and have a length larger than at least the total length of the MT ferrule 22 and LD subcarrier 23 juxtaposed each other. Another MT ferrule (not shown) is inserted on the guide pins 21 projecting from the MT ferrule 22. To facilitate insertion, the distal ends of the guide pins 21 are tapered. The guide pins 21 inserted into the MT ferrule 22 are not fixed. However, to prevent the other MT ferrule from removing the guide pins 21 when the other MT ferrule is detached, the guide pins 21 are held in the MT ferrule 22 by a certain force. A plurality of V-grooves are formed between the guide pins 21 at a predetermined interval in parallel to the longitudinal direction of the guide pins 21. A plurality of optical fibers are fixed in the grooves. Hence, the plurality of optical fibers are arrayed at a predetermined pitch that normally matches the standard of the other MT ferrule.

The MT ferrule 22 has at least a function of holding a plurality of optical fibers and the guide pins 21. For this purpose, the MT ferrule 22 has fiber holding portions corresponding to the number of optical fibers to be held and pin holding portions corresponding to the number of guide pins 21 to be held. The detailed structure is substantially the same as that of the optical parallel transmission transmitter according to the first embodiment, and a detailed description thereof will be omitted (FIGS. 21 and 22).

Figure 30:
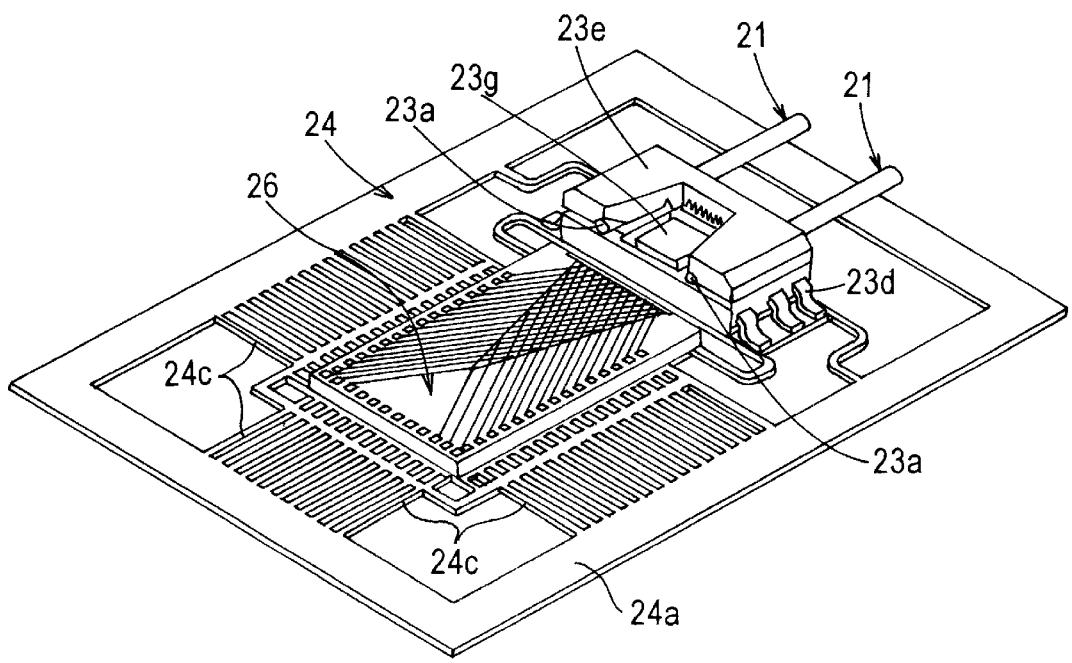
FIG. 30 is a perspective view showing an LD subcarrier 23 usable for the optical parallel transmission transmitter according to the second embodiment of the present invention together with a lead frame 24 and ceramic substrate 26.

The LD subcarrier 23 is constructed by two, first flat plate 23b and second flat plate 23c forming part of a pair of through holes 23a and formed from a plastic, a metal lead frame having, at some portions, heat dissipation lead pins 23d and sandwiched between the first flat plate 23b and the second flat plate 23c, and the lid 23e, and is arranged between the MT ferrule 22 and the ceramic substrate 26 with reference to the guide pins 21. To accurately position the LD subcarrier 23 with respect to the MT ferrule 22, the through holes 23a each for receiving one end of a corresponding one of the guide pins 21 are formed in the LD subcarrier 23 (FIG. 30). A light-emitting element array 23f and driver IC array 23g are accurately mounted on the LD subcarrier 23 with reference to the through holes 23a. For this reason, the plurality of optical fibers attached to the MT ferrule 22 and the plurality of light-emitting element arrays 23f mounted on the LD subcarrier 23 can be easily accurately optically coupled only by inserting the LD subcarrier 23 on the guide pins 21. The heat dissipation lead pins 23d extending from both sides of the LD subcarrier 23 effectively dissipate heat from the driver, which is transmitted through the metal lead frame. Grounding is also possible using the heat dissipation lead pins 23d. In this embodiment, the LD subcarrier 23 and ceramic substrate 26 are connected by wires. The lid 23e is formed from a plastic material and fixed to the first flat plate 23b by bonding using a transparent resin or the like. After that, the guide pins 21 are inserted into the through holes 23a. The guide pins 21 need not be fixed in the through holes 23a.

The lead frame 24 comprises a support lead 24a which forms a rectangular frame, a die pad 24b on which the ceramic substrate 26 is mounted, and lead pins 24c for connecting the die pad 24b and support lead 24a.

The ceramic substrate 26 is mounted on the die pad 24b of the lead frame 24. The ceramic substrate 26 need not be strictly positioned as far as it is connected to the LD subcarrier 23 by wires. Electronic circuits (signal processing circuit, waveform shaping circuit, amplification circuit, APC circuit, and the like) necessary for driving the light-emitting elements are formed on the upper surface of the ceramic substrate 26.

Figure 31:
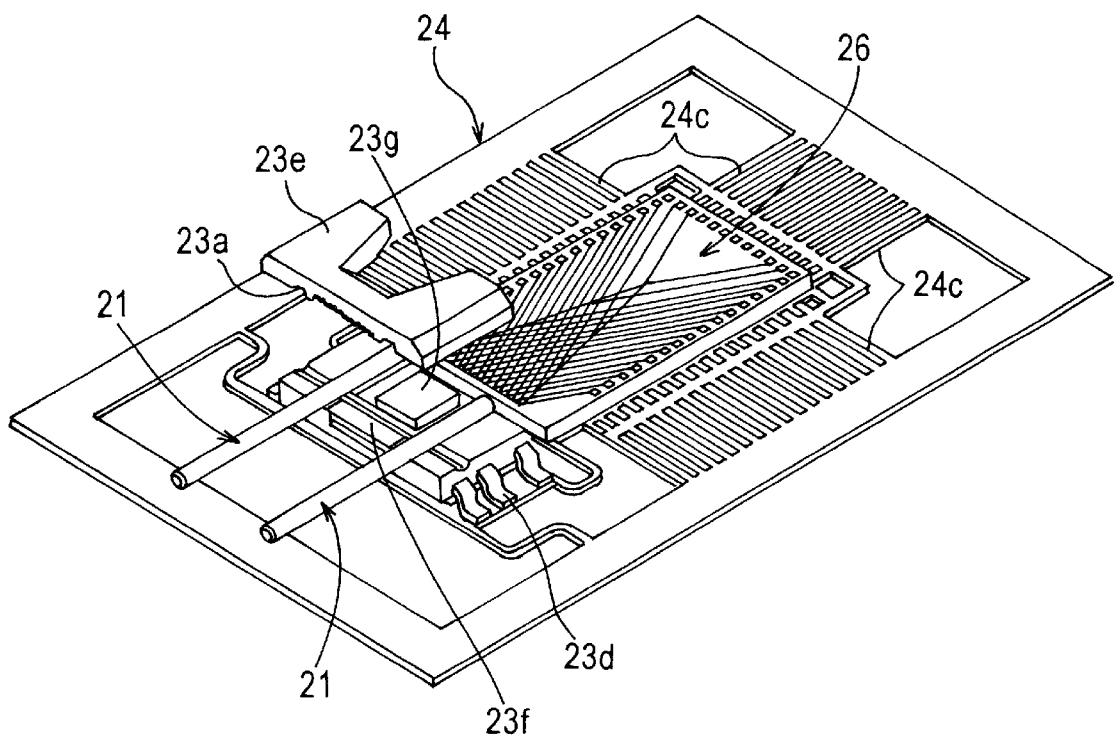
FIG. 31 is a perspective view showing a state wherein the lid 23e of the LD subcarrier 23 of the optical parallel transmission transmitter according to the second embodiment of the present invention shown in FIG. 30 is removed.

FIGS. 30 and 31 are perspective views showing the LD subcarrier 23 usable in this embodiment together with the lead frame 24 and ceramic substrate 26. To clearly indicate details, wires for connecting the ceramic substrate 26 and driver IC array 23g and wires for connecting the light-emitting element array 23f and driver IC array 23g are not illustrated.

As an important point, the plurality of optical fibers (e.g., a fiber array) and the plurality of light-emitting elements (e.g., a light-emitting element array) are more accurately positioned using the guide pins as a mechanical reference such that the optical axis of each optical fiber is aligned with that of a corresponding light-emitting element. It is difficult to accurately position optical fibers and light-emitting elements held by separate members on the $\mu$m order. However, accurate positioning is realized through the guide pins by accurately forming holes for fixing the guide pins in the two members.

The guide pins 21, MT ferrule 22, and LD subcarrier 23, which construct this subassembly, will be sequentially described on the basis of FIGS. 32 to 36.

Figure 32:
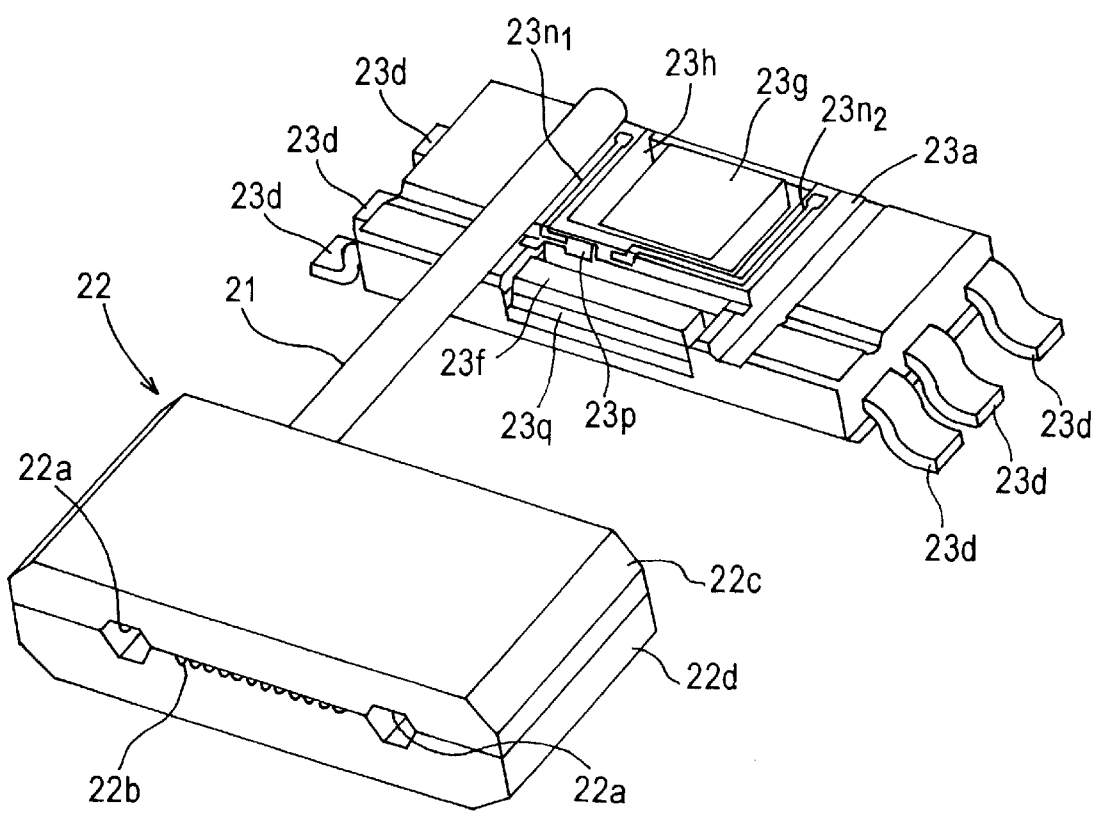
FIG. 32 is a perspective view showing, together with the MT ferrule 22, the LD subcarrier 23 having no lid 23e, which is usable for the optical parallel transmission transmitter according to the second embodiment of the present invention.
Figure 33:
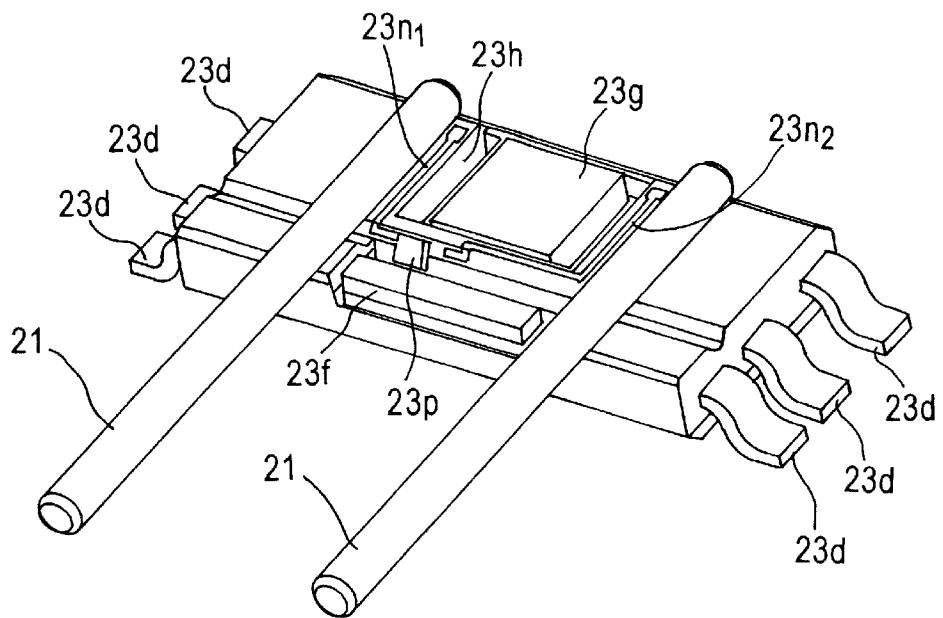
FIG. 33 is a perspective view showing, together with guide pins 21, the LD subcarrier 23 having no lid 23e, which is usable for the optical parallel transmission transmitter according to the second embodiment of the present invention.
Figure 34:
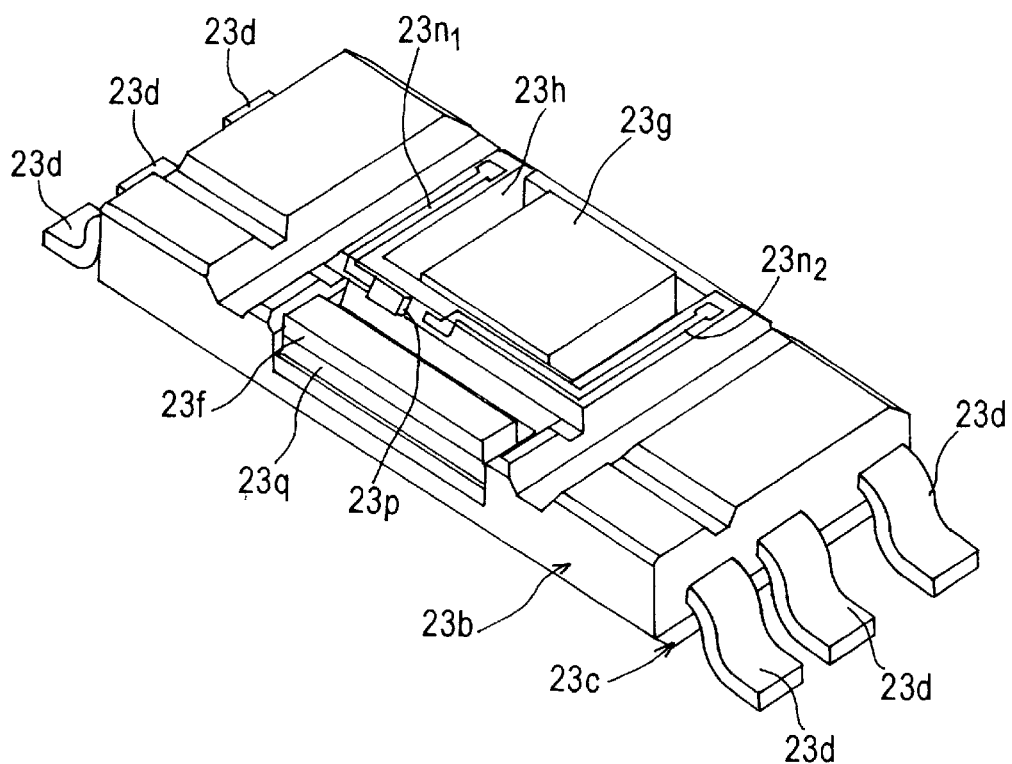
FIG. 34 is a perspective view showing a first flat plate 23b, second flat plate 23c, and two lead frames held by them, which are usable for the optical parallel transmission transmitter according to the second embodiment of the present invention.
Figure 35:
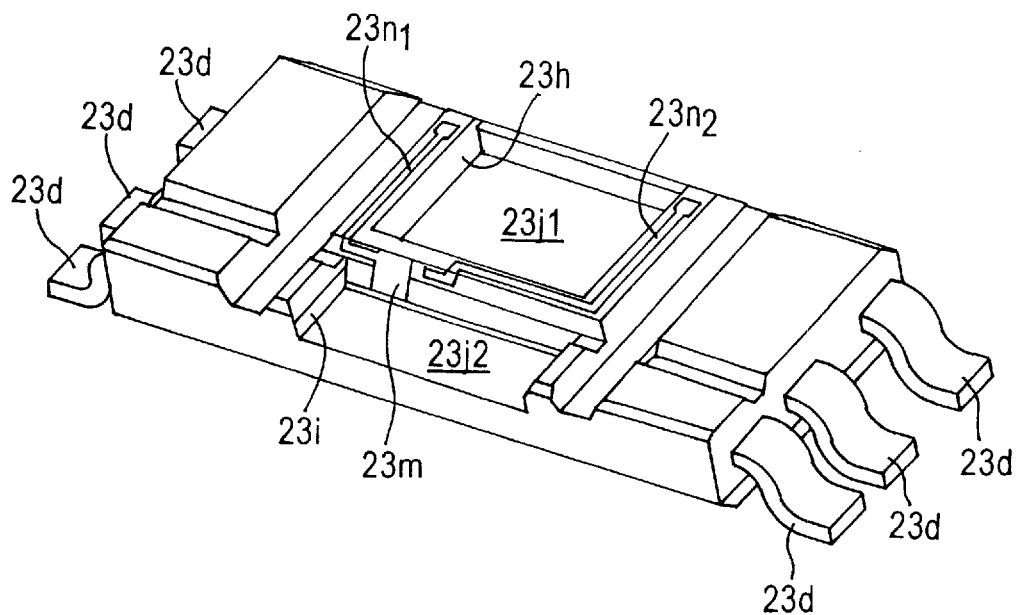
FIG. 35 is a perspective view showing a state wherein a light-emitting element array 23f, driver IC array 23g, and monitor light-receiving element 23p are removed from the first flat plate 23b shown in FIG. 34.
Figure 36:
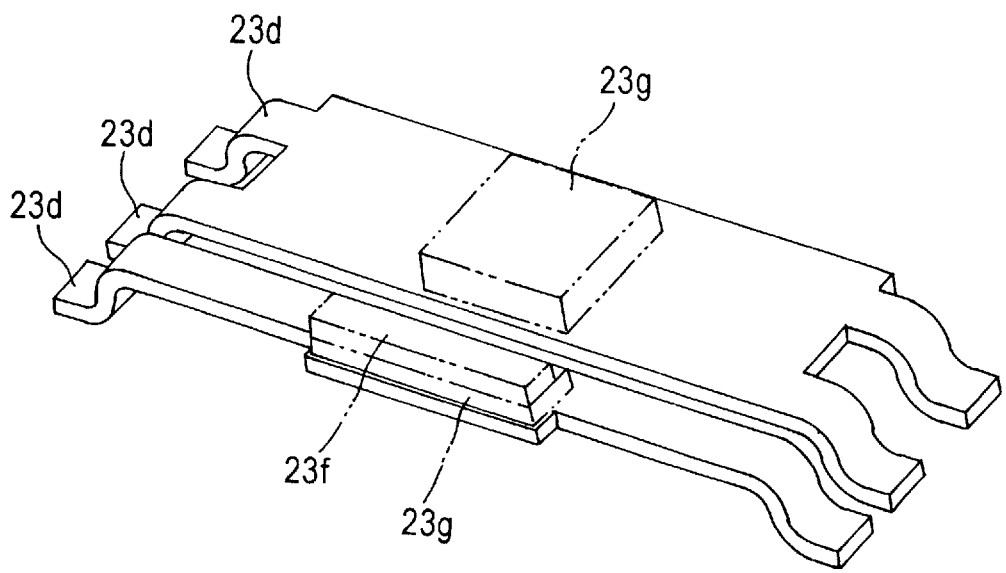
FIG. 36 is a perspective view showing a metal lead frame as a constituent component of the LD subcarrier 23 usable for the optical parallel transmission transmitter according to the second embodiment of the present invention.

FIG. 32 is a perspective view showing the LD subcarrier 23 having no lid 23e together with the MT ferrule 22. FIG. 33 is a perspective view showing the LD subcarrier 23 having no lid 23e together with guide pins 21. FIG. 34 is a perspective view showing the first flat plate 23b, second flat plate 23c, and two lead frames held by them, which construct the LD subcarrier 23. FIG. 35 is a perspective view showing a state wherein the light-emitting element array 23f, driver IC array 23g, and monitor light-receiving element 23p are removed from the first flat plate 23b shown in FIG. 34. FIG. 36 is a perspective view showing the metal lead frame as a constituent component of the LD subcarrier 23 according to the second embodiment.

The guide pins 21 are normally formed into a long columnar shape to obtain the function of positioning a plurality of members (MT ferrule 22 and LD subcarrier 23 in this embodiment) to which the guide pins 21 are inserted (FIG. 33). As for the material, the guide pins 21 are formed from a material that does not deform and curve under the use environment of the transmitter, e.g., stainless steel. The projecting amount of the guide pins 21 from the MT ferrule 22 is calculated in consideration of connection and optical axis alignment to the MT connector or MT ferrule on the partner side, which is inserted to the guide pins 21. The length of each guide pin 21 is determined on the basis of the calculated value.

The MT ferrule 22 comprises the lid 22c and a fiber holding member 22d (FIG. 32). The two plate members, i.e., the lid 22c and fiber holding member 22d are abutted against each other. The pair of guide pins 21 and a plurality of optical fibers 22e are held between the abutment surfaces. For this purpose, each of the lid 22c and fiber holding member 22d has a pair of trapezoidal grooves which form a pair of through holes 22a for receiving the pair of guide pins 21, and the fiber holding member 22d has V-grooves 22b for holding the plurality of optical fibers 22e (FIGS. 21 and 22). Since these grooves are formed parallel to each other, the guide pins 21 inserted into the MT ferrule 22 and all the optical fibers 22e held by the MT ferrule 22 are held in parallel. For the receiver, to make the optical axis of each optical fiber perpendicular to the light-receiving surface of a corresponding light-receiving element, the wires for connecting the light-receiving element array and preamplifier IC must be bypassed. In this case, however, such consideration is unnecessary because since the LD subcarrier 23 and MT ferrule 22 are arranged juxtaposed each other, and wire connection does not interfere.

A pair of trapezoidal grooves are formed in parallel in the lower surface of the lid 22c of the MT ferrule 22, i.e., the surface opposing the fiber holding member 12d, in regions close to the side portions. The depth of the grooves is calculated and determined such that the guide pins 21 do not move in the through holes 22a that are formed when the lid 22c is combined with the fiber holding member 22d. A flat surface is formed between the trapezoidal grooves and presses the upper surfaces of the optical fibers held by the fiber holding member 22d. The fiber holding member 22d has trapezoidal grooves with the same shape as that of the grooves in the lid 22c at positions corresponding to the trapezoidal grooves formed in the lid 22c. Hence, when the two members are stacked, the through holes 22a fitted on the guide pins 21 are formed. The V-grooves 22b in number corresponding to the number of optical fibers to be held are formed in parallel between the two trapezoidal grooves formed in the upper surface of the fiber holding member 22*d* (FIG. 21). The V-grooves 22*b* are formed using the trapezoidal grooves as a mechanical reference. An optical fiber longer than each V-groove 22*b* is arranged in each V-groove 22*b*. The lid 22*c* is fixed to the fiber holding member 22*d* with adhesive while keeping the guide pins 21 removed, and after that, the guide pins 21 are inserted. After the optical fibers are held by the lid 22*c* and fiber holding member 22*d*, the lengths of optical fibers 22*e* projecting from the V-grooves 22*b* are uniformed by end face polishing.

The LD subcarrier 23 comprises the first flat plate 23*b*, second flat plate 23*c*, lead frame, and lid 23*e* (FIGS. 29 and 32). The first flat plate 23*b* is formed from a plastic material and has a rectangular outline. A first groove portion 23*h* for mounting the driver IC array 23*g* is formed on the upper side (or lower side) of the central portion of the first flat plate 23*b*. A second groove portion 23*i* for mounting the light-emitting element array 23*f* is formed on the lower side (or upper side). The first groove portion 23*h* has a sufficient size to accommodate the driver IC array 23*g*. The second groove portion 23*i* has an opening shape conforming to the shape of the light-emitting element array 23*f* such that the optical fibers held by the MT ferrule 22 and the light-emitting element array 23*f* are accurately positioned. Trapezoidal grooves are formed on both sides of the first groove portion 23*h* and second groove portion 23*i* so as to define the holes 23*a* for receiving the guide pins 21. Unlike the lead frame for the receiver (FIG. 9), the lead frame of this embodiment (FIG. 36) does not have the number of connecting lead pins 3*e* extending in one direction (e.g., downward). However, the lead frame includes the small number of heat dissipation lead pins 23*d* extending in different directions (e.g., lateral directions) and die pad portions 23*j*1 and 23*j*2 on which the light-emitting element array 23*f* and driver IC array 23*g* are placed, and is sandwiched between the two first flat plate 23*b* and second flat plate 23*c* (FIG. 26). The connecting lead pins 3*e* are unnecessary because the driver IC array 23*g* and ceramic substrate 26 are directly connected by wires. The driver IC array 23*g* is formed into an almost parallelepiped chip shape (FIGS. 32 and 36) and has electrodes (not shown) formed on the upper surface. For this reason, the driver IC array 23*g* can be easily connected to the electrodes on the ceramic substrate 26 by wire bonding. The second flat plate 23*c* has a function of sandwiching the lead frame with the first flat plate 23*b* and has no particular opening portions. Unlike the lead frame for the receiver (FIG. 12), since the guide pins 21 do not extend through the first flat plate 23*b* and second flat plate 23*c*, the metal lead frame has not recess portions for passing the guide pins 21 (FIG. 36). The driver IC array 23*g* is not in contact with the second flat plate 23*c* and comes into surface contact with the metal lead frame (FIG. 36). For this reason, e.g., heat from the driver IC array 23*g* can be efficiently dissipated through the lead pins 23*d*.

In addition, the light-emitting element array 23*f* is mounted, via a submount 23*q*, on the light-emitting element mounting surface 23*j*2 of the lead frame spaced apart from the driver IC array 23*g* (FIGS. 35 and 36). The LD subcarrier 23 has at least a function of adjusting the light-emitting position of the light-emitting element array 23*f* in accordance with the optical axes of the optical fibers. Hence, when the light-emitting element array 23*f* whose light-emitting elements have a sufficient height is used, the submount 23*q* can be omitted.

The light-emitting element array 23*f* and driver IC array 23*g* indicated by the alternate long and two-dashed lines (FIG. 36) are shown to indicate the positional relationship between the lead frame and the die pad portions 23*j*1 and 23*j*2 on which the light-emitting element array 23*f* and driver IC array 23*g* are placed. A gap (space) is formed between the two die pad portions 23*j*1 and 23*j*2, though they are sufficiently close to each other. For this reason, wires required to connect the light-emitting element array 23*f* and driver IC array 23*g* are short, and wire bonding is easy. In addition, thermal interference is prevented. For wire bonding, electrode pads on the light-emitting element array 23*f* and driver IC array 23*g* are heated to a predetermined temperature, e.g., 170° C. using the heat conduction effect through the lead frame. The four lead pins 3*d* extending in the lateral directions are mainly provided for heat dissipation. However, a ground function may be imparted using these terminals.

As an important point, the second groove portion 23*i* (FIG. 35) for receiving the light-emitting element array 23*f* is highly accurately (at an accuracy of 1 $\mu$m or less) positioned and formed in consideration of the outer dimensions of the light-emitting element array 23*f* with reference to the trapezoidal grooves which define the positioning holes 23*a* for receiving the guide pins 21. The accuracy required herein can be obtained by resin molding (e.g., plastic insert molding or transfer molding). Hence, in realizing the high accuracy, a plastic can be advantageously used as the material of the first flat plate 23*b* and second flat plate 23*c*. In addition, the plastic material has no problem of parasitic capacitance and improves the performance, as compared to the conventional silicon substrate accurately microfabricated. Furthermore, since the material is inexpensive, the cost of products is expected to be lower.

On the other hand, the positional accuracy of the first groove portion 23*h* can be lower than that of the second opening portion 23*i* because there is no restriction for optical coupling to optical fibers, and the driver IC array 23*g* is connected to the light-emitting element array 23*f* and ceramic substrate 26 by wire bonding. For this reason, the first opening portion 23*h* is formed to have a relatively large size such that the jig (e.g., a collet) for wire bonding can be used without any problem. A monitor light-receiving element mounting portion 23*m* is formed between the first groove portion 23*h* and the second groove portion 23*i* (FIG. 35).

As an important point, the monitor light-receiving element mounting portion 23*m* is tilted with respect to a plane including the emitting portions of the light-emitting elements such that the monitor light-receiving element 23*p* mounted on the monitor light-receiving element mounting portion 23*m* obliquely receives light emitted from the light-emitting elements. For this reason, reflected light from the light-receiving surface of the monitor light-receiving element 23*p* does not enter any light-emitting element, so the performance of the light-emitting elements increases. To impart such a function to the monitor light-receiving element 23*p*, the monitor light-receiving element mounting portion 23*m* is tilted with respect to the exit surface of the light-emitting element array, and metallizing interconnections 23*n*1 and 23*n*2 extend on both sides of the monitor light-receiving element 23*p*. The monitor light-receiving element 23*p* has a light-receiving surface on its front surface, an electrode on the front surface, and another electrode on the back surface. For this reason, one metallizing interconnection 23*n*1 comes into contact with the back surface of the monitor light-receiving surface while the other metallizing interconnection 23*n*2 is spaced apart from the monitor light-receiving element 23*p* and connected by, e.g., wire bonding. In this embodiment, grooves are formed instead of opening potions, unlike the first embodiment. The light-emitting element array 23f and driver IC array 23g can be more accurately mounted by automatic recognition positioning using, e.g., the grooves as a marker.

According to the optical parallel transmission receiver of the second embodiment, the assembly can be improved, and additionally, cost reduction or cost reduction by decreasing the number of components is possible. In addition, since the accuracy of the MT ferrule, the accuracy of light-emitting elements, and their array accuracy can be substantially increased, non-alignment assembly is enabled by arranging the light-emitting elements using the guide pins of the MT ferrule as a mechanical reference. Furthermore, lens alignment operation can also be omitted by bad joint.

The structures of the MT ferrule 22 and LD subcarrier 23 constructing the subassembly of an optical parallel transmission transmitter according to a modification to the second embodiment will be described next on the basis of FIGS. 37 and 38 with reference to FIGS. 27 to 36.

Figure 37:
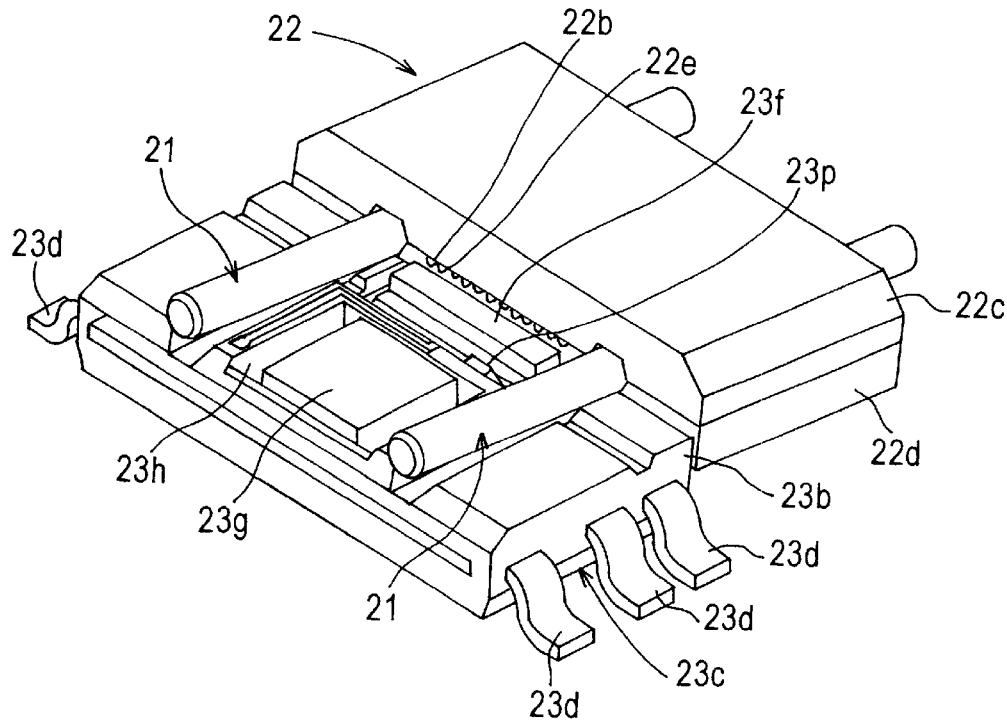
FIG. 37 is a perspective view showing the LD subcarrier 23 having no lid 23e, together with the guide pins 21 and MT ferrule 22, which are usable for the optical parallel transmission transmitter according to the second embodiment of the present invention.

FIG. 37 is a perspective view showing the LD subcarrier 23 having no lid 23e together with the guide pins 21 and MT ferrule 22. FIG. 38 is a sectional view showing the MT ferrule 22 and LD subcarrier 23 which are taken along a plane perpendicular to the optical fiber array surface.

Figure 38:
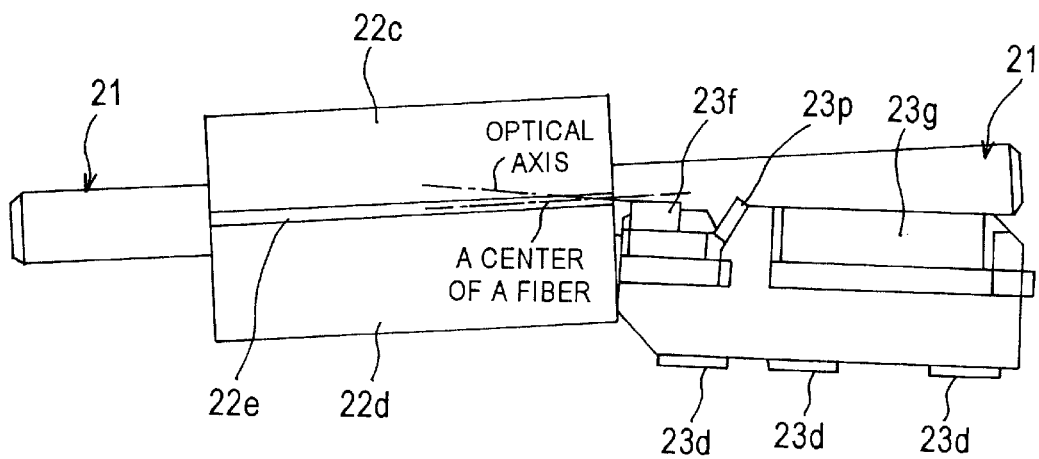
FIG. 38 is a sectional view showing the MT ferrule 22 and LD subcarrier 23, which are usable for the optical parallel transmission transmitter according to the second embodiment of the present invention and are taken along a plane perpendicular to the optical fiber array surface.

The difference from the optical parallel transmission transmitter according to the second embodiment is that the guide pins are arranged at a predetermined angle with respect to the optical axis (FIG. 38). When such a structure is employed, light incident on the optical fibers can be prevented from being reflected to the light-emitting element.

The guide pins 21, MT ferrule 22, and LD subcarrier 23, which construct the optical parallel transmission transmitter according to this modification, will be sequentially described below.

The guide pins 21 and MT ferrule 22 are basically the same as those used in the second embodiment, and a detailed description thereof will be omitted.

The LD subcarrier 23 comprises the first flat plate 23b, second flat plate 23c, lead frame, and lid 23e, as in the second embodiment. The difference from the second embodiment is that the through holes 23a for receiving the guide pins 21 are tilted with respect to the lead frame. For this reason, grooves for defining the through holes 23a have a predetermined gradient with respect to the plane including the die pad portion of the lead frame. The degree of gradient is calculated and determined such that the light emitted from the light-emitting elements becomes incident on the cores of the optical fibers and is generally set to about 8°. With this arrangement, only by inserting the guide pins 21 projecting from the MT ferrule 22 into the through holes 23a, positioning is done such that light emitted from each of the plurality of light-emitting elements becomes incident on the core of a corresponding one of the plurality of optical fibers, so the two optical elements can be easily automatically and accurately optically coupled.

The first flat plate 23b having the tilted grooves is formed from a plastic material and has a rectangular outline. The first groove portion 23h for mounting the driver IC array 23g is formed on the upper side (or lower side) of the central portion of the first flat plate 23b. The second groove portion 23i for mounting the light-emitting element array 23f is formed on the lower side (or upper side). The first groove portion 23h has a sufficient size to accommodate the driver IC array 23g. The second groove portion 23i has an opening shape conforming to the shape of the light-emitting element array 23f such that the optical fibers held by the MT ferrule 22 and the light-emitting element array 23f are accurately positioned. Trapezoidal grooves are formed on both sides of the first groove portion 23h and second groove portion 23i so as to define the holes 23a for receiving the guide pins 21. Unlike the lead frame for the receiver (FIG. 9), the lead frame of this embodiment (FIG. 36) does not have the number of connecting lead pins 3e extending in one direction (e.g., downward). However, the lead frame includes the small number of heat dissipation lead pins 23d extending in different directions (e.g., lateral directions) and die pad portions 23j1 and 23j2 on which the light-emitting element array 23f and driver IC array 23g are placed, and is sandwiched between the two first flat plate 23b and second flat plate 23c (FIG. 26). The connecting lead pins 3e are unnecessary because the driver IC array 23g and ceramic substrate 26 are directly connected by wires. The driver IC array 23g is formed into an almost parallelepiped chip shape (FIGS. 32 and 36) and has electrodes (not shown) formed on the upper surface. For this reason, the driver IC array 23g can be easily connected to the electrodes on the ceramic substrate 26 by wire bonding. The second flat plate 23c has a function of sandwiching the lead frame with the first flat plate 23b and has no particular opening portions. Unlike the lead frame for the receiver (FIG. 12), since the guide pins 21 do not extend through the first flat plate 23b and second flat plate 23c, the metal lead frame has not recess portions for passing the guide pins 21 (FIG. 36). The driver IC array 23g is not in contact with the second flat plate 23c and comes into surface contact with the metal lead frame (FIG. 36). For this reason, e.g., heat from the driver IC array 23g can be efficiently dissipated through the lead pins 23d.

In addition, the light-emitting element array 23f is mounted, via the submount 23q, on the light-emitting element mounting surface 23j2 of the lead frame spaced apart from the driver IC array 23g (FIGS. 35 and 36). The LD subcarrier 23 has at least a function of adjusting the light-emitting position of the light-emitting element array 23f in accordance with the optical axes of the optical fibers. Hence, when the light-emitting element array 23f whose light-emitting elements have a sufficient height is used, the submount 23q can be omitted.

The light-emitting element array 23f and driver IC array 23g indicated by the alternate long and two-dashed lines (FIG. 36) are shown to indicate the positional relationship between the lead frame and the die pad portions 23j1 and 23j2 on which the light-emitting element array 23f and driver IC array 23g are placed. A gap (space) is formed between the two die pad portions 23j1 and 23j2, though they are sufficiently close to each other. For this reason, the wires required to connect the light-emitting element array 23f and driver IC array 23g are short, and wire bonding is easy. In addition, thermal interference is prevented. For wire bonding, electrode pads on the light-emitting element array 23f and driver IC array 23g are heated to a predetermined temperature, e.g., 170° C. using the heat conduction effect through the lead frame. The four lead pins 3d extending in the lateral directions are mainly provided for heat dissipation. However, a ground function may be imparted using these terminals.

As an important point, the second groove portion 23i (FIG. 35) for receiving the light-emitting element array 23f is highly accurately (at an accuracy of 1 Am or less) positioned and formed in consideration of the outer dimensions of the light-emitting element array 23f with reference to the trapezoidal grooves which define the positioning holes 23a for receiving the guide pins 21. The accuracy required herein can be obtained by resin molding (e.g., plastic insert molding or transfer molding). Hence, in realizing the high accuracy, a plastic can be advantageously used as the material of the first flat plate 23b and second flat plate 23c. In addition, the plastic material has no problem of parasitic capacitance and improves the performance, as compared to the conventional silicon substrate accurately microfabricated. Furthermore, since the material is inexpensive, the cost of products is expected to be lower.

On the other hand, the positional accuracy of the first groove portion 23h can be lower than that of the second opening portion 23i because there is no restriction for optical coupling to optical fibers, and the driver IC array 23g is connected to the light-emitting element array 23f and ceramic substrate 26 by wire bonding. For this reason, the first opening portion 23h is formed to have a relatively large size such that the jig (e.g., a collet) for wire bonding can be used without any problem. The monitor light-receiving element mounting portion 23m is formed between the first groove portion 23h and the second groove portion 23i (FIG. 35). As an important point, the monitor light-receiving element mounting portion 23m is tilted with respect to a plane including the emitting portions of the light-emitting elements such that the monitor light-receiving element 23p mounted on the monitor light-receiving element mounting portion 23m obliquely receives light emitted from the light-emitting elements. For this reason, reflected light from the light-receiving surface of the monitor light-receiving element 23p does not enter any light-emitting element, so the performance of the light-emitting elements increases. To impart such a function to the monitor light-receiving element 23p, the monitor light-receiving element mounting portion 23m is tilted with respect to the exit surface of the light-emitting element array, and metallizing interconnections 23n1 and 23n2 extend on both sides of the monitor light-receiving element 23p. The monitor light-receiving element 23p has a light-receiving surface on its front surface, an electrode on the front surface, and another electrode on the back surface. For this reason, one metallizing interconnection 23n1 comes into contact with the back surface of the monitor light-receiving surface while the other metallizing interconnection 23n2 is spaced apart from the monitor light-receiving element 23p and connected by, e.g., wire bonding.

The optical parallel transmission transmitter according to the second embodiment and its modification have been described with reference to FIGS. 17 and 27 to 38. However, the present invention is not limited to the above embodiment, and various changes and modifications can be made.

An optical parallel transmission transmitter according to the third embodiment will be described next with reference to FIGS. 17 and 39 to 49.

The basic differences between the optical parallel transmission transmitter according to the first embodiment and that according to the third embodiment are that a first flat plate 33b and lid 33e constructing an LD subcarrier 23 are formed from ceramic substrates, and a monitor light-receiving element 33p is arranged on the lid 33e. The difference between the second embodiment and the third embodiment is that light-emitting elements and monitor light-receiving element 33p are separated and independently mounted on separate components in the third embodiment. As common subjects of the first, second, and third embodiments, optical axis alignment between light-emitting elements and the core diameters of optical fibers is necessary, and more accurate positioning is required.

The optical parallel transmission transmitter according to the third embodiment will be described below. The same reference numerals denote components having the same functions throughout the drawings, and a detailed description thereof will be omitted.

The optical parallel transmission transmitter according to the third embodiment after resin molding has the shape shown in FIG. 17. The function and arrangement are the same as in the above embodiment, and a detailed description thereof will be omitted.

Figure 39:
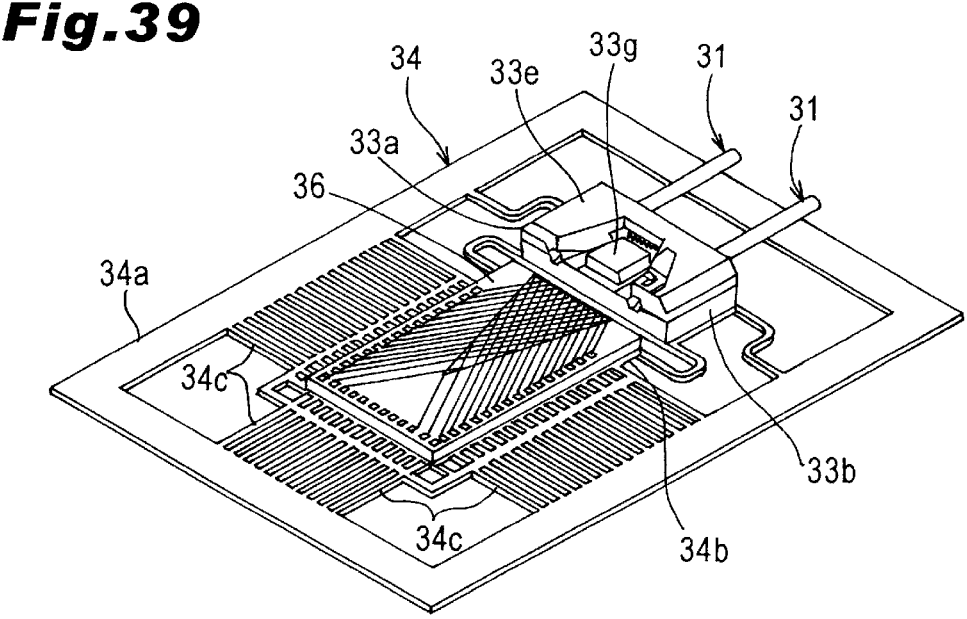
FIG. 39 is a perspective view showing the optical parallel transmission transmitter before resin molding, which is usable for the optical parallel transmission transmitter according to the second embodiment of the present invention and is viewed from the ceramic substrate 26 side while omitting an MT ferrule 32.
Figure 40:
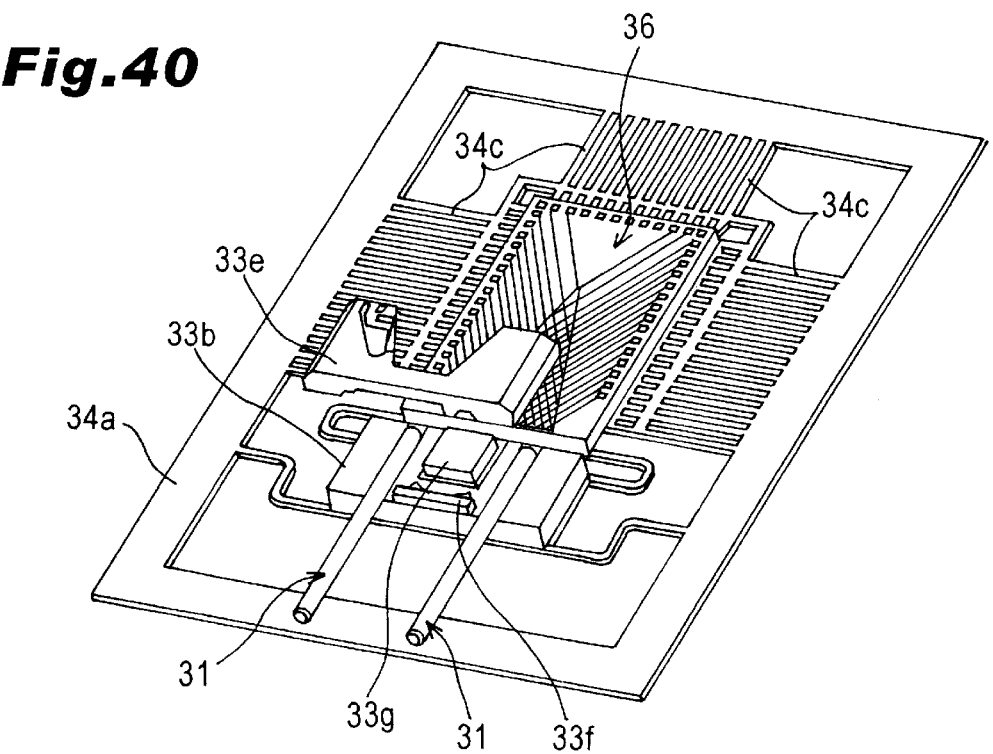
FIG. 40 is a perspective view showing a state wherein a lid 33e of the optical parallel transmission transmitter shown in FIG. 39 is removed.

FIGS. 39 and 40 show the optical parallel transmission transmitter according to this embodiment before resin molding. FIG. 39 is a perspective view showing the optical parallel transmission transmitter before resin molding, which is viewed from a ceramic substrate 26 side while omitting an MT ferrule 32. FIG. 40 is a perspective view showing a state wherein the lid 33e of the optical parallel transmission transmitter shown in FIG. 39 is detached. FIGS. 39 and 40 are schematic views aiming at clarity, and, for example, wires for connecting the LD subcarrier 33 and ceramic substrate 36 are not illustrated.

Guide pins 31 and lead frame 34 are held by a mold for resin molding whereby the relative position between the guide pins 31, MT ferrule 32, LD subcarrier 33, lead frame 34, and ceramic substrate 36, which are fixed by a mold package (FIG. 17), is accurately realized. At this stage, the guide pins 31, MT ferrule 32, and LD subcarrier 33 are accurately assembled with reference to the guide pins 31.

The guide pins 31 are normally formed from a metal and have a length longer than at least the total length of the MT ferrule 32 and LD subcarrier 33 juxtaposed each other. Another MT connector (not shown) is inserted on the guide pins 31 projecting from the MT ferrule 32. To facilitate insertion, the distal ends of the guide pins 31 are tapered. The guide pins 31 inserted into the MT ferrule 32 are not fixed. However, to prevent the other MT connector from removing the guide pins 31 when the other MT connector is detached, the guide pins 31 are held in the MT ferrule 32 by a certain force. A plurality of V-grooves are formed between the guide pins 31 at a predetermined interval in parallel to the longitudinal direction of the guide pins 31. A plurality of optical fibers are fixed in the grooves. Hence, the plurality of optical fibers are arrayed at a predetermined pitch that normally matches the standard of the other MT ferrule.

Although not illustrated in FIG. 39, the MT ferrule 32 has the same function as that of the optical parallel transmission receiver according to the first embodiment and has at least a function of holding a plurality of optical fibers and the guide pins 21. For this purpose, the MT ferrule 32 has fiber holding portions corresponding to the number of optical fibers to be held and pin holding portions corresponding to the number of guide pins 31 to be held. The detailed structure is substantially the same as that of the optical parallel transmission transmitter according to the first embodiment, and a detailed description thereof will be omitted (FIGS. 21 and 22).

The LD subcarrier 33 according to the third embodiment is more advantageous than the LD subcarriers 13 and 23 of the first and second embodiments because the number of components is smaller, and the structure is simple. A lead frame for the LD subcarrier 33 is unnecessary. Hence, the LD subcarrier 33 is constructed by the first flat plate 33b and lid 33e and is attached between the MT ferrule 32 and the ceramic substrate 36 with reference to the guide pins 31. To accurately position the LD subcarrier 33 with respect to the MT ferrule 32, through holes 33a each for receiving one end of a corresponding one of the guide pins 31 are formed in the LD subcarrier 33. A light-emitting element array 33f (FIG. 40) and driver IC array 33g are accurately mounted on the LD subcarrier 33 with reference to the through holes 33a.

For this reason, the plurality of optical fibers attached to the MT ferrule 32 and the plurality of light-emitting element arrays 33f mounted on the LD subcarrier 33 can be easily accurately optically coupled. In this embodiment, the LD subcarrier 33 and ceramic substrate 36 are connected by wires. The lid 33e is formed from a ceramic material and fixed to the first flat plate 33b by bonding. After that, the guide pins 31 are inserted into the through holes 33a and fixed.

The lead frame 34 comprises a support lead 34a which forms a rectangular frame, a die pad 34b on which the ceramic substrate 36 is mounted, and lead pins 34c for connecting the die pad 34b and support lead 34a.

The ceramic substrate 36 is mounted on the die pad 34b of the lead frame 34. The ceramic substrate 36 need not be strictly positioned as far as it is connected to the LD subcarrier 33 by wires. Electronic circuits (signal processing circuit, waveform shaping circuit, amplification circuit, APC circuit, and the like) necessary for driving the light-emitting elements are formed on the upper surface of the ceramic substrate 36.

FIGS. 41 to 44 are perspective views showing the LD subcarrier 33 usable in this embodiment. FIGS. 45 to 49 are perspective views showing the lid 33e of the LD subcarrier 33 usable in this embodiment. To clearly indicate details, wires for connecting the light-emitting element array 33f and driver IC array 33g are not illustrated.

As an important point, the plurality of optical fibers (e.g., a fiber array) and the plurality of light-emitting elements (e.g., a light-emitting element array) are more accurately positioned using the guide pins as a mechanical reference such that the optical axis of each optical fiber is aligned with that of a corresponding light-emitting element. It is difficult to accurately position optical fibers and light-emitting elements held by separate members on the µm order. However, accurate positioning is realized through the guide pins by accurately forming holes for fixing the guide pins in the two members.

The LD subcarrier 33 usable in the third embodiment will be described below in more detail. As important points, a ceramic material is used for the LD subcarrier, and a monitor light-receiving element is attached to the lower surface of the lid.

The LD subcarrier 33 comprises the first flat plate 33b and lid 33e. The first flat plate 33b is formed from a ceramic material having a rectangular outline. The LD subcarrier 33 has no opening portions, unlike the LD subcarriers 13 and 23 (FIGS. 24 and 35) according to the first and second embodiments. A pair of trapezoidal grooves are formed in a flat substrate. A first region 33i for mounting the light-emitting element array 33f is formed on the upper side (or lower side) of the central portion. A second region 33h (not shown) for mounting the driver IC array 33g is formed on the lower side (or upper side). The second region 33h has a sufficient size to accommodate the driver IC array 33g. The LD subcarrier according to this embodiment has no lead frame, unlike the receiver or the LD subcarriers according to the first and second embodiments. The driver IC array 33g is formed into an almost parallelepiped chip shape (FIGS. 41 to 44) and has electrodes (not shown) formed on the front surface. For this reason, the driver IC array 33g can be easily connected to the electrodes on the ceramic substrate 36 by wire bonding. Predetermined metallizing patterns 33n1 and 33n2 are formed on the upper surface of the lid 33e. A mounting portion 33q (FIG. 49) is provided at a position corresponding to the light-emitting elements of the light-emitting element array 33f.

When the ceramic is used for the first flat plate 33b and lid 33e, the problem of parasitic capacitance is less serious, and the performance improves as compared to the conventional silicon substrate accurately microfabricated. In addition, since the ceramic is more inexpensive than silicon, the cost of products is expected to be lower.

On the other hand, the positional accuracy of the first region 33h can be lower than that of the first region 33i because there is no restriction for optical coupling to optical fibers, and the driver IC array 33g is connected to the light-emitting element array 33f and ceramic substrate 36 by wire bonding. For this reason, the first region 33i is formed to have a relatively large size such that the jig (e.g., a collet) for wire bonding can be used without any problem. A monitor light-receiving element 33p is arranged at a corresponding portion of the lid 33e arranged between the first region 33h and second region 33i (FIG. 41).

Figure 41:
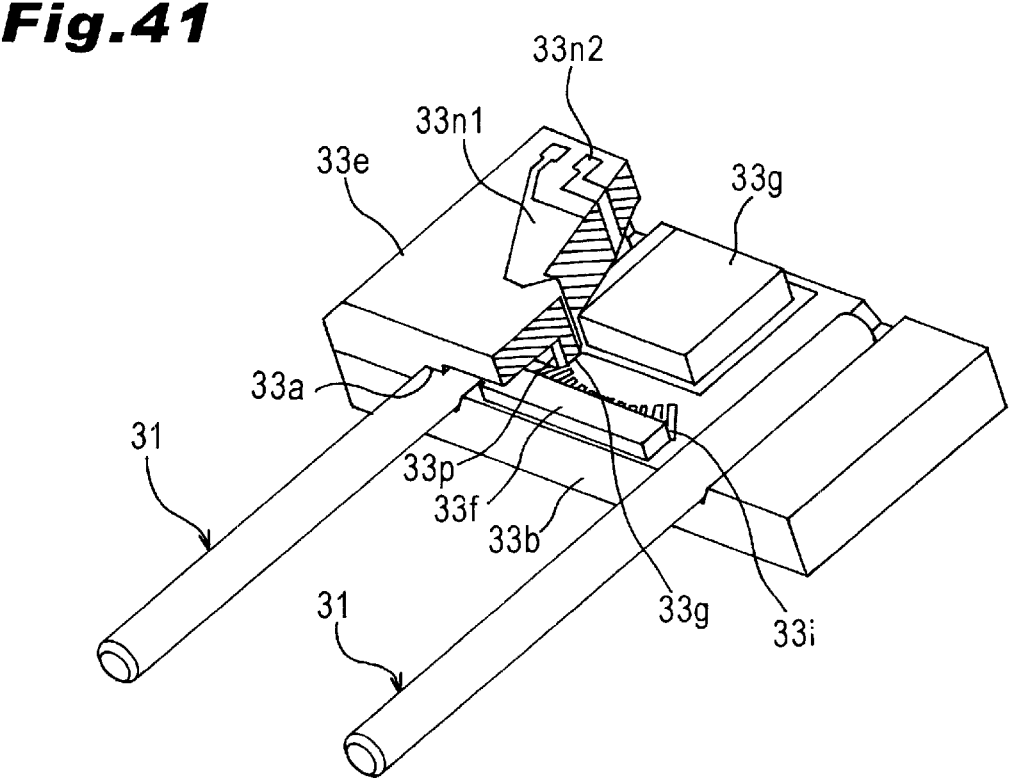
FIG. 41 is a perspective view showing an LD subcarrier 33 usable for an optical parallel transmission transmitter according to the third embodiment of the present invention.
Figure 42:
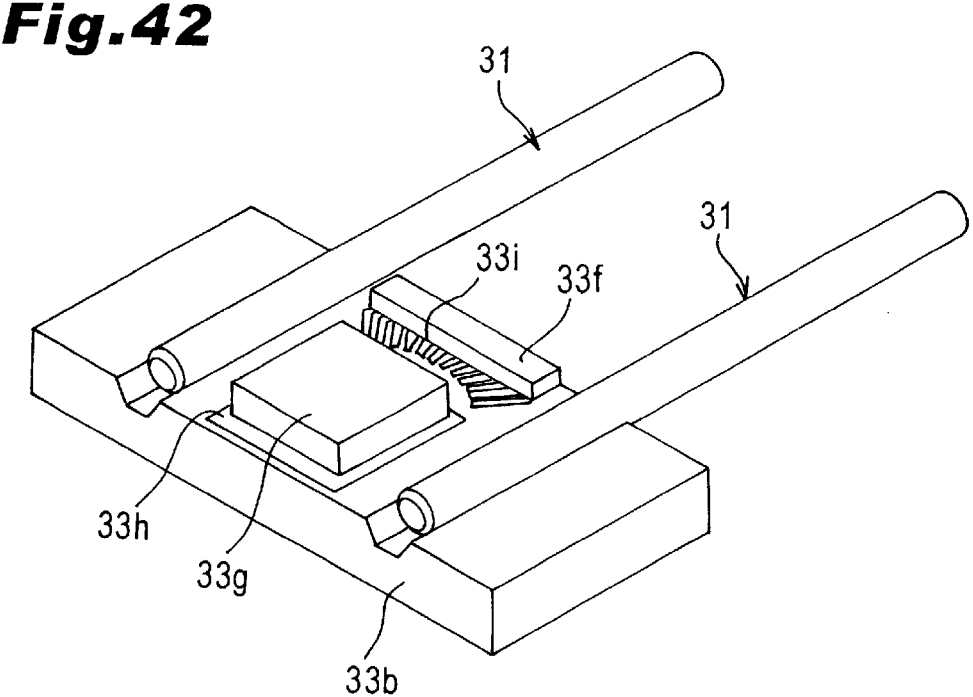
FIG. 42 is a perspective view showing the LD subcarrier 33 usable for the optical parallel transmission transmitter according to the third embodiment of the present invention.
Figure 43:
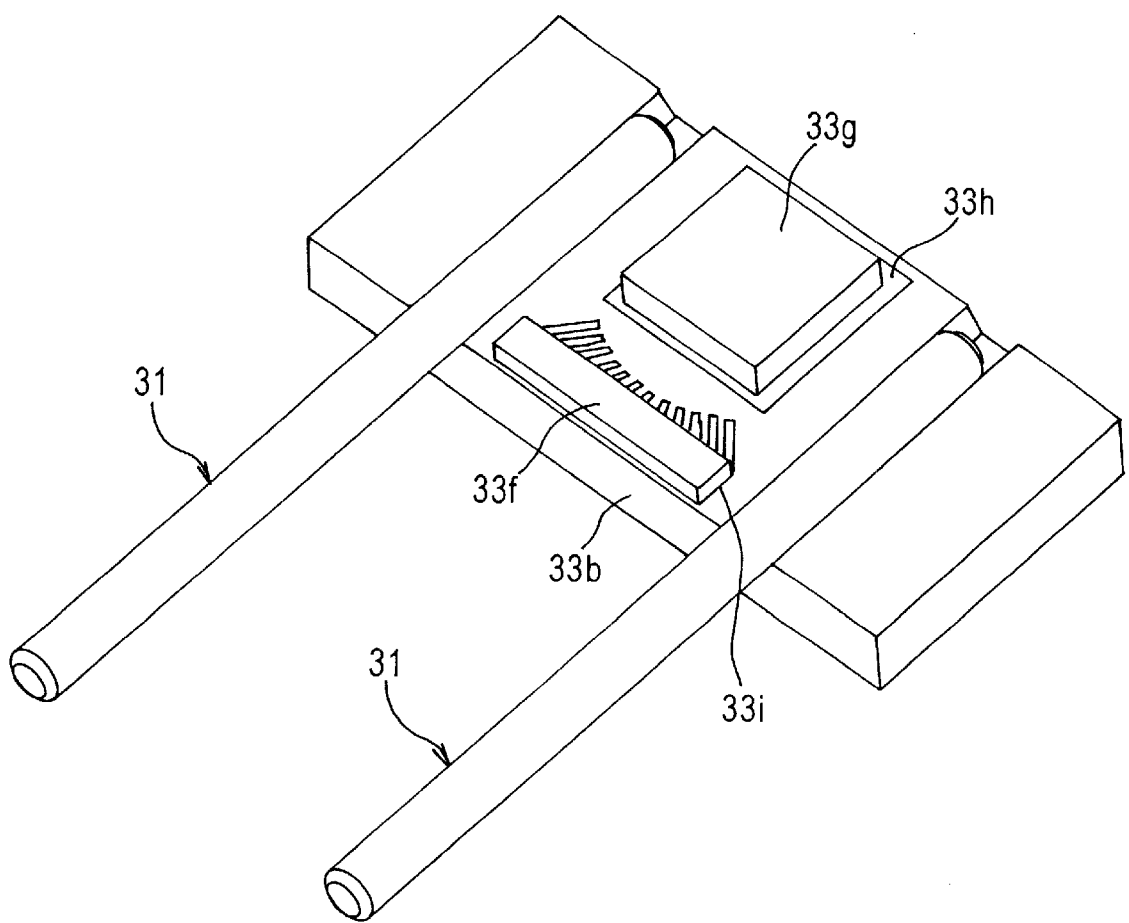
FIG. 43 is a perspective view showing the LD subcarrier 33 usable for the optical parallel transmission transmitter according to the third embodiment of the present invention.
Figure 44:
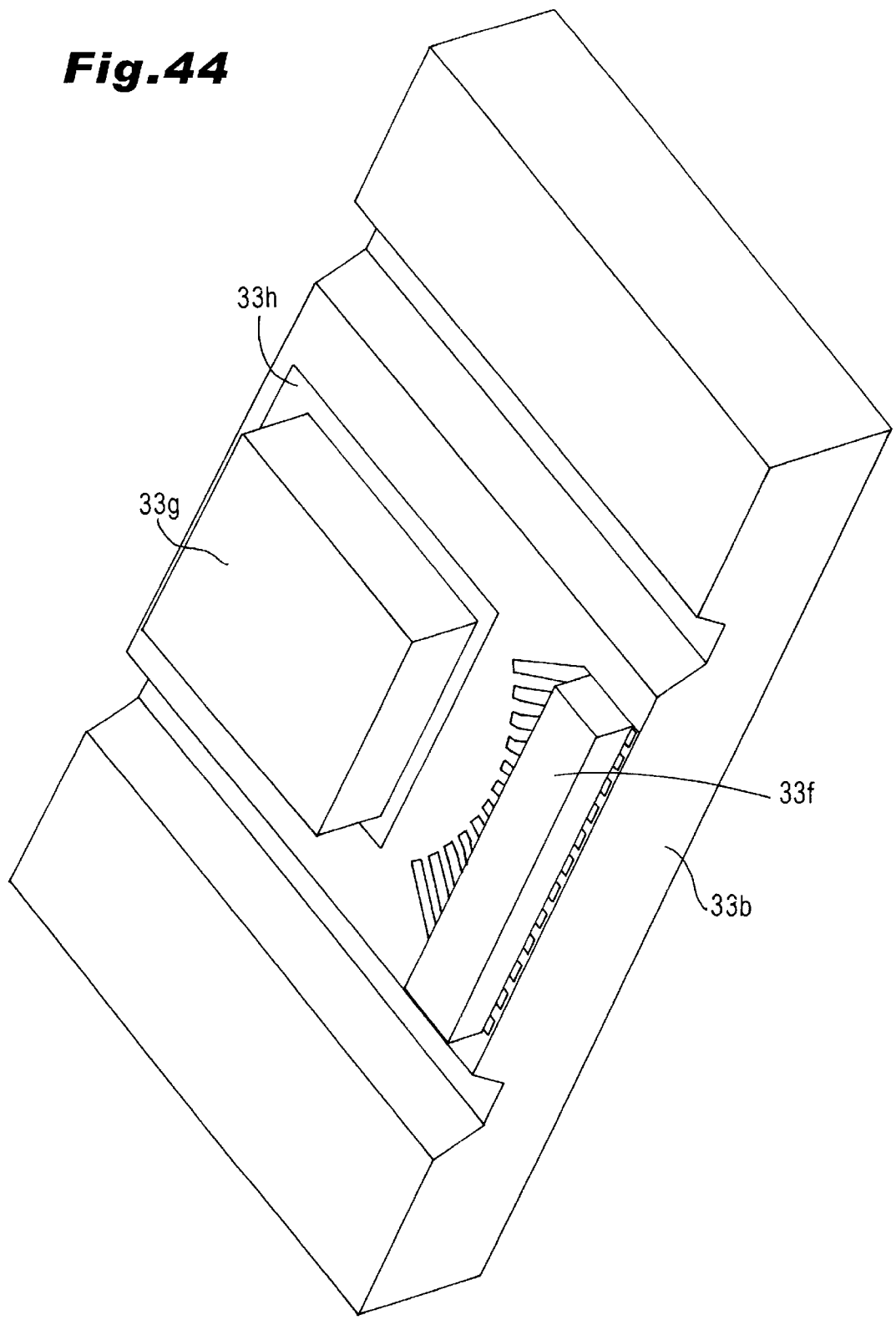
FIG. 44 is a perspective view showing the LD subcarrier 33 usable for the optical parallel transmission transmitter according to the third embodiment of the present invention.
Figure 45:
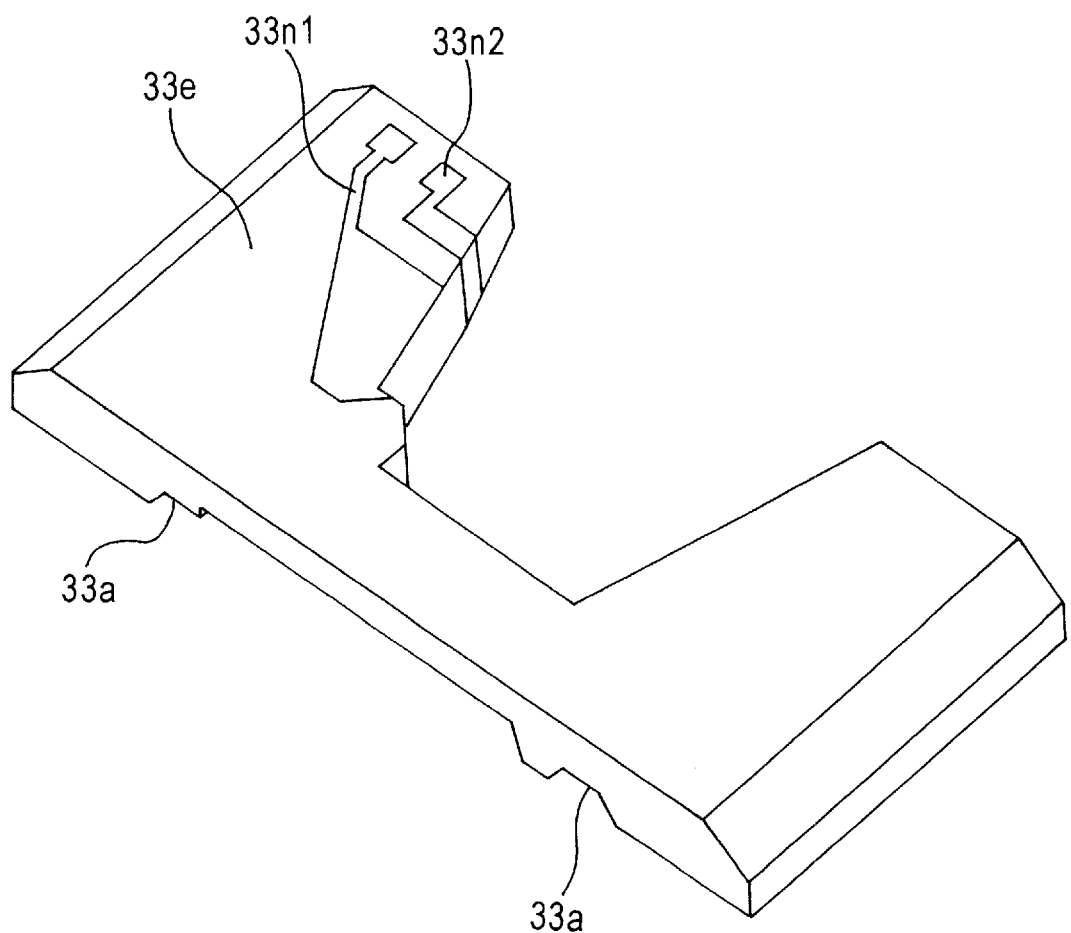
FIG. 45 is a perspective view showing the lid 33e of the LD subcarrier 33 usable for the optical parallel transmission transmitter according to the third embodiment of the present invention.
Figure 46:
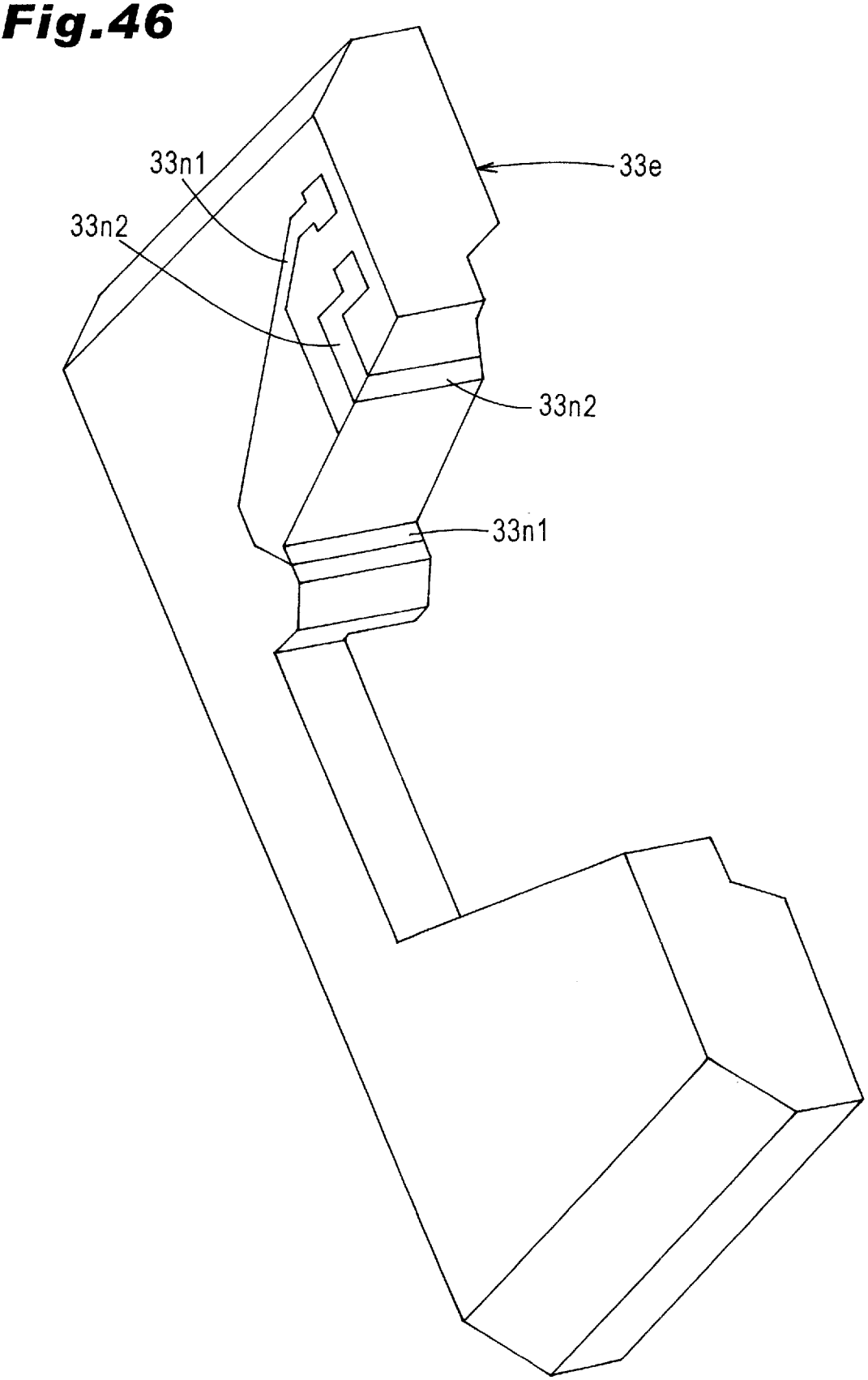
FIG. 46 is a perspective view showing the lid 33e of the LD subcarrier 33 usable for the optical parallel transmission transmitter according to the third embodiment of the present invention.
Figure 47:
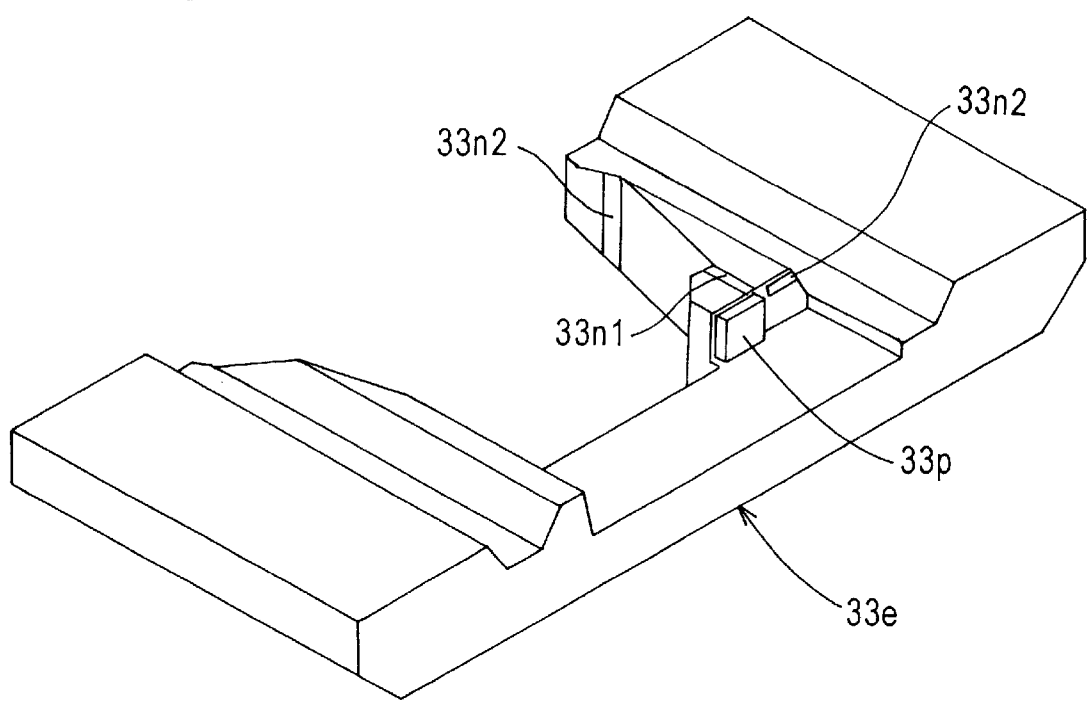
FIG. 47 is a perspective view showing the lid 33e of the LD subcarrier 33 usable for the optical parallel transmission transmitter according to the third embodiment of the present invention.
Figure 48:
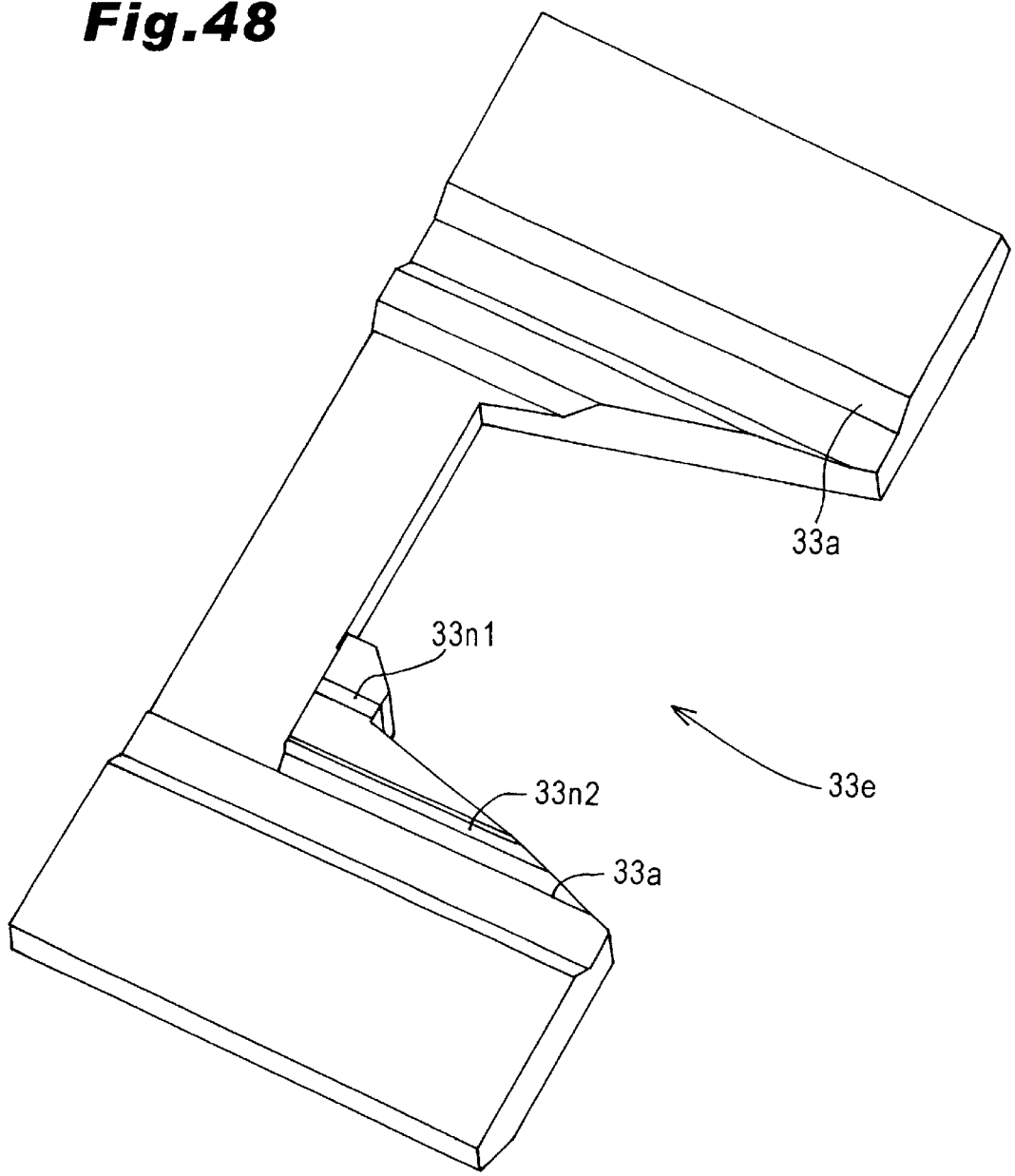
FIG. 48 is a perspective view showing the lid 33e of the LD subcarrier 33 usable for the optical parallel transmission transmitter according to the third embodiment of the present invention.
Figure 49:
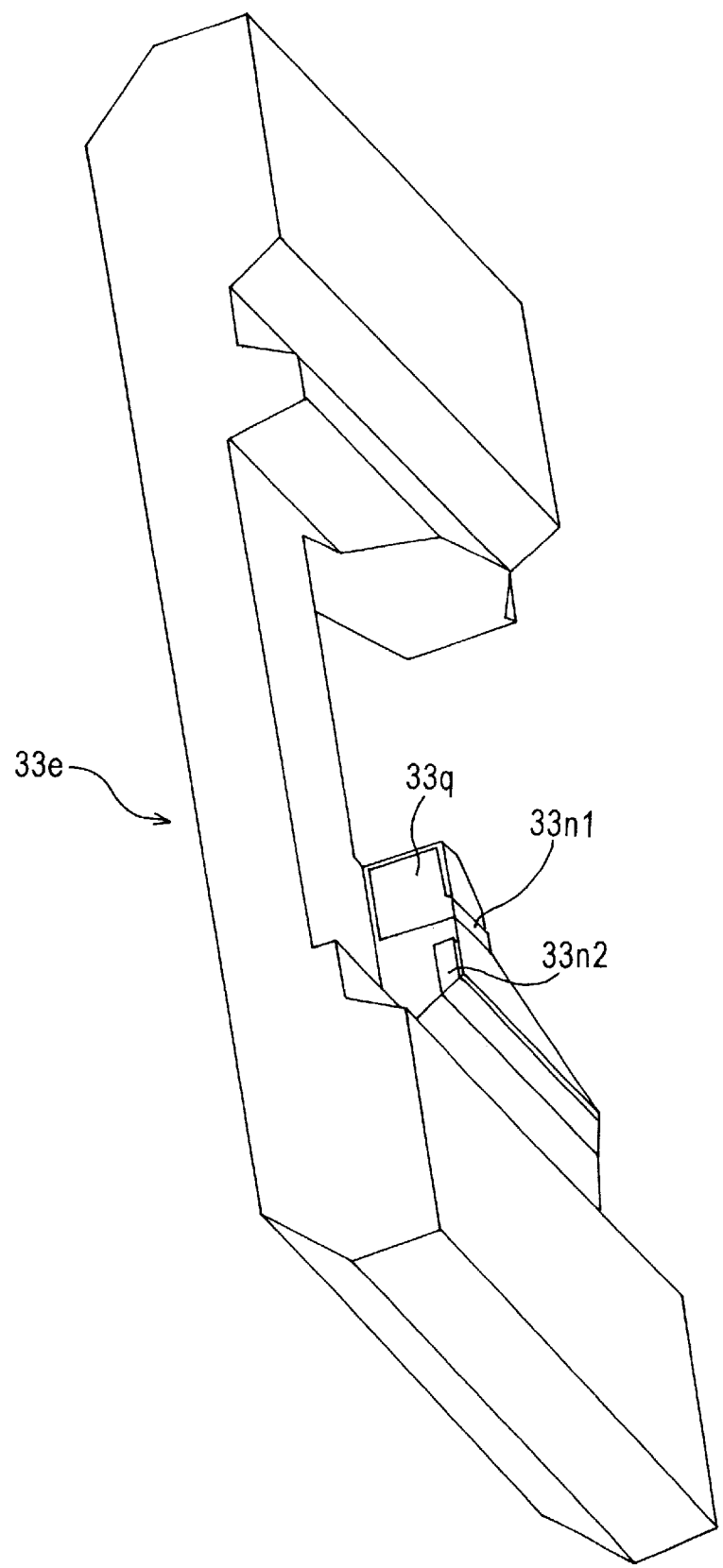
FIG. 49 is a perspective view showing the lid 33e of the LD subcarrier 33 usable for the optical parallel transmission transmitter according to the third embodiment of the present invention.

As an important point, the monitor light-receiving element mounting portion 33q is tilted with respect to a plane including the emitting portions of the light-emitting elements such that the monitor light-receiving element 33p mounted on the mounting portion 33q obliquely receives light emitted from the light-emitting elements (FIGS. 41 and 47). For this reason, reflected light from the light-receiving surface of the monitor light-receiving element 33p does not enter any light-emitting element, so the performance of the light-emitting elements increases. To impart such a function to the monitor light-receiving element 33p, the monitor light-receiving element mounting portion 33q is tilted with respect to the exit surface of the light-emitting element array 33f, and metallizing interconnections 33n1 and 33n2 extend on both sides of the monitor light-receiving element 33p (FIGS. 47 and 49). The monitor light-receiving element 33p has a light-receiving surface on its front surface, an electrode on the front surface, and another electrode on the back surface. For this reason, one metallizing interconnection 33n1 comes into contact with the back surface of the monitor light-receiving surface while the other metallizing interconnection 33n2 is spaced apart from the monitor light-receiving element 33p and connected by, e.g., wire bonding.

According to the optical parallel transmission transmitter of the third embodiment, the mounting area 23m (FIG. 35) allocated to the monitor light-receiving element in the second embodiment can be effectively used without damaging the required function. In addition, high-level functional pattern design can be realized on a ceramic substrate. Hence, the degree of freedom in design can be increased. Furthermore, since the lid 33e has not only the guide holding function but also the region 33q on the lower surface where the monitor light-receiving element can be mounted, the substrate layout mounted on the light-emitting elements obtains a margin.

The present invention is not limited to the above embodiment, and various changes and modifications can be made.

Figure 50:
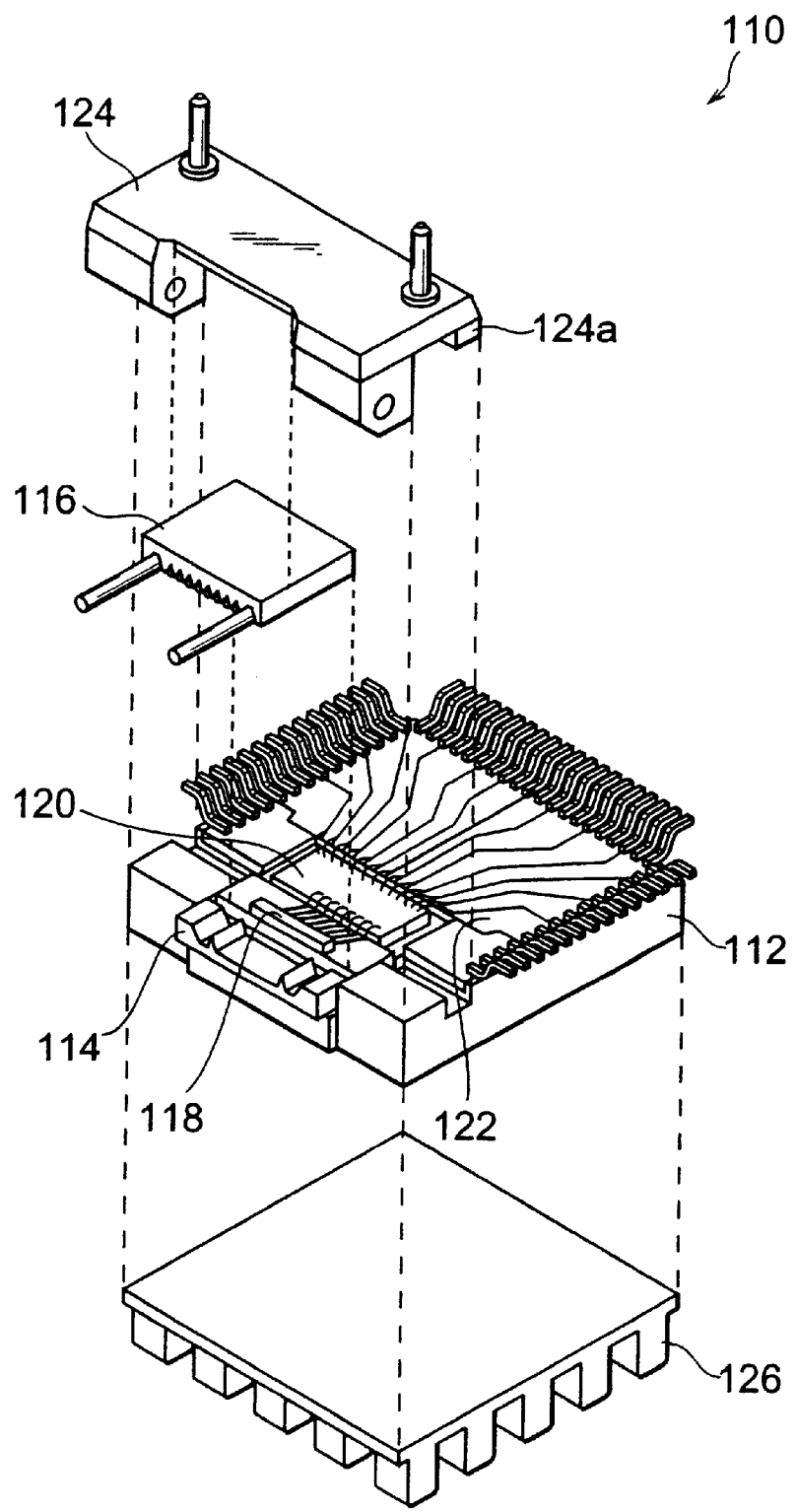
FIG. 50 is an exploded perspective view of a light-emitting module.
Figure 51:
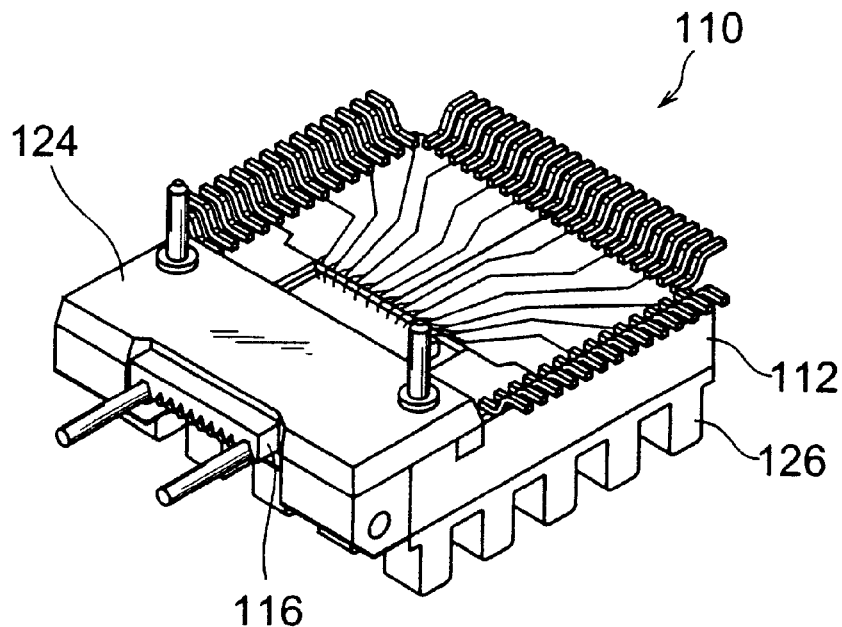
FIG. 51 is a perspective view of the light-emitting module.

A light-emitting module according to an embodiment of the present invention will be described next with reference to the accompanying drawings. The light-emitting module according to this embodiment includes an optical module substrate according to an embodiment of the present invention. The arrangement of the light-emitting module according to this embodiment will be described first. FIG. 50 is an exploded perspective view of the light-emitting module according to this embodiment. FIG. 51 is a perspective view of the light-emitting module according to this embodiment.

In a light-emitting module 110 according to this embodiment, as shown in FIGS. 50 and 51, a platform 114

(optical module substrate), optical fiber array 116, semiconductor laser array 118, LSI 120 (driving circuit), and wiring board 122 are mounted on a base 112, the optical fiber array 116 and semiconductor laser array 118 are covered with a fixing piece 124, and a heat dissipation fin 126 is provided on the lower surface side of the base 112. Each constituent component will be described below in detail.

Figure 52:
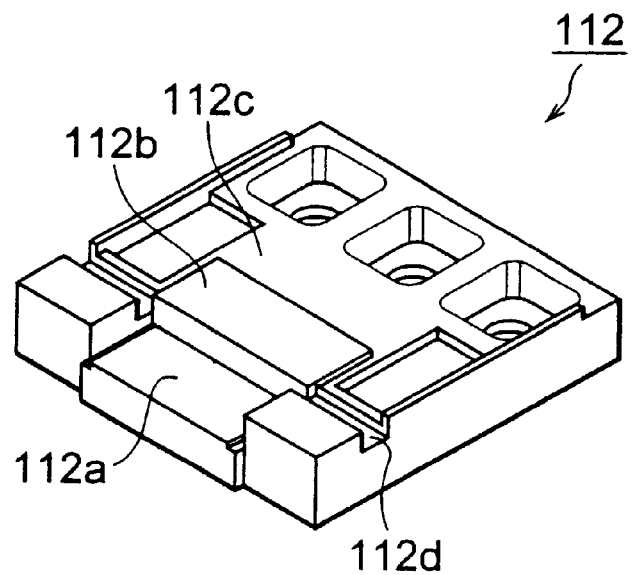
FIG. 52 is a perspective view of a base.

FIG. 52 is a perspective view of the base 112. The base 112 is made of a metal having a high heat transfer rate, such as copper, or a ceramic and has an almost parallelepiped shape having a volume sufficiently larger than that of the platform 114, optical fiber array 116, semiconductor laser array 118, or LSI 120. A recessed platform mounting region 112a for mounting the platform 114, projecting LSI mounting region 112b for mounting the LSI 120, and a recessed wiring board mounting region 112c for mounting the wiring board 122 are formed on the upper surface of the base 112. A recessed portion 112d to fit on a projecting portion 124a (FIG. 50) of the fixing piece 124 is formed in the upper surface of the base 112. When the projecting portion 124a of the fixing piece 124 is fitted in the recessed portion 112d, the fixing piece 124 can be fixed to the base 112, and the semiconductor laser array 118 and the like can be packaged.

Figure 53:
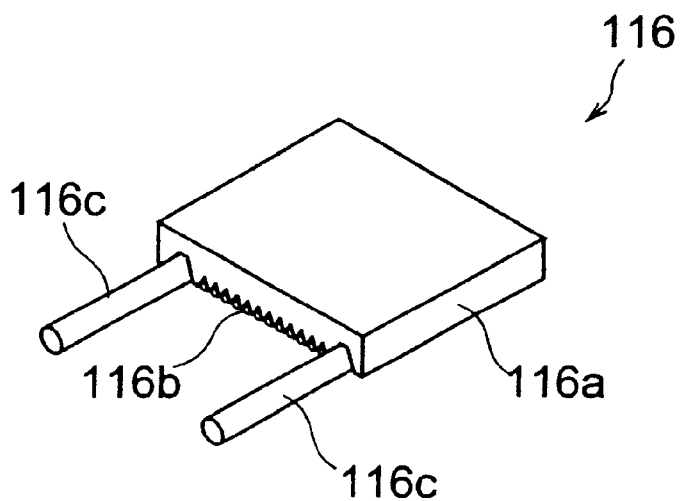
FIG. 53 is a perspective view of an optical fiber array.

FIG. 53 is a perspective view of the optical fiber array 116 viewed from the upper surface side.

Figure 54:
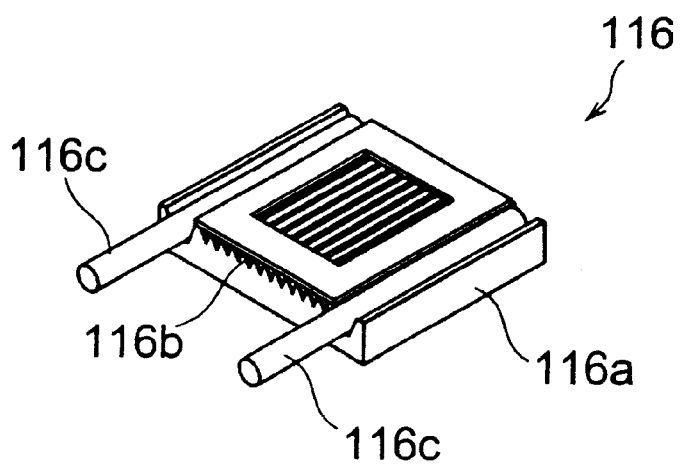
FIG. 54 is a perspective view of the optical fiber array.

FIG. 54 is a perspective view of the optical fiber array 116 viewed from the lower surface side. The optical fiber array 116 has a structure in which 12 optical fibers 116b with the same lengths are arrayed on a substrate 116a in parallel at equal intervals, and two pins 116c with the same length are arranged outside the 12 optical fibers 116b so as to be parallel to the optical fibers 116b. More specifically, 12 optical fiber reception V-grooves extending from one side surface side to the other side surface side opposing the side surface are formed in the substrate 116a in parallel at equal intervals. Each of the 12 optical fibers 116b is inserted to a corresponding one of the optical fiber reception V-grooves and bonded. The length of the optical fibers 116b equals that of the optical fiber reception V-grooves. The optical fibers 116b are arrayed such that the two end portions become flush with the two side surfaces of the substrate 116a. Two pin reception grooves are formed in the substrate 116a so as to sandwich the optical fiber reception V-grooves. Each of the two pins 116c is inserted to a corresponding one of the pin reception grooves. The pins 116c are longer than the pin reception grooves. Each pin 116c is arranged such that one end portion projects from the side surface of the substrate 116a. A glass plate having an opening at the center is placed on the optical fibers 116b.

Figure 55:
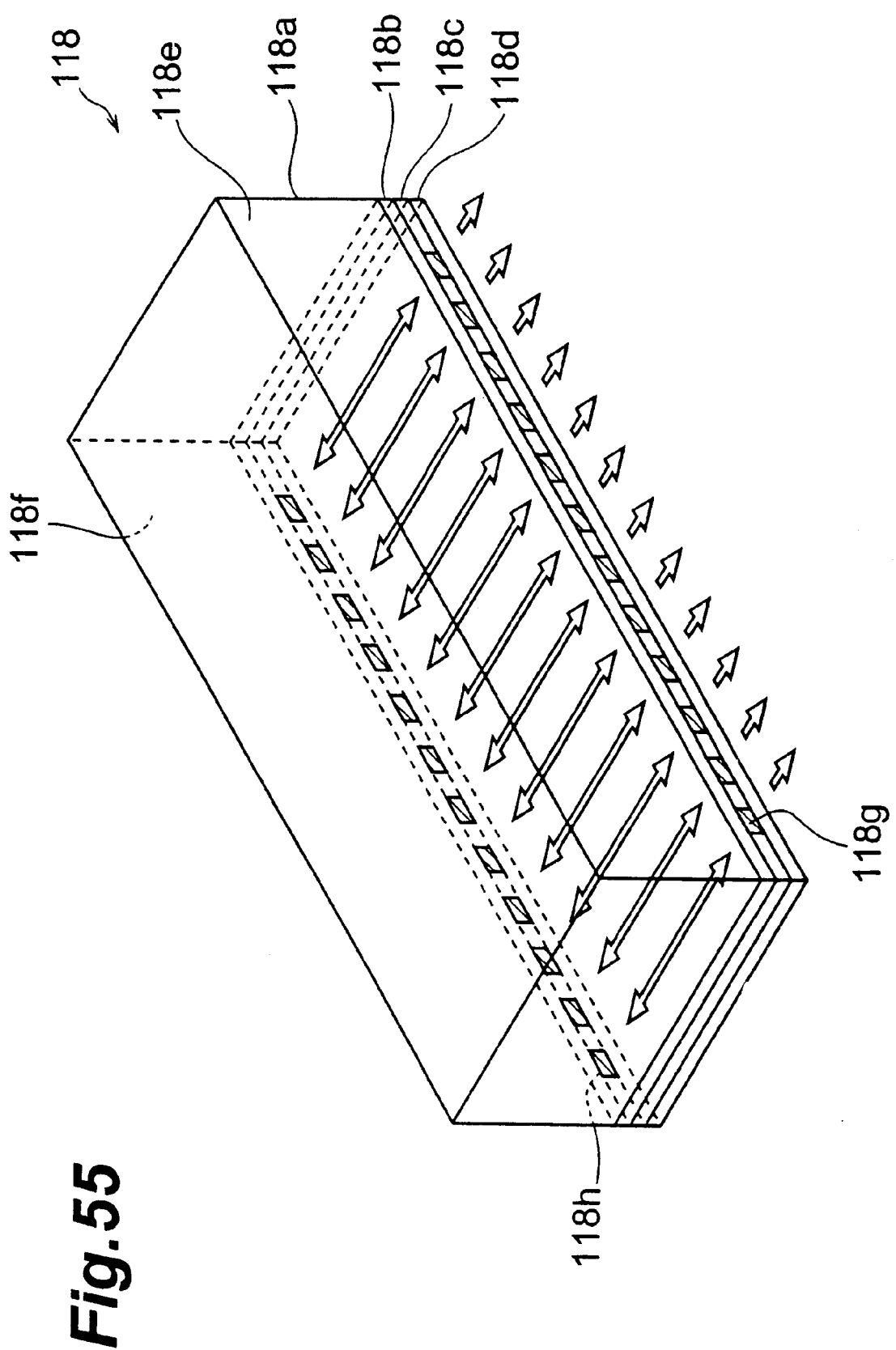
FIG. 55 is a perspective view of a semiconductor laser array.

As shown in FIG. 55, the semiconductor laser array 118 is constructed by sequentially stacking a cladding layer 118b, active layer 118c, and cladding layer 118d on a substrate 118a and forming an emitting surface 118e and reflection surface 118f, which oppose each other, in parallel to the stacking direction. At portions of the incident surface 118e, where the active layer 118c is located, 12 emission regions 118g are formed. At portions of the reflection surface 118f, where the active layer 118c is located, 12 reflection regions 118h are formed to oppose the 12 emission regions 118g, respectively. Hence, each of the reflection regions 118h and a corresponding one of the 12 emission regions 118g construct a laser resonator, and a laser beam is emitted from each of the 12 emission regions.

Figure 56:
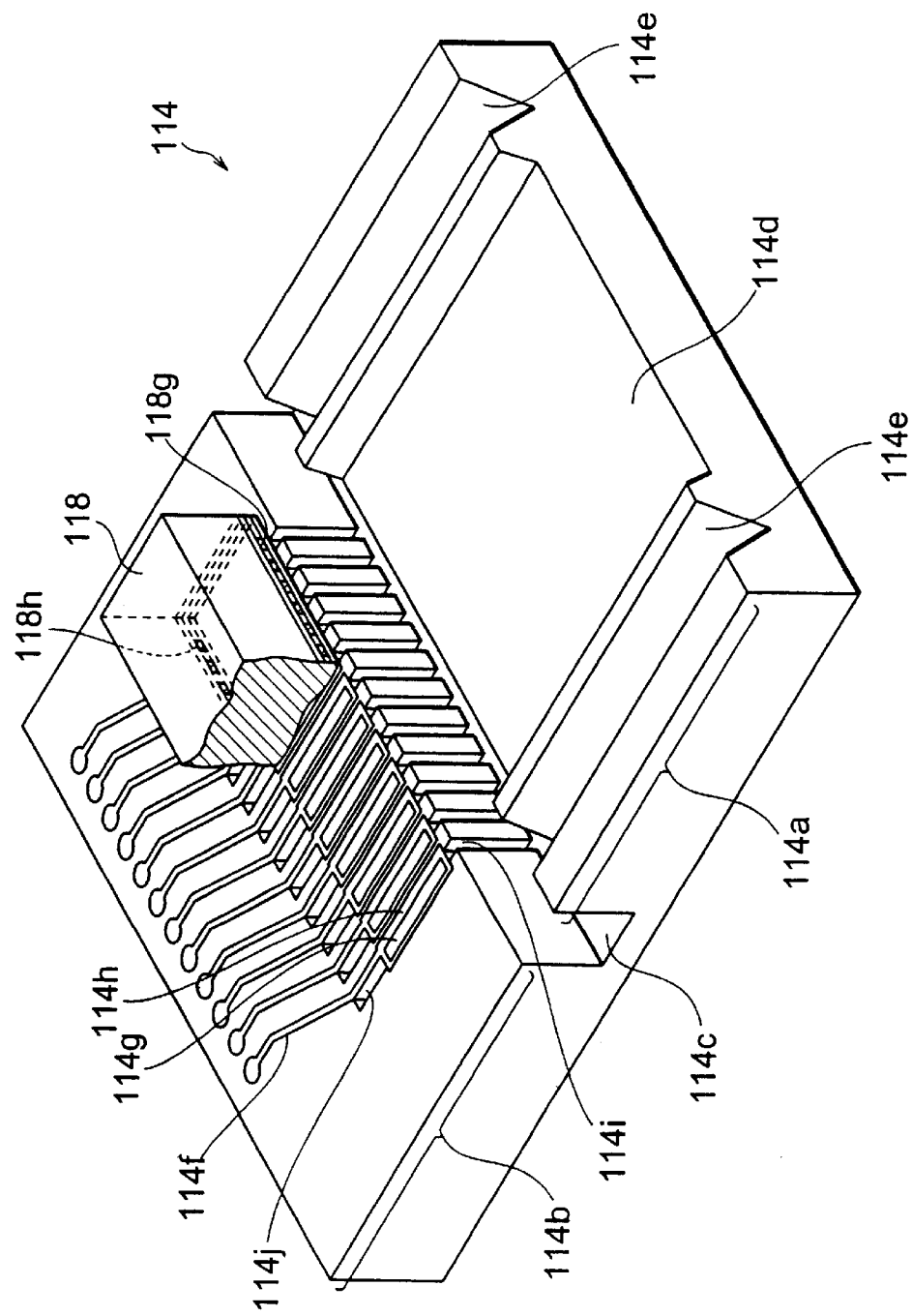
FIG. 56 is a perspective view of a platform.

FIG. 56 is a perspective view of the platform 114. The platform 114 is made of silicon and has an almost flat plate shape. An optical fiber array mounting region 114a for mounting the optical fiber array 116, a semiconductor laser array mounting region 114b for mounting the semiconductor laser array 118, and a linear groove portion 114c for partitioning the optical fiber array mounting region 114a and the semiconductor laser array mounting region 114b are formed on one major surface (to be referred to as a mounting surface hereinafter) of the platform 114.

In the optical fiber array mounting region 114a, groove portions 114d and 114e where the optical fibers 116b and two pins 116c of the optical fiber array 116 are to be arranged are formed perpendicular to the groove portion 114c.

In the semiconductor laser array mounting region 114b, printed interconnections 114f for supplying a driving current to each of the 12 laser resonators of the semiconductor laser array 118 are formed. Especially, pad portions 114h each having a solder film 114g are formed at a portion immediately under the semiconductor laser array 118. Twelve groove portions 114i and 114j are formed at positions corresponding to the 12 emission regions 118g and 12 reflection regions 118h of the semiconductor laser array 118, respectively, in the semiconductor laser array mounting region 114b. More specifically, the 12 groove portions 114i extend, in the direction of laser beam emission, from portions corresponding to a portion immediately under the emission regions 118g when the semiconductor laser array 118 is mounted in the semiconductor laser array mounting region 114b. The 12 groove portions 114j extend, in the direction opposite to the laser beam emission direction, from portions corresponding to a portion immediately under the reflection regions 118h when the semiconductor laser array 118 is mounted in the semiconductor laser array mounting region 114b. The groove portions 114i and 114j can be accurately formed by etching using photolithography.

When the optical fiber array 116 is mounted on the platform 114 such that the optical fibers 116b and two pins 116c are arranged in the groove portions 114d and 114e, and the semiconductor laser array 118 is mounted in correspondence with the pad portions 114h, the optical fiber array 116 and semiconductor laser array 118 are positioned, and light emitted from each of the 12 emission regions of the semiconductor laser array 118 can be made to directly (without being reflected) become incident from one end of a corresponding one of the 12 optical fibers 116b and emerge from the other end. Consequently, each of the 12 emission regions of the semiconductor laser array 118 and a corresponding one of the 12 optical fibers 116b can be optically coupled. In addition, the platform 114 is mounted in the platform mounting region 112a of the base 112. Hence, the optical fiber array 116 and semiconductor laser array 118 are mounted on the base 112 via the platform 114.

The LSI 120 incorporates a driving circuit for driving the semiconductor laser array 118. The LSI 120 and the plurality of laser resonators of the semiconductor laser array 118 are electrically connected by the printed interconnections 114f formed on the platform 114. Hence, the plurality of laser resonators of the semiconductor laser array 118 can be independently ON/OFF-controlled by a driving signal from the LSI 120. The LSI 120 is mounted in the LSI mounting region 112b of the base 112.

Figure 57:
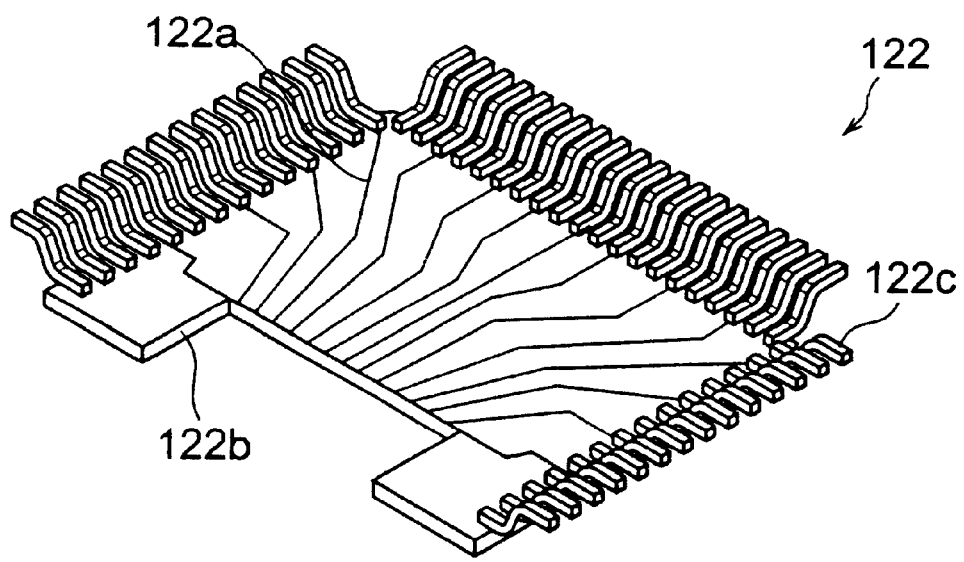
FIG. 57 is a perspective view of a wiring board.

As shown in FIG. 57, in the wiring board 122, a plurality of pins 122c are arranged around a substrate 122b having printed interconnections 122a. The pins 122c and LSI 120 are electrically connected through the printed interconnections 122a, and the LSI 120 can be externally controlled.

The heat dissipation fin 126 is formed from a metal having a high heat transfer rate, such as aluminum or copper, has a plurality of projecting portions formed on a flat plate having almost the same area as that of the base 112, and is in tight contact with the lower surface side of the base 112 (a surface on the opposite side of the surface having the platform 114 and the like), as shown in FIG. 50.

In the light-emitting module 110, the platform 114 and optical fiber array 116 are stacked to form an MT connector. An optical interface to an external optical transmission line is formed through this MT connector.

The function and effect of the light-emitting module according to this embodiment will be described next. In the light-emitting module 110 according to this embodiment, the groove portions 114*i* are formed in the mounting surface of the platform 114 at portions corresponding to the emission regions 118*g* of the semiconductor laser array 118. Hence, laser beams emitted from the emission regions 118*g* of the semiconductor laser array 118 and propagating while diverging in the direction of mounting surface of the platform 114 are not reflected by the mounting surface of the platform 114 and become incident on the groove portions 114*i* of the platform 114. Hence, reflection of the laser beams by the mounting surface is reduced. As a result, noise due to the reflected light decreases, and a light-emitting module free from noise is implemented.

Additionally, in the light-emitting module 110 according to this embodiment, the groove portions 114*j* are formed in the mounting surface of the platform 114 at portions corresponding to the reflection regions 118*h* of the semiconductor laser array 118. Hence, leakage light leaking from the reflection regions 118*h* of the semiconductor laser array 118 and propagating while spreading in the direction of mounting surface of the platform 114 is not reflected by the mounting surface of the platform 114 and becomes incident on the groove portions 114*j* of the platform 114. Hence, reflection of the leakage light by the mounting surface is reduced. As a result, noise due to the reflected light decreases, and a light-emitting module free from noise is implemented.

In the platform 114 of the light-emitting module 110 according to this embodiment, the 12 groove portions 114*i* are formed in correspondence with the 12 emission regions 118*g* of the semiconductor laser array 118, respectively. Instead, one integrated groove portion may be formed for the entire portion corresponding to the 12 emission regions 118*g* of the semiconductor laser array 118.

Similarly, in the platform 114 of the light-emitting module 110 according to this embodiment, the 12 groove portions 114*j* are formed in correspondence with the 12 reflection regions 118*h* of the semiconductor laser array 118, respectively. Instead, one integrated groove portion may be formed for the entire portion corresponding to the 12 reflection regions 118*h* of the semiconductor laser array 118.

A light-emitting module according to another embodiment of the present invention will be described next with reference to the accompanying drawings. In this embodiment, different platforms 214 and 232 are used in place of the platform 114 of the embodiment described with reference to FIGS. 50 to 57. The arrangement of the remaining parts is the same as in the above embodiment.

Figure 58:
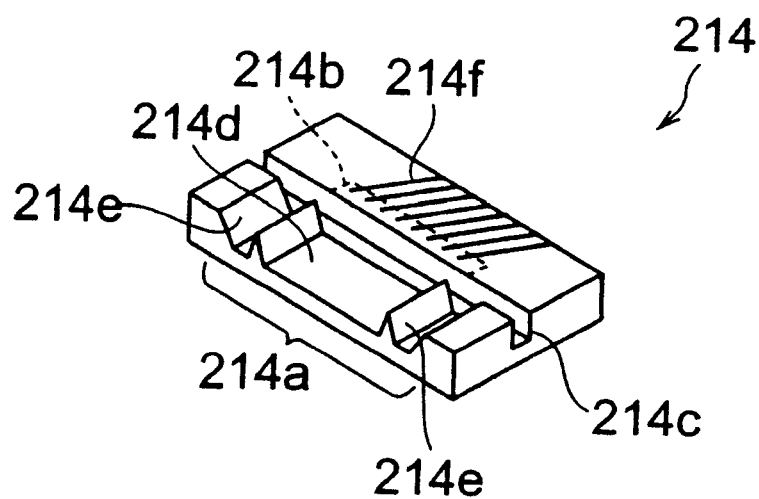
FIG. 58 is a perspective view of a platform.

FIG. 58 is a perspective view of the platform 214. The platform 214 is formed from an insulating ceramic such as alumina ceramic and has an almost flat plate shape. An optical fiber array mounting region 214*a* for mounting an optical fiber array 116, a semiconductor laser array mounting region 214*b* for mounting a semiconductor laser array 118, and a linear groove portion 214*c* for partitioning the optical fiber array mounting region 214*a* and the semiconductor laser array mounting region 214*b* are formed on one major surface of the platform 214. In the optical fiber array mounting region 214*a*, groove portions 214*d* and 214*e* where optical fibers 116*b* and two pins 116*c* of the optical fiber array 116 are to be arranged are formed perpendicular to the groove portion 214*c*. Hence, when the optical fiber array 116 is mounted on the platform 214 such that the optical fibers 116*b* and two pins 116*c* are arranged in the groove portions 214*d* and 214*e*, and the semiconductor laser array 118 is mounted such that the emitting surfaces are arranged along the edge of the groove portion 214*c*, the optical fiber array 116 and semiconductor laser array 118 are positioned, and light emitted from each of 12 light-emitting portions of the semiconductor laser array 118 can be made to directly (without being reflected) become incident from one end of a corresponding one of the 12 optical fibers 116*b* and emerge from the other end. Consequently, each of the 12 light-emitting portions of the semiconductor laser array 118 and a corresponding one of the 12 optical fibers 116*b* can be optically coupled. In addition, the platform 214 is mounted in a platform mounting region 112*a* of a base 112. Hence, the optical fiber array 116 and semiconductor laser array 118 are mounted on the base 112 via the platform 214. Printed interconnections 214*f* (to be described later) are formed on the upper surface of the platform 214.

An LSI 120 incorporates a driving circuit for driving the semiconductor laser array 118. The LSI 120 and the plurality of 1 light-emitting portions of the semiconductor laser array 118 are electrically connected by the printed interconnections 214*f* formed on the platform 214. Hence, the plurality of light-emitting portions of the semiconductor laser array 118 can be independently ON/OFF-controlled by a driving signal from the LSI 120. The LSI 120 is mounted in an LSI mounting region 112*b* of the base 112.

As shown in FIG. 57, in a wiring board 122, a plurality of pins 122*c* are arranged around a substrate 122*b* having printed interconnections 122*a*. The pins 122*c* and LSI 120 are electrically connected through the printed interconnections 122*a*, and the LSI 120 can be externally controlled.

The heat dissipation fin 126 is formed from a metal having a high heat transfer rate, such as aluminum or copper, has a plurality of projecting portions formed on a flat plate having almost the same area as that of the base 112, and is in tight contact with the lower surface side of the base 112 (a surface on the opposite side of the surface having the platform 214 and the like), as shown in FIG. 50.

In the light-emitting module 110, the platform 214 and optical fiber array 116 are stacked to form an MT connector. An optical interface to an external optical transmission line is formed through this MT connector.

The function and effect of the light-emitting module according to this embodiment will be described next. In the light-emitting module 110 according to this embodiment, since the platform 214 is formed from an insulating ceramic, no insulating film need be formed between the printed interconnections 214*f* the and platform 214, and a parasitic capacitance is prevented. As a consequence, operation errors due to such a parasitic capacitance are prevented. In addition, in the light-emitting module 110 according to this embodiment, since the platform 214 is formed from an insulating ceramic, the groove portions 214*c*, 214*d*, and 214*e* can be easily accurately formed on the platform 214. Hence, as compared to the platform 214 formed from silicon, the manufacturing cost does not increase, and the working accuracy does not lower, either.

The light-emitting module according to this embodiment has been described above. A light-receiving module can be constructed in almost the same way. More specifically, the semiconductor laser array 118 described with reference to FIG. 50 is replaced with a photodiode array 30 (light-receiving element array) for outputting an electrical signal corresponding to the light-receiving amount of each of 12 light-receiving portions, an amplification circuit for amplifying the electrical signal output from the photodiode array 30 is incorporated in the LSI 120, and the platform 214 is replaced with a platform 232 partially having a different shape, thereby constructing a light-receiving module according to an embodiment of the present invention. The differences from the light-emitting module 110 will be mainly described below in detail.

Figure 59:
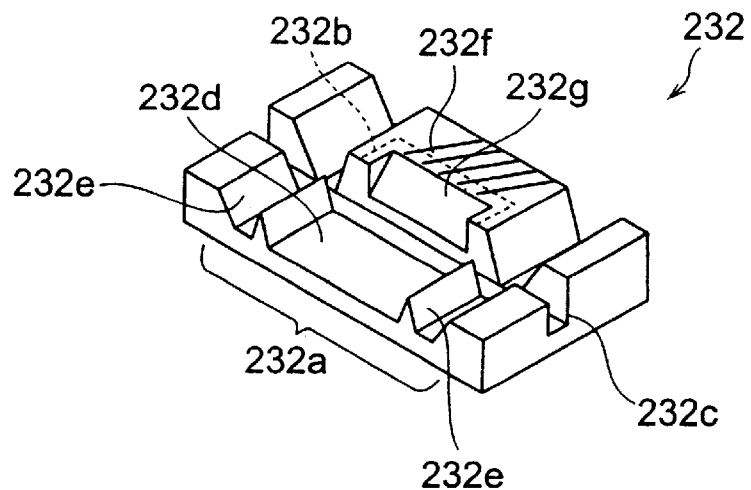
FIG. 59 is a perspective view of a platform.

FIG. 59 is a perspective view of the platform 232 used for the light-receiving module. Like the platform 214, the platform 232 is formed from an insulating ceramic such as alumina ceramic and has an almost flat plate shape. An optical fiber array mounting region 232a for mounting an optical fiber array 116, a photodiode array mounting region 232b for mounting the photodiode array 30, and a linear groove portion 232c for partitioning the optical fiber array mounting region 232a and the photodiode array mounting region 232b are formed on one major surface of the platform 232. In the optical fiber array mounting region 232a, groove portions 232d and 232e where optical fibers 116b and two pins 116c of the optical fiber array 116 are to be arranged are formed perpendicular to the groove portion 232c. The bottom surface of the groove portion 232d serves as the mounting surface for mounting the optical fiber array 116. Printed interconnections 232f for electrically connecting the photodiode array 30 and an LSI 120 are formed on the upper surface of the platform 232. In addition, at a portion opposing the groove portion 232d in the photodiode array mounting region 232b, a reflection surface 232g that makes an angle of 45° with respect to the mounting surface is formed (detailed function will be described later).

Figure 60:
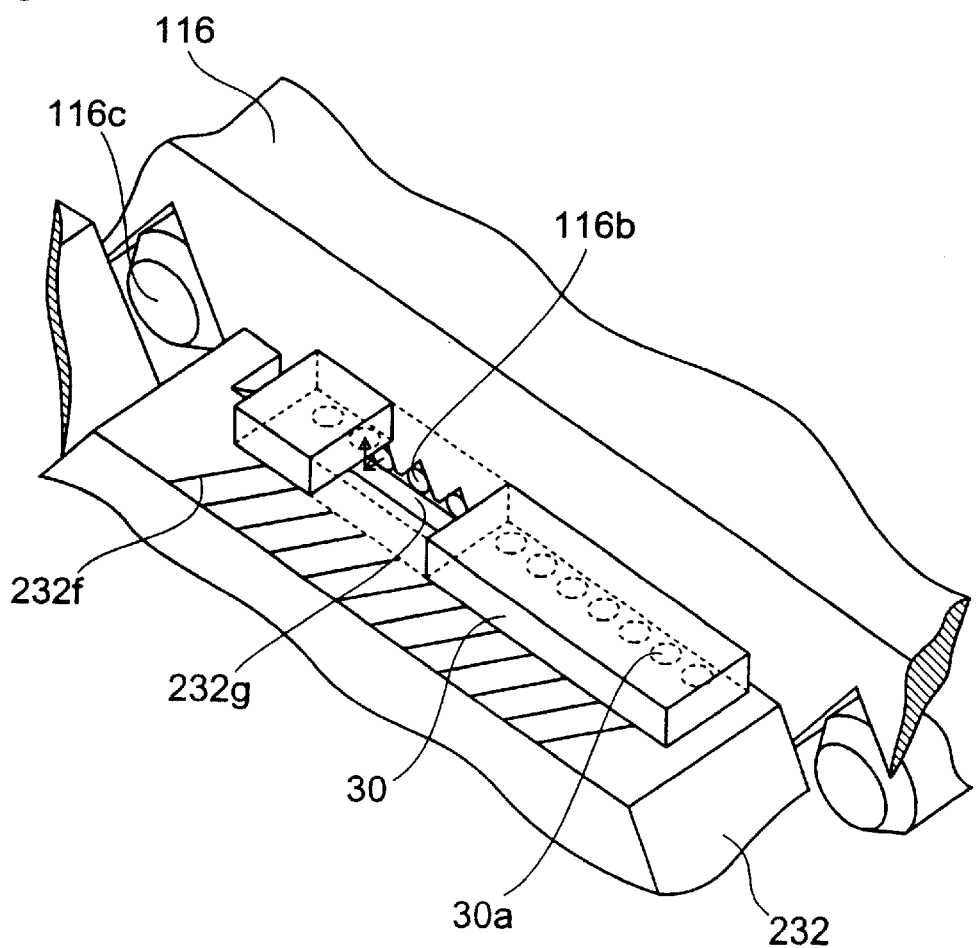
FIG. 60 is a view showing a state wherein an optical fiber array and photodiode array are mounted on the platform.

FIG. 60 is a view showing a state wherein the optical fiber array 116 and photodiode array 30 are mounted on the platform 232. The optical fiber array 116 is mounted in the optical fiber array mounting region 232a of the platform 232. The photodiode array 30 is mounted in the photodiode array mounting region 232b. More specifically, the optical fiber array 116 is arranged such that the optical fibers 116b of the optical fiber array 116 are arranged on the mounting surface of the platform 232, and one end portion of each optical fiber 116b opposes the reflection surface 232g of the platform 232. The photodiode array 30 is arranged such that the light-receiving surface becomes parallel to the mounting surface and opposes the reflection surface 232g of the platform 232. Alignment is done such that each of the 12 light-receiving portions of the photodiode array 30 is optically coupled to a corresponding one of the 12 optical fibers 116b of the optical fiber array 116 via the reflection surface 232g. That is, light emerging from one end portion of each optical fiber 116b of the optical fiber array 116 is reflected by the reflection surface 232g of the platform 232 and becomes incident on a corresponding one of the 12 light-receiving portions of the photodiode array 30. Twelve lens portions 30a are monolithically formed on the light-receiving surface of the photodiode array 30 so as to efficiently receive light incident on the light-receiving surface of the photodiode array 30.

In the light-receiving module according to this embodiment as well, since the platform 232 is formed from an insulating ceramic, a parasitic capacitance is prevented, and consequently, noise due to such a parasitic capacitance is prevented.

In a silicon platform, it is relatively hard to form a reflection surface that makes an angle of 45° with respect to the mounting surface because of the problem of crystal surface. However, in the platform 232 made of a ceramic, the reflection surface that substantially makes an angle of 45° with respect to the mounting surface can be easily accurately formed. As a result, the light-receiving module according to this embodiment can easily improve the optical coupling efficiency between the optical fiber array 116 and the photodiode array 30.

In the light-emitting module 110 and light-receiving module according to the above embodiments, the platforms 214 and 232 are formed from alumina ceramic. Instead, an insulating ceramic such as zirconia ceramic, calcium titanate ceramic, silicon nitride ceramic, or aluminum nitride ceramic may be used.

Industrial Applicability

With the above-described arrangements, the present invention can provide a structure capable of easily realizing operation of optically coupling a plurality of optical fibers and a plurality of optical elements (light-receiving elements or light-emitting elements).

In the optical module substrate of the present invention, when a groove portion is formed in the mounting surface for mounting a laser array, at a portion corresponding to an emission region, reflection of a laser beam emitted from the emission region by the mounting surface is reduced. As a consequence, noise due to the reflected light is reduced, and a light-emitting module free from noise can be constructed.

In the optical module substrate of the present invention, when a groove portion is formed in the mounting surface for mounting a laser array, at a portion corresponding to a reflection region, reflection of leakage light leaking from the reflection region by the mounting surface is reduced. As a consequence, noise due to the reflected light is reduced, and a light-emitting module free from noise can be constructed.

In the light-emitting module of the present invention, when the above optical module substrate is used, reflection of a laser beam emitted from the emission region of the laser array by the mounting surface is reduced, or reflection of leakage light leaking from the reflection region of the laser array by the mounting surface is reduced. As a consequence, noise due to the reflected light can be reduced.

When the optical module substrate of the present invention is formed from an insulating ceramic, no insulating film need be formed between the optical module substrate and printed interconnections formed thereof, and a parasitic capacitance is prevented. As a result, operation errors of a light-emitting module having this optical module substrate are prevented, or noise in a light-receiving module having this optical module substrate is reduced.

When the optical module substrate of the present invention is formed from an insulating ceramic, a reflection surface that substantially makes an angle of 45° with respect to the mounting surface of the optical fiber array can be easily accurately formed, and the optical coupling efficiency between the light-receiving element array and the optical fiber array can be easily improved.

When the light-emitting module of the present invention has the optical module substrate formed from an insulating ceramic, a parasitic capacitance is prevented, and consequently, operation errors are prevented.

When the light-receiving module of the present invention has the optical module substrate formed from an insulating ceramic, a parasitic capacitance is prevented, and consequently, noise is reduced.

What is claimed is:

1. An optical parallel transmission receiver with a plurality of light-receiving elements comprising:

a pair of guide pins;

optical fibers each corresponding to one of said light-receiving elements, respectively;

light-receiving element holding means, having a pair of guide-pin holes for holding one end of corresponding said guide pins in parallel, for holding said plurality of light-receiving elements between said guide-pin holes; and fiber holding means penetrated by said pair of guide pins so as to close contact with said light-receiving element holding means and holding said plurality of optical fibers throughout their length between said pair of guide pins, wherein said optical fibers are optically coupled to corresponding said light-receiving elements and their input end faces are aligned at a predetermined interval between said guide pins on a connecting end face of said fiber holding means.

2. A receiver according to claim 1, characterized by further comprising electronic circuit holding means, arranged on an opposite side of said fiber holding means via said light-receiving element holding means, for mounting an electronic circuit necessary for operation of said light-receiving elements.

3. A receiver according to claim 1, characterized in that said light-receiving element holding means comprises a first holding portion for holding said guide pins and a second holding portion for holding said plurality of light-receiving elements, said second holding portion being positioned with reference to said first holding portion.

4. An optical parallel transmission transmitter with a plurality of light-emitting elements comprising:

optical fibers each corresponding to one of said light-transmitting elements, respectively;

light-emitting element holding means, having a pair of guide-pin holes for holding one end of corresponding said guide pins in parallel, for holding said plurality of light-emitting elements between said guide-pin holes; and fiber holding means penetrated by said pair of guide pins so as to close contact with said light-emitting element holding means and holding said plurality of optical fibers throughout their length between said pair of guide pins, wherein said optical fibers are optically coupled to corresponding said light-transmitting elements and their output end faces are aligned at a predetermined interval between said guide pins on a connecting end face of said fiber holding means.

* * * * *